(12) United States Patent
Young et al.

(10) Patent No.: US 11,040,406 B1
(45) Date of Patent: Jun. 22, 2021

(54) SAW SLIDE DEVICE

(71) Applicants: Douglas Young, Port Clinton, OH (US); William H. Davis, Farview Park, OH (US); Robert Piskura, North Olmsted, OH (US); Jeffrey N. Zahn, Mentor, OH (US)

(72) Inventors: Douglas Young, Port Clinton, OH (US); William H. Davis, Farview Park, OH (US); Robert Piskura, North Olmsted, OH (US); Jeffrey N. Zahn, Mentor, OH (US)

( * ) Notice: Subject to any disclaimer, the term of this patent is extended or adjusted under 35 U.S.C. 154(b) by 0 days.

(21) Appl. No.: 16/872,706

(22) Filed: May 12, 2020

Related U.S. Application Data

(60) Provisional application No. 62/961,558, filed on Jan. 15, 2020, provisional application No. 62/994,472, filed on Mar. 25, 2020.

(51) Int. Cl.
*B23D 47/02* (2006.01)
*B23D 45/02* (2006.01)
(Continued)

(52) U.S. Cl.
CPC ......... *B23D 47/025* (2013.01); *B23D 45/025* (2013.01); *B23D 45/046* (2013.01);
(Continued)

(58) Field of Classification Search
CPC ...... B23D 47/02; B23D 47/025; B23D 45/02; B23D 45/024; B23D 45/025; B23D 45/027; B23D 45/046; B23D 45/048; B23D 45/14; B23Q 1/25; B23Q 1/26; B23Q 1/262; B23Q 1/28; B23Q 1/282; B23Q 1/46–628; B25H 1/0021; B25H 1/0042;
(Continued)

(56) References Cited

U.S. PATENT DOCUMENTS 1,733,518 A * 10/1929 Snover ............... B23D 57/0076
83/486.1
3,151,642 A * 10/1964 Olson ....................... B27B 5/07
83/486.1
(Continued)

FOREIGN PATENT DOCUMENTS

CA  2474087 C  11/2009
CA  2680679 A1  4/2011
(Continued)

OTHER PUBLICATIONS

Walter, Rudy, Engineering Principles for Plastic Gears, Oct. 1, 2004, GearSolutions, https://gearsolutions.com/features/engineering-principles-for-plastic-gears/, accessed Jun. 10, 2020 (Year: 2004).*
(Continued)

*Primary Examiner* — Evan H MacFarlane
(74) *Attorney, Agent, or Firm* — Fay Sharpe LLP

(57) ABSTRACT

A saw slide device allows a user to easily and accurately move a saw for proper alignment with a cutting material or workpiece. The saw slide device generally includes a sliding plate configured to support an associated saw, an adjustment or alignment mechanism configured to move the sliding plate, and a base frame which supports the sliding plate and adjustment mechanism.

13 Claims, 36 Drawing Sheets

(51) Int. Cl.
    *B23D 45/04*     (2006.01)
    *B27B 5/18*     (2006.01)
    *B23Q 1/52*     (2006.01)
    *B23Q 1/28*     (2006.01)

(52) U.S. Cl.
    CPC .............. *B23Q 1/282* (2013.01); *B23Q 1/52* (2013.01); *B27B 5/181* (2013.01); *B27B 5/187* (2013.01)

(58) Field of Classification Search
    CPC . B25H 1/005; B25H 1/02; B25H 1/04; B25H 1/06; B25H 1/08; B25H 1/10; B27B 5/16; B27B 5/18; B27B 5/185; B27B 5/187; B27B 5/188; B27B 5/20; B27B 5/201; B27B 5/206; B27B 5/207; B27B 5/208; B27B 25/10; F16M 11/0043; F16M 11/045
    See application file for complete search history.

(56) References Cited

U.S. PATENT DOCUMENTS

| | | | | |
|---|---|---|---|---|
| 3,365,982 | A | | 1/1968 | Floyd |
| 4,079,648 | A | * | 3/1978 | Chappell .............. B23D 59/007 83/471.2 |
| 4,384,502 | A | | 5/1983 | Dover |
| 4,448,102 | A | | 5/1984 | Thornton |
| 4,527,786 | A | * | 7/1985 | Hsu ....................... B25B 1/2426 269/154 |
| 4,531,441 | A | | 7/1985 | Bergler |
| 4,566,510 | A | | 1/1986 | Bartlett et al. |
| 4,860,807 | A | | 8/1989 | Vacchiano |
| 4,964,449 | A | * | 10/1990 | Conners ................ B23D 45/048 144/286.1 |
| 5,105,862 | A | | 4/1992 | Skinner et al. |
| 5,179,886 | A | | 1/1993 | Rathje, Jr. |
| 5,562,135 | A | | 10/1996 | Beth et al. |
| RE35,627 | E | | 10/1997 | Estrem |
| 6,058,990 | A | * | 5/2000 | Kent ........................ B25H 1/10 144/1.1 |
| 6,199,608 | B1 | * | 3/2001 | Ayala ................... B23D 47/025 144/286.1 |
| 6,672,348 | B2 | | 1/2004 | Ransom et al. |
| 7,201,192 | B2 | | 4/2007 | Makropoulos |
| 7,631,847 | B2 | | 12/2009 | Harrison et al. |
| 7,766,125 | B2 | * | 8/2010 | Fowler ..................... B25H 1/06 144/286.1 |
| 7,823,575 | B2 | * | 11/2010 | O'Banion ............. B23D 45/02 125/13.01 |
| 8,191,449 | B2 | * | 6/2012 | Wiezorek ............. B23D 47/025 83/34 |
| 8,684,052 | B2 | * | 4/2014 | Breitenbach ............. B25H 1/06 144/286.1 |
| 8,707,839 | B2 | | 4/2014 | Opsitos, Jr. |
| 8,850,940 | B2 | | 10/2014 | Rybka |
| D721,108 | S | | 1/2015 | Wise |
| 8,931,529 | B2 | * | 1/2015 | Fregeau ................... B25H 1/06 144/286.1 |
| 2003/0097920 | A1 | | 5/2003 | Ransom et al. |
| 2004/0250901 | A1 | | 12/2004 | Ursell et al. |
| 2007/0131306 | A1 | | 6/2007 | Snider |
| 2008/0110529 | A1 | | 5/2008 | Breitenbach |
| 2008/0276773 | A1 | | 11/2008 | Radhakrishna |
| 2009/0084929 | A1 | | 4/2009 | Bergmann et al. |
| 2010/0051137 | A1 | | 3/2010 | Layton |
| 2011/0067540 | A1 | | 3/2011 | Frolov et al. |
| 2018/0071942 | A1 | | 3/2018 | Behr |
| 2018/0207838 | A1 | | 7/2018 | Tolzman et al. |

FOREIGN PATENT DOCUMENTS

| | | |
|---|---|---|
| CN | 204414058 U | 6/2015 |
| CN | 105666589 A | 6/2016 |
| CN | 208614996 U | 3/2019 |
| EP | 2111940 B1 | 7/2015 |

OTHER PUBLICATIONS

PROXXON Brochure titled "Chop and Miter Saw KGS 80", publication date is unknown.

* cited by examiner

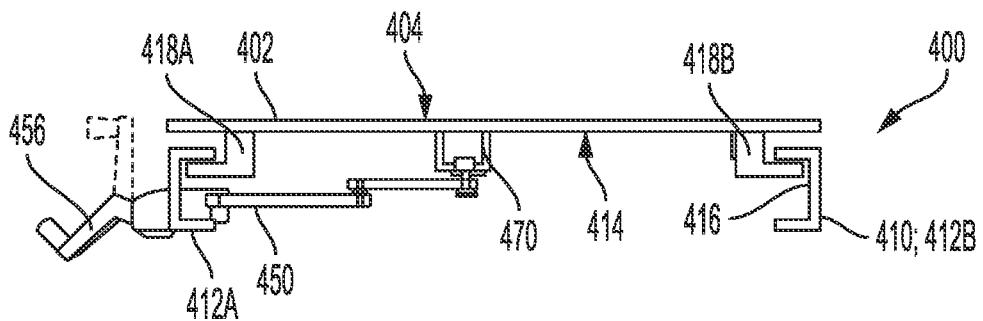
FIG. 4A
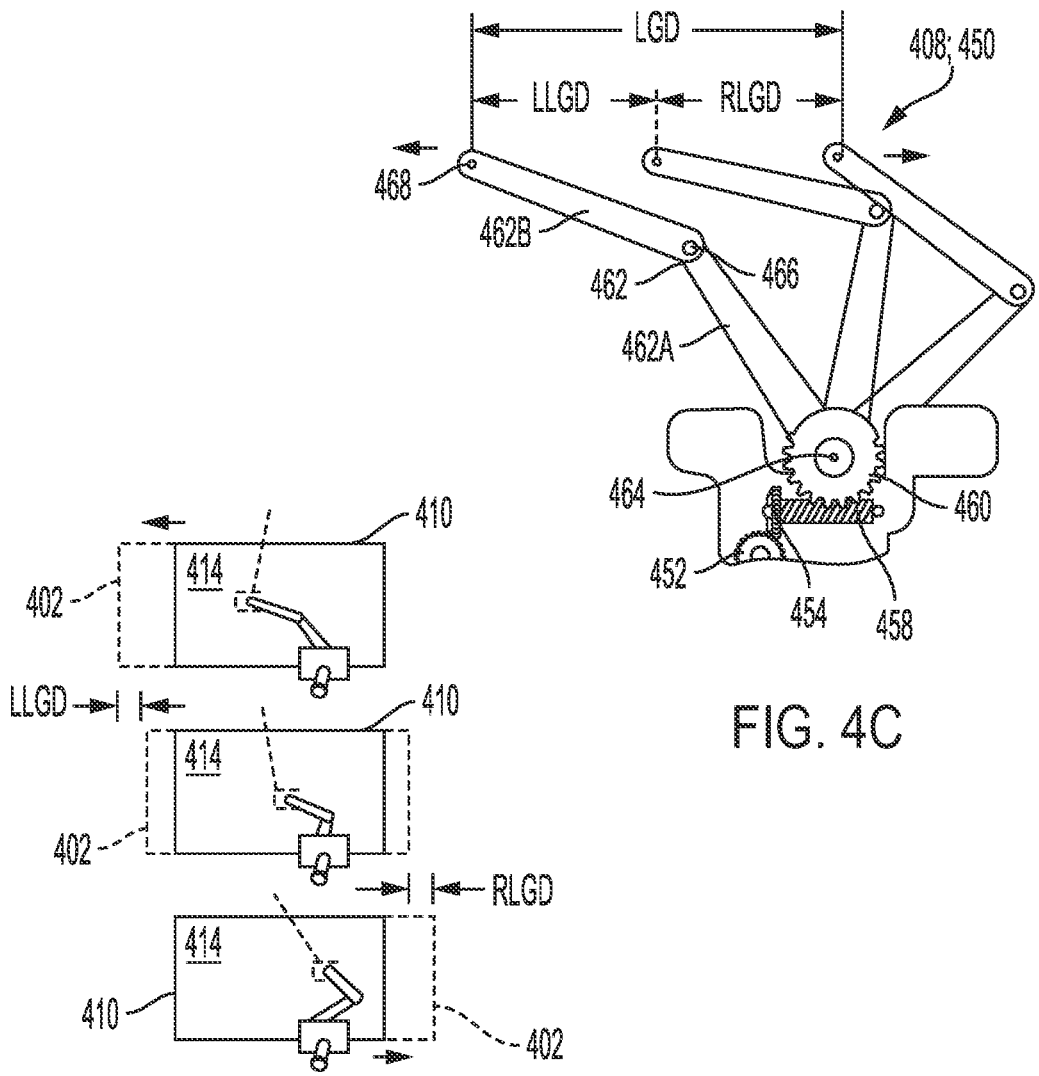
FIG. 4C
FIG. 4B

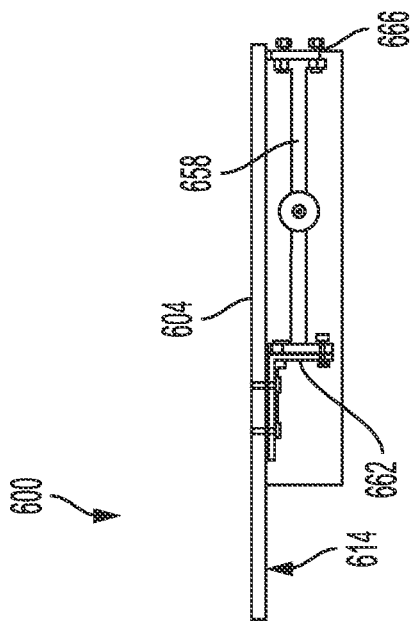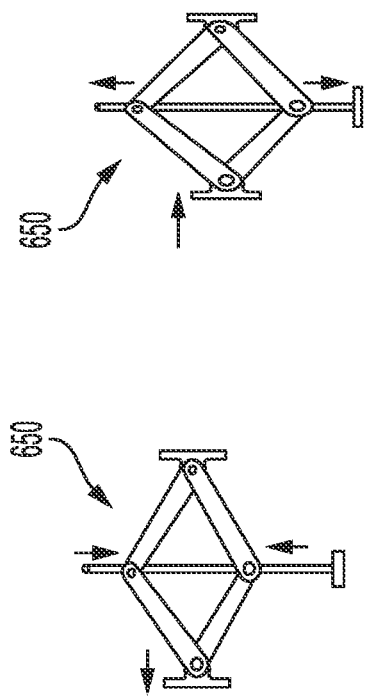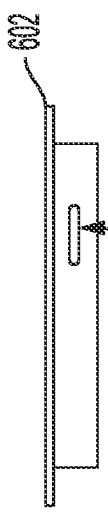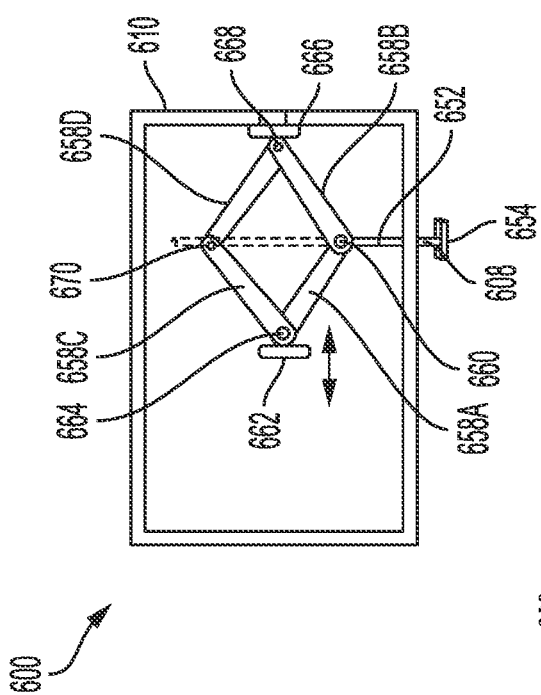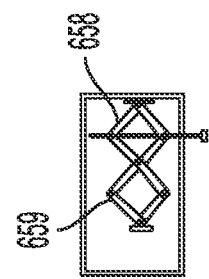
FIG. 6B
FIG. 6E
FIG. 6D
FIG. 6A
FIG. 6C
FIG. 6F

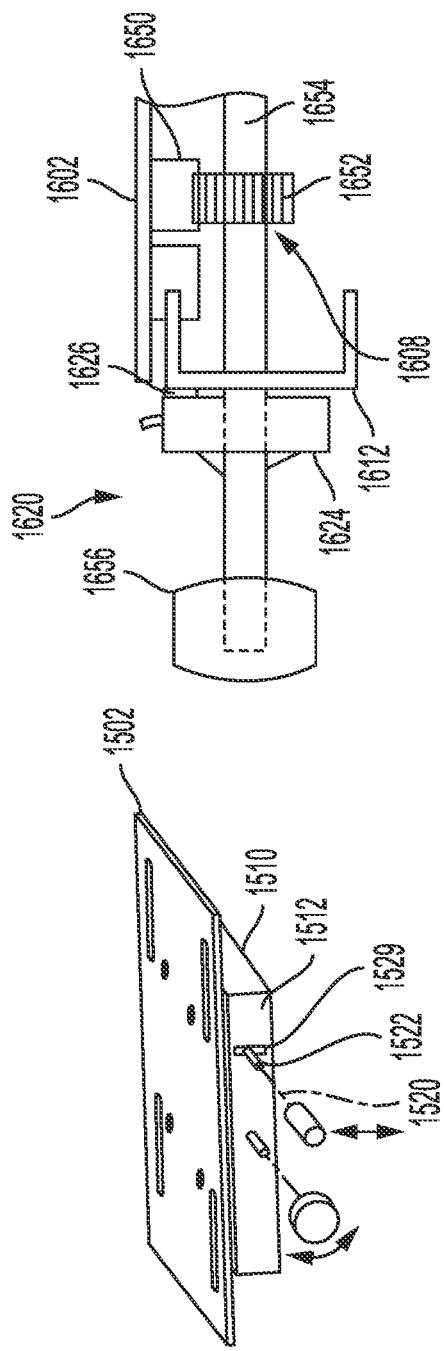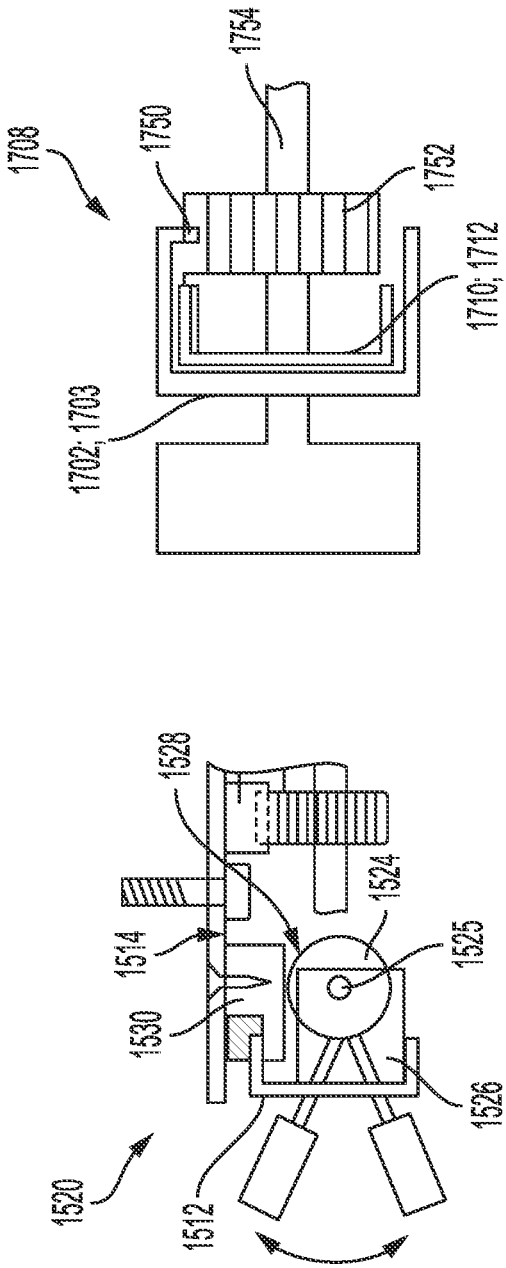

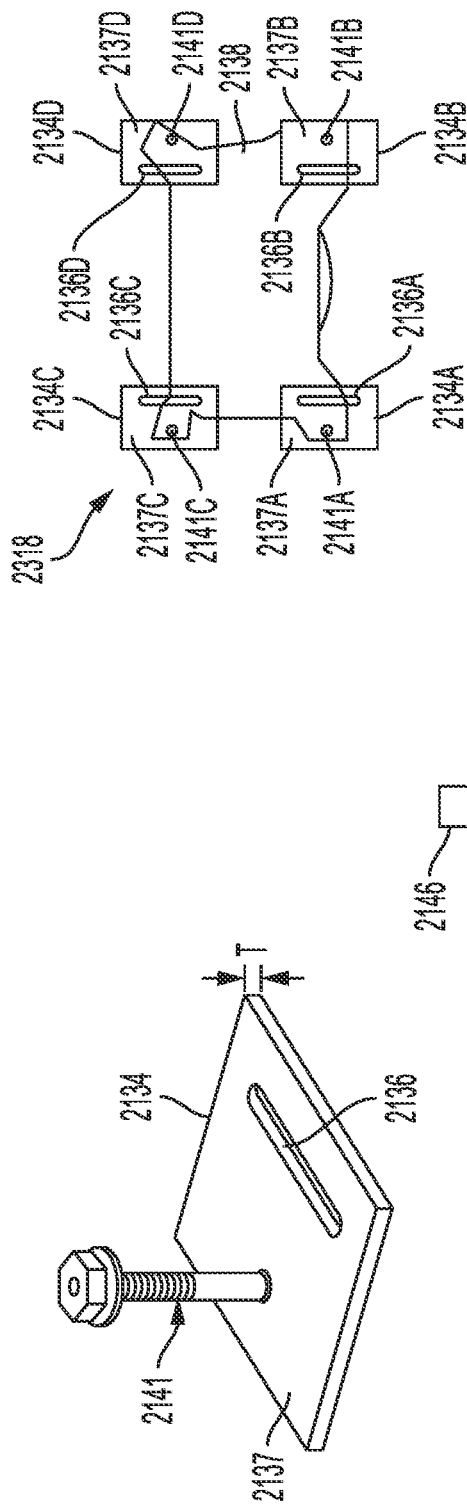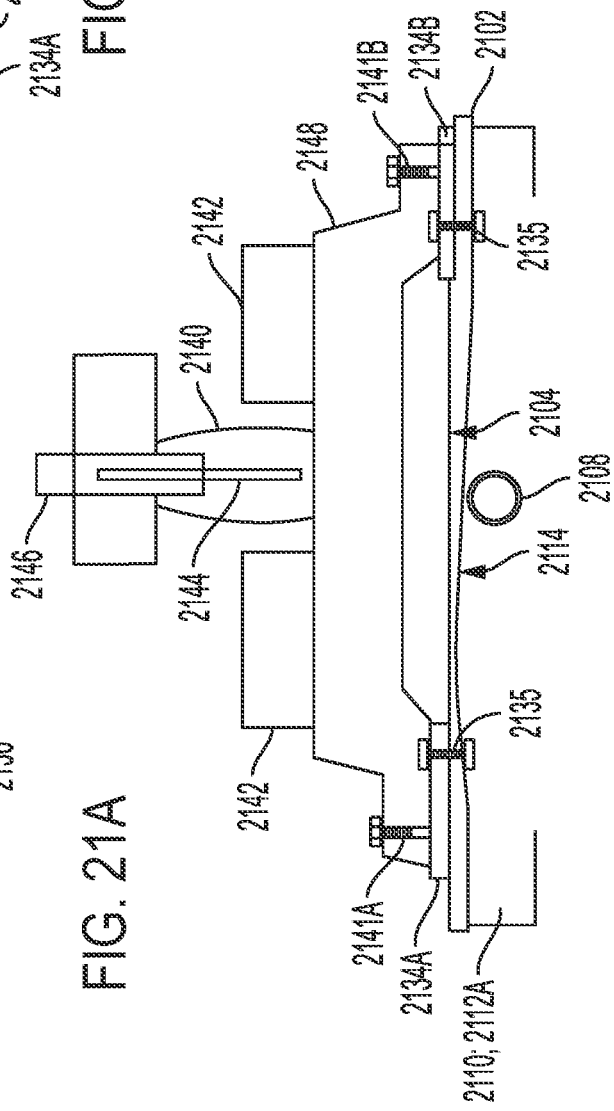
FIG. 21A  FIG. 21B  FIG. 21C

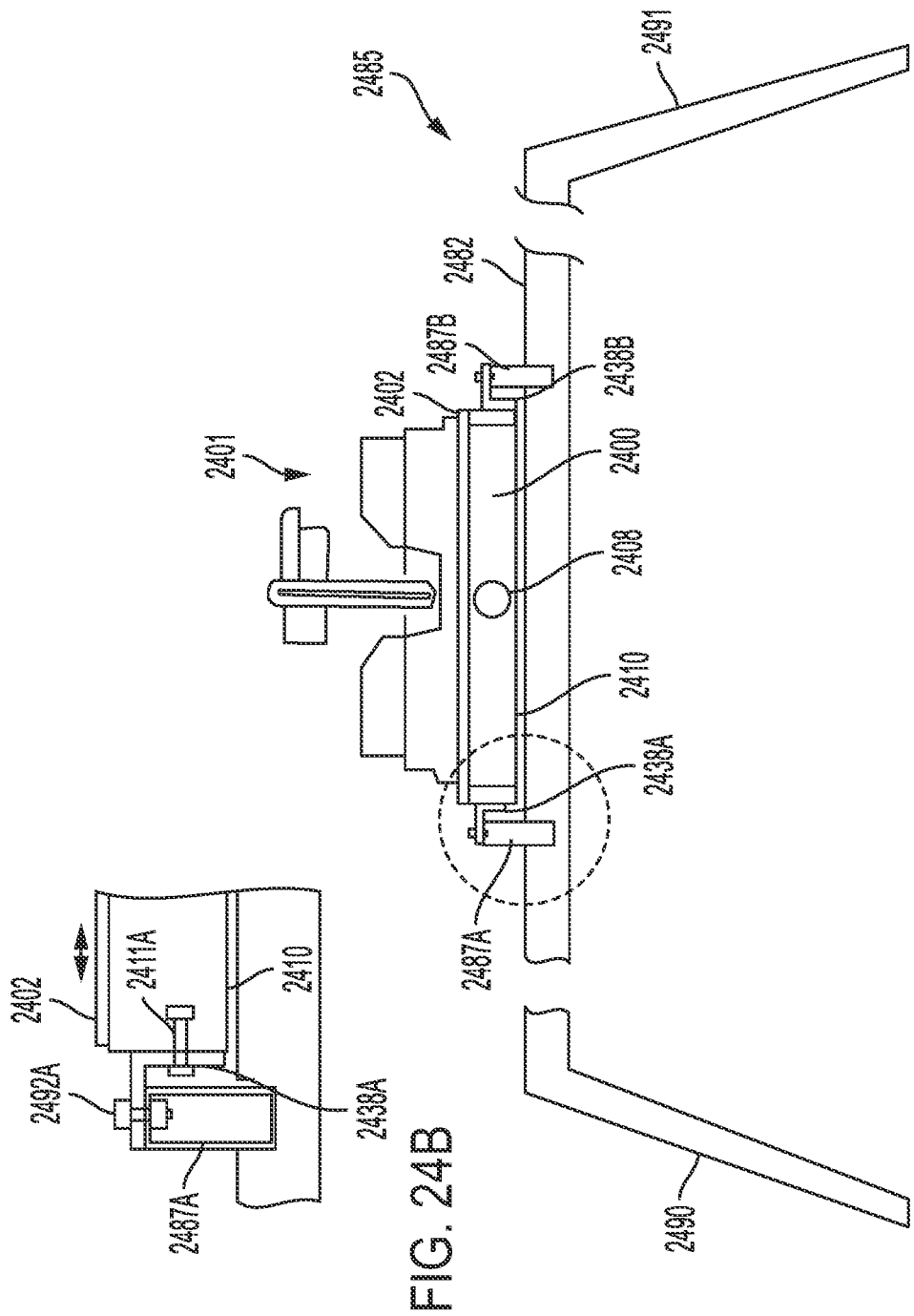

SAW SLIDE DEVICE

CROSS REFERENCE TO RELATED APPLICATION

This application claims priority to U.S. Provisional Patent Application Ser. No. 62/961,558, filed Jan. 15, 2020, and U.S. Provisional Patent Application Ser. No. 62/994,472, filed Mar. 25, 2020, the entireties of which are fully incorporated herein by reference.

BACKGROUND

The present exemplary embodiment relates to a saw slide device, adjustable saw device; miter saw table; traversing miter saw table; adjustable miter saw table; traversing tool table; adjustable tool table; traversing worktable; adjustable worktable, etc. It finds particular application in conjunction with an associated power tool (such as a miter saw, bench top planer, joiner, drill press, radial arm saw, grinder, etc.) and/or an associated saw stand and will be described with particular reference thereto. However, it is to be appreciated that the present exemplary embodiment is also amenable to other like applications.

Miter saws and compound miter saws, and sliding variations of both, are portable crosscut sawing devices which are used to make crosscuts and miter cuts across the grain or longitudinal length of a workpiece, such as wood trim moldings, timber, other lumber, PVC (polyvinyl chloride) piping and other materials. Miter saws, compound miter saws and sliding variations of both, can be mounted to a portable saw stand, table or bench when used at a building or construction site, as well as in a shop or garage.

As generally shown in FIGS. 23A, 23B and 23C, one version of a currently available saw stand includes a base 2382 with a track 2386 or other member extending and supported by two or more saw stand legs 2390A, 2390B, 2391A and 2391B. In addition, the saw stand may include adjustable work piece supports/rollers 2388A and 2388B to support a workpiece for crosscutting with the miter saw or compound miter saw fixed to the saw stand track, i.e. cross member, using saw stand mounting rackets 2387A and 2387B that can be positioned and fixed at various widths or spacings along the saw stand track 2386 to accommodate various saw mounting arrangements. To set up the saw/saw stand combination, an operator attaches and fixes the base of a miter saw to the saw stand brackets which are attached and fixed to the saw stand track or cross member. After completing the setup of the saw/saw stand combination, the miter saw is fixed in place relative to the saw stand. Any further movement of the miter saw, relative to the saw stand, requires an operator to loosen or remove the fasteners attaching the miter saw to the saw stand brackets and/or releasing the saw stand brackets from the track.

During the operation of the miter saw/saw stand combination, an operator places a workpiece on the saw stand workpiece support rollers, or other independent set of workpiece supports, and manually aligns the workpiece to a desired position to crosscut the workpiece at a desired cutline.

While manually aligning and moving workpieces on the saw stand provides a convenient way of crosscutting light, short and relatively small workpieces, it can be difficult to properly align long, bulky, and and/or relatively heavy workpieces to a desired position on the saw stand and attached miter saw table to enable precise miter and crosscuts of the workpiece. For example, large timbers and pieces of lumber, especially pressure treated lumber, measuring 8-20 feet long or more, with widths of 8-24 inches or more, and/or having thicknesses which add considerable weight to the workpiece, can be burdensome to align with the miter saw blade at a desired cutline position. Typically, these long and/or heavy workpieces are positioned by manually jockeying the workpiece into position and/or tapping an end of the workpiece with a mallet or other item to control the positioning of the workpiece to properly align the workpiece cutline with the saw blade associated with the miter saw.

It is desirable to provide a saw and/or saw stand device which addresses the issues discussed above.

BRIEF DESCRIPTION

According to an exemplary embodiment of this disclosure, disclosed is a saw slide device for an associated miter saw comprising: a top plate having a lower surface and an upper surface, the upper surface of the top plate being configured to support and attach the associated miter saw; a top plate adjustment mechanism operably connected to the lower surface of the top plate, the top plate adjustment mechanism being configured to move the top plate and associated miter saw supported and attached thereon linearly along a plane defined by the upper surface of the top plate; and, a base frame positioned under the top plate, the top plate being movably attached to the base frame, the top plate adjustment mechanism being supported on at least a portion of the base frame, and the base frame having a fixed position relative to the top plate.

According to another exemplary embodiment of this disclosure, disclosed is a miter saw assembly comprising: a miter saw with a base; a sliding top plate with a lower surface and an upper surface, the base of the miter saw being mounted to the upper surface of the sliding top plate; a top plate adjustment mechanism operably connected to the lower surface of the sliding top plate, the top plate adjustment mechanism being configured to move the sliding top plate and miter saw linearly along a plane defined by the upper surface of the sliding top plate; and a frame which movably supports the lower surface of the sliding top plate and which supports at least a portion of the top plate adjustment mechanism, the frame having a fixed position relative to the sliding top plate.

According to another exemplary embodiment of this disclosure, disclosed is a saw stand assembly for an associated miter saw comprising: a saw stand; a sliding top plate with a lower surface and an upper surface, the upper surface of the sliding top plate being configured to support the associated miter saw; a top plate adjustment mechanism operably connected to the lower surface of the sliding top plate, the top plate adjustment mechanism being configured to move the sliding top plate and associated miter saw linearly along a plane defined by the upper surface of the sliding top plate; and, a frame mounted to the saw stand which movably supports the sliding top plate above the frame and which at least a partially supports the top plate adjustment mechanism, the frame having a fixed position on the saw stand relative to the sliding top plate.

According to another exemplary embodiment of this disclosure, disclosed is a traversing miter saw table operatively associated with a miter saw and miter saw stand comprising: a miter saw mount member, the miter saw mount member including a top surface and a bottom surface, the miter saw mount member adapted to operatively attach and fix an associated miter saw to the top surface, the associated miter saw including a work piece table, a circular saw blade oriented to crosscut a work piece supported by the work piece table; and a work piece fence extending along an axis perpendicular to a zero degree crosscut alignment axis of the associated miter saw circular saw blade; a saw stand mount member, the saw stand mount member operatively supporting the miter saw mount member and the saw stand mount member adapted to operatively attach and fix the saw stand mount member to at least one associated saw stand rail, the at least one associated saw stand rail extending along a longitudinal axis parallel to the associated miter saw work piece fence and perpendicular to the zero degree crosscut alignment axis of the associated miter saw circular saw blade; and an operator controlled miter saw alignment mechanism, the operator controlled miter saw alignment mechanism operatively connected to the miter saw mount member and the saw stand mount member, the miter saw alignment mechanism linearly traversing the miter saw mount member from a first location to a second location relative to a fixed location of the saw stand mount member operatively attached and fixed to the at least one associated saw stand rail to laterally align the associated miter saw and circular saw blade along an axis parallel to the at least one associated saw stand rail longitudinal axis.

According to another exemplary embodiment of this disclosure, disclosed is a traversing miter saw table and miter saw stand combination operatively associated with a miter saw comprising: a miter saw stand including a base and at least one saw stand rail including at least one moveable and fixable bracket to attach the adjustable miter saw table; and the traversing miter saw table including a miter saw mount member, the miter saw mount member including a top surface and a bottom surface, the miter saw mount member adapted to operatively attach and fix an associated miter saw to the top surface, the associated miter saw including a work piece table, a circular saw blade oriented to crosscut a work piece supported by the work piece table; and a work piece fence extending along an axis perpendicular to the zero degree crosscut orientation of the associated miter saw circular saw blade; a saw stand mount member, the saw stand mount member operatively supporting the miter saw mount member and the saw stand mount member adapted to operatively attach and fix the saw stand mount member to the at least one associated saw stand rail, the at least one associated saw stand rail extending along a longitudinal axis parallel to the associated miter saw work piece fence and perpendicular to a zero degree crosscut alignment axis of the associated miter saw circular saw blade; and an operator controlled miter saw alignment mechanism, the operator controlled miter saw alignment mechanism operatively connected to the miter saw mount member and the saw stand mount member, the miter saw alignment mechanism linearly traversing the miter saw mount member from a first location to a second location relative to a fixed location of the saw stand mount member operatively attached and fixed to the at least one associated saw stand rail to laterally align the associated miter saw and circular saw blade along an axis parallel to the at least one associated saw stand rail longitudinal axis.

According to another exemplary embodiment of this disclosure, disclosed is a traversing miter saw table operatively associated with a miter saw and miter saw stand comprising: a miter saw mount member, the miter saw mount member including a top surface and a bottom surface, the miter saw mount member adapted to operatively attach and fix an associated miter saw to the top surface, the associated miter saw including a work piece table, a circular saw blade oriented to crosscut a work piece supported by the work piece table; and a work piece fence extending along an axis perpendicular to a zero degree crosscut alignment axis of the associated miter saw circular saw blade; a saw stand mount member, the saw stand mount member operatively supporting the miter saw mount member and the saw stand mount member adapted to operatively attach and fix the saw stand mount member to at least one associated saw stand rail, the at least one associated saw stand rail extending along a longitudinal axis parallel to the associated miter saw work piece fence and perpendicular to the zero degree crosscut alignment axis of the associated miter saw circular saw blade; a first operator controlled miter saw alignment mechanism, the first operator controlled miter saw alignment mechanism operatively connected to the miter saw mount member and the saw stand mount member, the first miter saw alignment mechanism linearly traversing the miter saw mount member from a first location to a second location relative to a fixed location of the saw stand mount member operatively attached and fixed to the at least one associated saw stand rail to laterally align the associated miter saw and circular saw blade along an axis parallel to the at least one associated saw stand rail longitudinal axis; and a second operator controlled miter saw alignment mechanism, the second operator controlled miter saw alignment mechanism operatively connected to the miter saw mount member and the saw stand mount member, the second miter saw alignment mechanism linearly traversing the miter saw mount member from a first location to a second location relative to a fixed location of the saw stand mount member operatively attached and fixed to the at least one associated saw stand rail to align the associated miter saw and circular saw blade along an axis perpendicular to the at least one associated saw stand rail longitudinal axis.

According to another exemplary embodiment of this disclosure, disclosed is a traversing miter saw table operatively associated with a miter saw and miter saw stand comprising: a miter saw mount member, the miter saw mount member including a top surface and a bottom surface, the miter saw mount member adapted to operatively attach and fix an associated miter saw to the top surface, the associated miter saw including a work piece table, a circular saw blade oriented to crosscut a work piece supported by the work piece table; and a work piece fence extending along an axis perpendicular to a zero degree crosscut alignment axis of the associated miter saw circular saw blade; a miter saw mount member support frame, the miter saw mount member support frame operatively supporting the miter saw mount member and the miter saw mount member support frame adapted to operatively attach and fix the miter saw mount member support frame to an operator controlled rotating platform operatively attached and fixed to at least one associated saw stand rail, the at least one associated saw stand rail extending along a longitudinal axis parallel to the associated miter saw work piece fence and perpendicular to the zero degree crosscut alignment axis of the associated miter saw circular saw blade with the rotating platform aligned at a rotation angle of substantially zero degrees; an operator controlled miter saw alignment mechanism, the operator controlled miter saw alignment mechanism operatively connected to the miter saw mount member and the miter saw mount member support frame, the miter saw alignment mechanism linearly traversing the miter saw mount member from a first location to a second location relative to a fixed location of the miter saw mount member support frame; and an operator controlled miter saw rotating platform alignment mechanism, the operator controlled miter rotating platform alignment mechanism operatively connected to the rotating platform to rotate the miter saw mount member and miter saw mount member support frame from a first angular position to a second angular position to angularly align the associated miter saw and circular saw blade about a rotational axis of the rotating platform.

According to another exemplary embodiment of this disclosure, disclosed is a traversing miter saw table operatively associated with a miter saw and miter saw stand comprising: a miter saw mount member, the miter saw mount member including a top surface and a bottom surface, the miter saw mount member adapted to operatively attach and fix an associated miter saw to the top surface, the associated miter saw including a work piece table, a circular saw blade oriented to crosscut a work piece supported by the work piece table; and a work piece fence extending along an axis perpendicular to a zero degree crosscut alignment axis of the associated miter saw circular saw blade; a miter saw mount member support frame, the miter saw mount member support frame operatively supporting the miter saw mount member and the miter saw mount member support frame adapted to operatively attach and fix the miter saw mount member support frame to an operator controlled rotating platform operatively attached and fixed to at least one associated saw stand rail, the at least one associated saw stand rail extending along a longitudinal axis parallel to the associated miter saw work piece fence and perpendicular to the zero degree crosscut alignment axis of the associated miter saw circular saw blade with the rotating platform aligned at a rotation angle of substantially zero degrees; a first operator controlled miter saw alignment mechanism, the first operator controlled miter saw alignment mechanism operatively connected to the miter saw mount member and the miter saw mount member support frame, the first miter saw alignment mechanism linearly traversing the miter saw mount member along a first axis from a first location to a second location relative to a fixed location of the miter saw mount member support frame; a second operator controlled miter saw alignment mechanism, the second operator controlled miter saw alignment mechanism operatively connected to the miter saw mount member and the miter saw mount member support frame, the second miter saw alignment mechanism linearly traversing the miter saw mount member along a second axis from a first location to a second location relative to a fixed location of the miter saw mount member support frame the second axis offset an angle of 45 degrees to 135 degrees from the first axis; and an operator controlled miter saw rotating platform alignment mechanism, the operator controlled miter rotating platform alignment mechanism operatively connected to the rotating platform to rotate the miter saw mount member and miter saw mount member support frame from a first angular position to a second angular position to angularly align the associated miter saw and circular saw blade about a rotational axis of the rotating platform.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 4A is a side sectional view of a saw slide according to another exemplary embodiment of the present disclosure, the saw slide including a worm gear drive for side-to-side alignment of a miter saw mount member/top plate;

FIG. 4B is a top view of the saw slide shown in FIG. 4A including a range of motion of a worm gear driven miter saw mount member/top plate according to an exemplary embodiment of this disclosure;

FIG. 4C is a detailed view the saw slide shown in FIG. 4A including additional details of the exemplary worm gear drive and attached linkage;

FIG. 6A is a top view of a saw slide base frame according to another exemplary embodiment of the present disclosure, the saw slide base frame including a scissor jack drive for side-to-side alignment of a miter saw mount member/top plate;

FIG. 6B is a side sectional view of the saw slide base frame shown in FIG. 6A including a miter saw mount member/top plate and bracket members to operatively mount the scissor jack drive to the saw slide;

FIG. 6C is a front view of the saw slide shown in FIGS. 6A and 6B including a slot formed in a frame sidewall, the slot providing for the extension of the scissor jack control arm outside of the frame to enable operation of the scissor jack drive;

FIG. 6D is a detail top view of the saw slide scissor jack drive shown in FIGS. 6A-6C including additional movement detail of the scissor jack drive according to an exemplary embodiment of this disclosure, the movement detail representing the extension of the scissor jack drive bar linkage/arms to provide a side-to-side alignment or movement of the miter saw mount member/top plate to the left;

FIG. 6E is a detail top view of the saw slide scissor jack drive shown in FIGS. 6A-6C including additional movement detail of the scissor jack drive according to an exemplary embodiment of this disclosure, the movement detail representing the contraction of the scissor jack drive bar linkage/arms to provide a side-to-side alignment or movement of the miter saw mount member/top plate to the right;

FIG. 6F is a detailed top view of the saw slide base frame shown in FIG. 6A including a dual scissor jack drive for side-to-side alignment of a miter saw mount member/top plate according to another exemplary embodiment of this disclosure;

FIG. 15A is a perspective view of a saw slide according to another exemplary embodiment of this disclosure, the saw slide including a friction drum locking mechanism to prevent movement of the saw slide;

FIG. 15B is a detail side sectional side view of the locking mechanism of the saw slide shown in FIG. 15A;

FIG. 16 is a detail side sectional view of a rack and pinion gear arrangement which uses a chuck as a locking member;

FIG. 17 is a detail side sectional view of a saw slide rack and pinion gear arrangement according to an exemplary embodiment of this disclosure, the saw slide base frame including a C-shaped sidewall front section;

FIG. 21A is a perspective view of a saw mount adapter bracket according to an exemplary embodiment of this disclosure;

FIG. 21B is a front view of a saw slide according to an exemplary embodiment of this disclosure, the saw slide including saw mount adapter brackets as shown in FIG. 21A to mount a miter saw to the saw slide;

FIG. 21C is an overhead view of an exemplary arrangement of multiple saw mount adapter brackets as shown in FIG. 21A, where the arrangement corresponds to a footprint of a miter saw base mounted to the saw mount adapter plates;

FIG. 24A is a front view of a combination sliding compound miter saw, saw slide and saw stand assembly according to another exemplary embodiment of this disclosure, the saw slide recessed and mounted between the saw stand brackets, thereby reducing the height of the saw slide and sliding compound miter saw above the saw stand track/base height and associated workpiece supports (not shown);

FIG. 24B is a detail view of a saw slide base frame side mount bracket as shown in FIG. 24A;

DETAILED DESCRIPTION

Figure 1A:
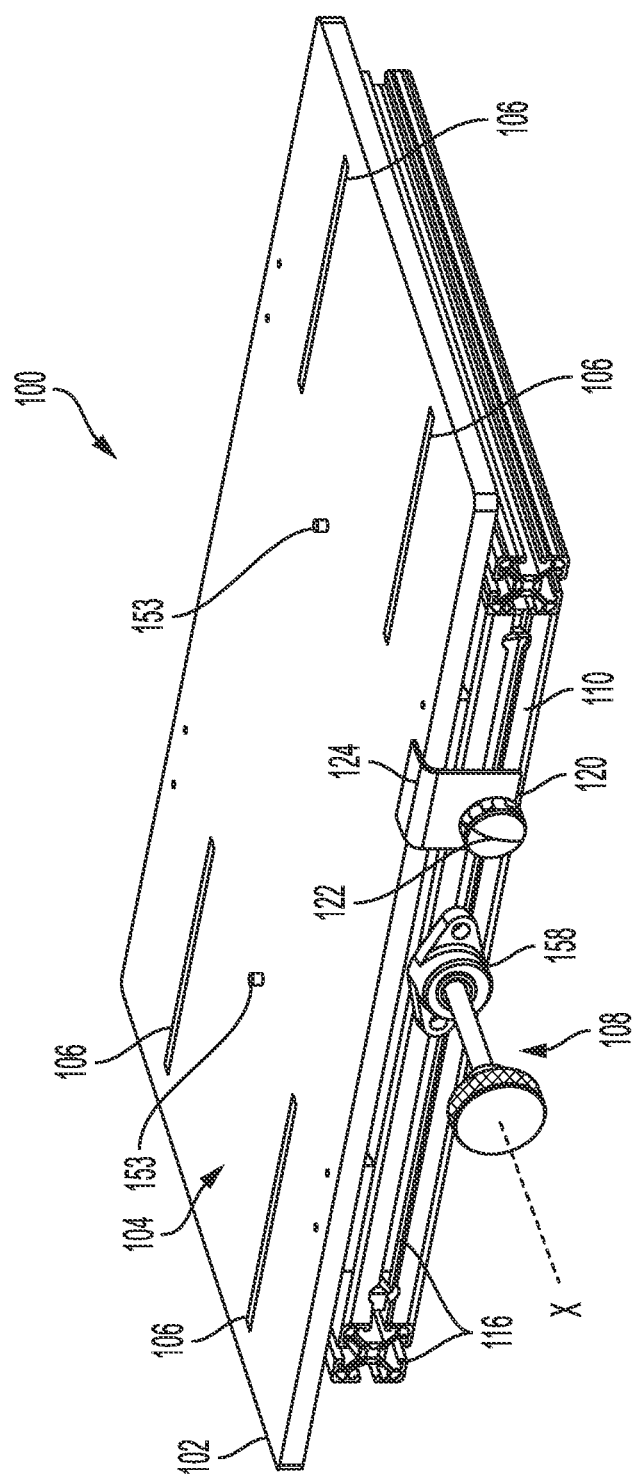
FIG. 1A is a perspective view of a saw slide according to one exemplary embodiment of the present disclosure, the saw slide including a single rack and pinion gear side-to-side adjustment/alignment mechanism for aligning a mounted miter saw to crosscut a workpiece.

A more complete understanding of the systems, devices, and processes disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Disclosed herein is a portable miter saw slide device including a mechanism that allows a user to easily and accurately move a mounted saw left, right, forward or backward for proper alignment of a miter saw and associated saw blade with a material or workpiece to be cut. In addition, disclosed is a swivel/rotating platform assembly allowing an operator to rotate the mounted saw left and right. The saw slide devices disclosed herein generally include at least a sliding miter saw mount member, also referred to as a plate, adapter plate, sliding plate, upper plate, top plate and plate, configured to support an associated saw; an adjustment or alignment mechanism configured to move the sliding plate; and a saw stand mount member, also referred to as a support frame or base frame, which supports the sliding plate and at least a portion of the alignment/adjustment mechanism. The saw slide devices of the present disclosure can also include a locking member configured to lock the sliding plate and the saw supported thereon in a fixed position, relative to the base frame, prior to making a cut. The presently described saw slide devices can be configured as, but not limited to: (a) a separate portable accessory type device that is positioned and mounted to a saw stand or other support surface; (b) a component which is built into the base of newly designed saws; and/or, (c) a component which is built into newly portable designed saw stands or tables.

Advantageously, the use of the disclosed portable saw slide mounted to a saw stand provides the ability for an operator of a mounted miter saw, compound miter saw, and sliding variations of both, to precisely align the circular blade of the mounted saw with a workpiece cutmark using an adjustment/alignment mechanism, including but not limited to, a rack and pinion drive mechanism, a swivel/rotating platform mechanism, a worm gear drive mechanism, a scissor jack drive mechanism, a lever/handlebar drive mechanism, a cable pulley drive mechanism, and/or a linear actuator drive mechanism. The use of the disclosed saw slide to precisely align the saw/saw blade to a workpiece cutmark minimizes the effort required of an operator to manually jockey or position a workpiece independently supported by workpiece support/rollers to crosscut a workpiece. Furthermore, the use of the disclosed combination saw slide and saw stand potentially increases the accuracy and precision of a desired crosscut length, especially with large and/or heavy workpieces, using a portable miter saw, compound miter saw and/or sliding variations of both.

As previously described in the background section, saw stands are currently used to provide a portable manner of crosscutting timbers and lumber at a jobsite or other facility. These saw stands include saw mounting brackets to fix a miter saw to the stand or other saw attachment structure, such as a platform frame. After the miter saw is fixed to a saw stand, incremental movement of the miter saw is not available to an operator of the saw and saw stand combination to further align or position the fixed miter saw relative to a workpiece desired cutmark supported by workpiece supports integrated into the saw stand independent or from the saw stand. The use of a portable saw slide as disclosed herein provides independent and supplemental adjustment/alignment of a mounted miter saw mounted to a saw stand and/or saw table, thereby enabling precise, accurate and repeatable crosscuts of a workpiece. In other words, the disclose saw slide provides a portable device to enable precise, accurate and repeatable fabrication of crosscut timbers, lumber and other materials at a jobsite, building site, facility, shop or other location.

Figure 1B:
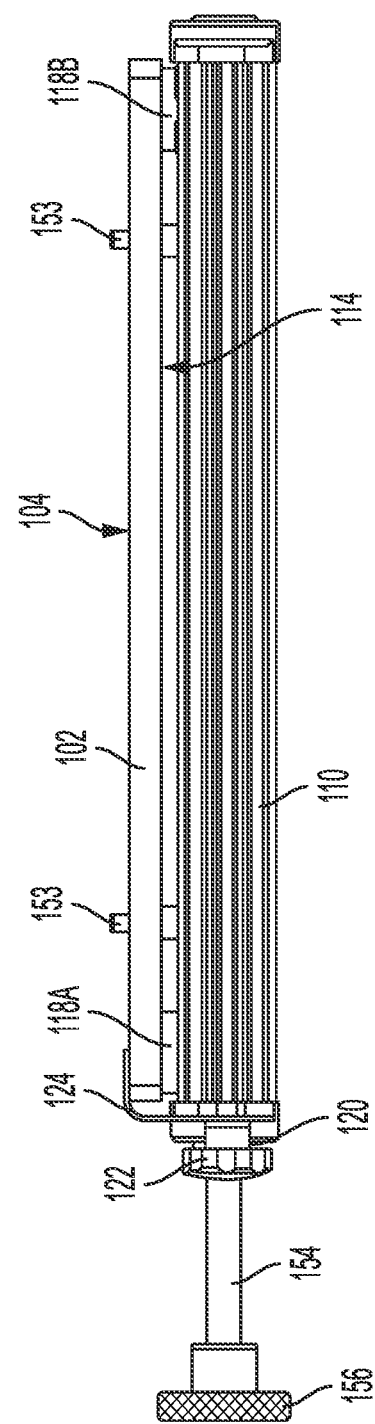
FIG. 1B is a side profile view of the saw slide shown in FIG. 1A.
Figure 1C:
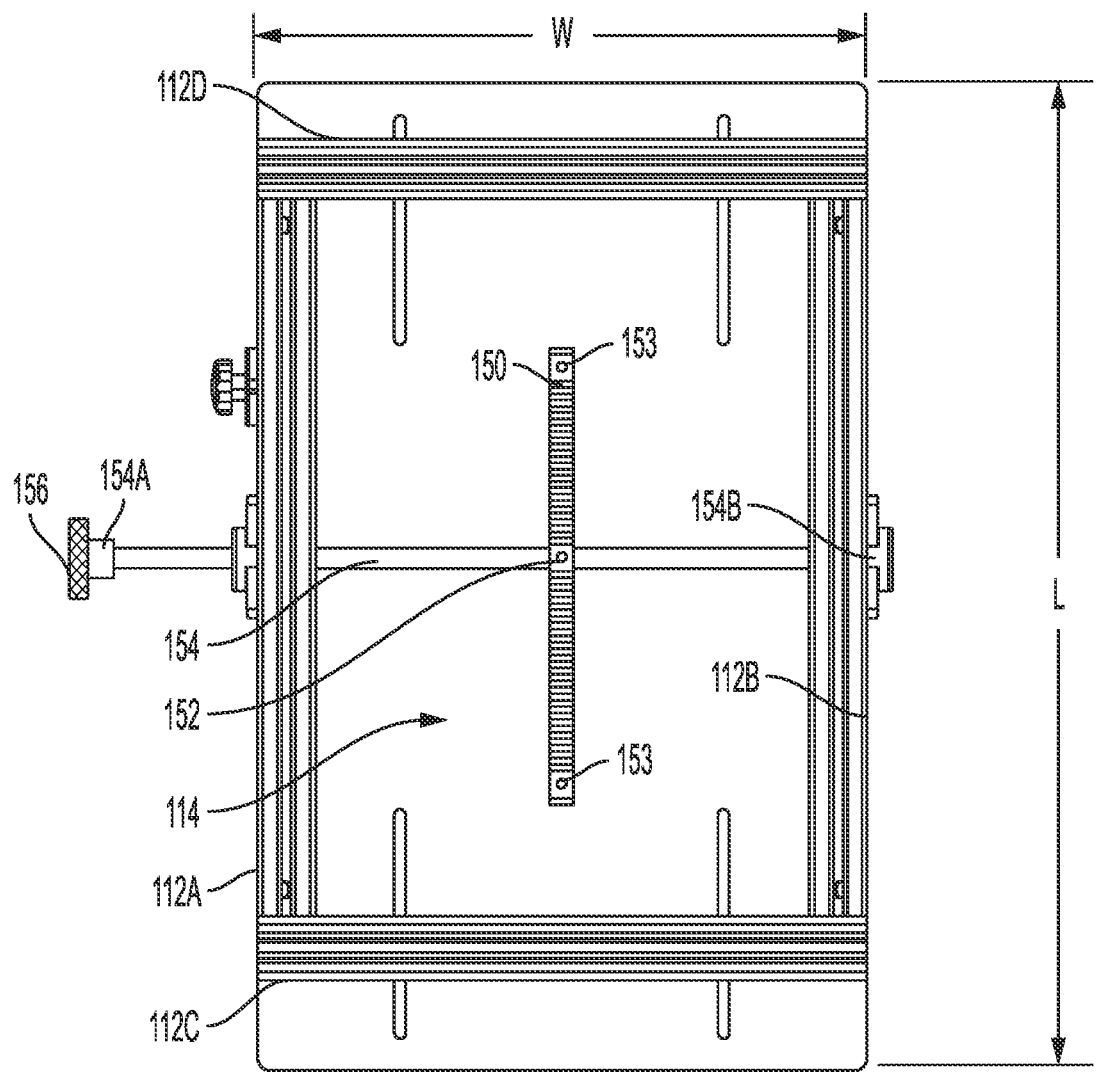
FIG. 1C is a bottom view of the saw slide shown in FIG. 1A including an exemplary single rack and pinion gear side-to-side adjustment/alignment to traverse a top miter saw mount member plate from a first location to a second location to align a mounted miter saw to crosscut a workpiece.
Figure 1D:
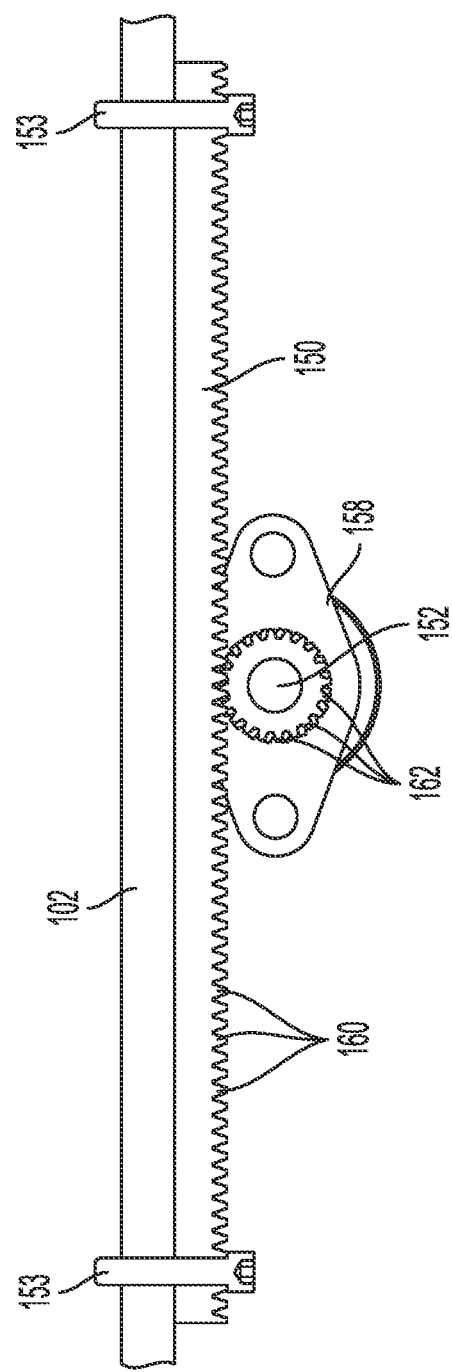
FIG. 1D is a detailed side view of the saw slide shown in FIG. 1A including the exemplary single rack and pinion gear side-to-side adjustment/alignment mechanism to traverse a top miter saw mount member plate from a first location to a second location to align a mounted miter saw to crosscut a workpiece.

With reference to FIGS. 1A-1D, FIG. 1A is a perspective view of a saw slide according to one exemplary embodiment of the present disclosure, the saw slide including a single rack and pinion gear side-to-side adjustment/alignment mechanism for aligning a mounted miter saw to crosscut a workpiece; FIG. 1B is a side profile view of the saw slide shown in FIG. 1A; FIG. 1C is a bottom view of the saw slide shown in FIG. 1A including an exemplary single rack and pinion gear side-to-side adjustment/alignment to traverse a top miter saw mount member plate from a first location to a second location to align a mounted miter saw to crosscut a workpiece; and FIG. 1D is a detailed side view of the saw slide shown in FIG. 1A including the exemplary single rack and pinion gear side-to-side adjustment/alignment mechanism to traverse a top miter saw mount member plate from a first location to a second location to align a mounted miter saw to crosscut a workpiece.

The saw slide device 100 is for operative use with an associated saw and/or an associated saw stand (not shown). The saw slide 100 includes a sliding top plate 102 which is generally disposed between the saw and saw stand, the sliding top plate made of aluminum, steel, plastic, wood, or other material. An upper or top surface 104 defines a generally flat, horizontal plane on which the saw sits on or is otherwise mounted thereto. That is, the upper surface 104 of the plate 102 is generally configured to support the associated miter saw, and as discussed in further detail below, may include one or more fastening features 106, such as slots, which help secure the saw to the plate. An adjustment mechanism 108, also referred to as an alignment mechanism, of the saw slide 100 is operably connected to a lower surface 114 of the sliding top plate 102 such that the adjustment mechanism is configured to move the sliding top plate and associated miter saw supported thereon linearly along the flat plane defined by the upper surface 104 of the sliding top plate 102. A support or base frame 110, also referred to as a saw stand mount member, is generally located under the sliding top plate 102, the base frame made of aluminum, steel, plastic, wood, or other material, including, but not limited to, track type structural components. The sliding top plate 102 is movably attached to or otherwise supported on the base frame. In addition, at least a portion of the adjustment mechanism 108 is mounted to or otherwise supported on at least a portion of the saw slide base frame 110. More particularly, the adjustment mechanism 108 is generally supported on at least one side section 112 of the base frame 110, for example 112A, 112B, 112C and/or 112D.

The sliding top plate 102, adjustment mechanism 108 and base frame 110 are thus arranged and configured such that operator control of the adjustment mechanism causes the sliding top plate and associated saw supported thereon to slide along the base frame while the base frame maintains a fixed position relative to the moving plate 102. As such, the saw slide device 100 enables movement of the entire associated saw in order to align the saw blade for cutting a workpiece. In addition, as described in additional exemplary embodiments below, the adjustment mechanism 108 can be configured to slide the plate 102 and associated saw in a lateral direction, a longitudinal direction, or both lateral and longitudinal directions over the flat plane defined by the upper surface 104 of the sliding top plate. As used herein, unless indicated otherwise, the term "lateral" refers to a direction parallel to the width W of the sliding top plate 102 (front-to-rear) and the term "longitudinal" refers to a direction parallel to the length L of the sliding top plate (side-to-side) (see FIG. 1C).

In one non-limiting configuration best seen in FIG. 1C, the adjustment mechanism 108 is supported on two opposing sides 112A and 112B of the base frame 110. Moreover, the adjustment mechanism 108 is mounted to the one or more side sections 112 of the base frame 110 such that the adjustment mechanism is generally disposed below a bottom or lower surface 114 of the sliding top plate 102. In this regard, the adjustment mechanism 108 is operably connected to the lower surface 114 of the sliding top plate 102 such that the sliding top plate can move linearly relative to the flat plane defined by the upper surface 104.

In order to facilitate assembly of the components of the saw slide 100, the base frame 110 is formed with or otherwise provides one or more mounting features 116, such as but not limited to direct fastening bolts/screws, brackets, etc., which help secure the sliding top plate 102 and adjustment mechanism 108 to the base frame. As shown in the embodiment of FIGS. 1A-1D, the one or more mounting features 116 include slots or channels, such as but not limited to T-shaped channels, C-shaped channels, L-shaped channels, and U-shaped channels, on each face of the base frame 110 which generally extend along the length of each side section 112. The channels 116 are generally configured to receive associated fasteners (not shown) having one end which fits within the channels and an opposite end which connects to a component or feature which is mounted to or part of the base frame 110. Moreover, the one or more mounting features 116 and associated fasteners can also be used to mount the entire saw slide device (including sliding top plate 102, adjustment mechanism 108, and base frame 110) to an associated table or stand as described in further detail below.

In order to provide smooth and easy movement or alignment of the sliding top plate 102, one or more friction reducing elements 118 can be mounted between the base frame 110 and the bottom surface 114 of the sliding top plate 102. The friction reducing elements 118, including low friction slides or spacers, can be made of, but not limited to, nylon, plastic, metal, aluminum or other material to provide relatively smooth and controlled sliding of the sliding top plate. For example, as best seen in FIG. 1B, first and second low friction slides or spacers 118A and 118B are included to provide a bearing surface which allows the sliding top plate 102 to easily slide in the desired direction. The low friction spacers 118 can optionally be mounted to the base frame 110 via the one or more mounting features 116 to provide a bearing surface between the bottom surface 114 of the sliding top plate 102 and the base frame. Alternatively, the low friction spacers 118 can be mounted to the bottom surface 114 of the sliding top plate 102.

Moreover, as best seen in FIGS. 1A and 1B, the saw slide device 100 can further include a locking mechanism 120 configured to restrict unintended movement of the sliding top plate 102 relative to the base frame 110 while operating a mounted saw and/or transporting the saw device. The locking mechanism 120 is optionally mounted to the base frame 110 via the one or more mounting features 116, as previously described. The locking mechanism 120 generally includes a rotatable knob 122, or other handle, crank, lever, etc., configured to operatively engage a portion of the base frame 110 such that an L-shaped brace 124 of the locking mechanism exerts a clamping force between the sliding top plate 102 and base frame 110, thereby restricting movement of the sliding top plate relative to the frame.

In the embodiment illustrated in FIGS. 1A-1D, the adjustment mechanism 108 is made of at least one gear rack 150 and pinion gear 152 which enables the side-to-side or longitudinal movement of the sliding top plate 102 and associated saw supported thereon. The gear rack 150 is generally mounted to the lower surface 114 of the sliding top plate 102 at any desired location which permits operative engagement with the pinion gear 152. As best seen in FIG. 1C, an embodiment is illustrated where a single gear rack 150 is installed along a middle portion of the lower surface 114 of the sliding top plate 102. However, the installation location for the gear rack 150 is not limited to a specific portion of the lower surface of the sliding top plate. A gear shaft 154 with a first end 154A and an opposing second end 154B is also included as part of the adjustment mechanism 108. The pinion gear 152 is fixed on the shaft 154 between ends 154A and 154B at a location corresponding with the installation location of the gear rack 150. That is, the pinion gear 152 is mounted on the gear shaft 154 to be operatively engaged with the rack 150. An optional knob 156 fixed to the first end 154A is provided which permits a user of the saw slide device 100 to easily rotate the gear shaft 154 and pinion gear 152 to move (i.e. slide, adjust or align) the top plate 102. In this regard, at least one end of the shaft (here, first end 154A) extends through at least a portion of one side (here, side 112A) of base frame 110, such that knob 156 is easily accessible from outside the base frame 110. As shown in FIG. 1C, the opposite end 154B of the shaft 154 is generally supported on an opposite side (here, side 112B) of the base frame 110 in a manner similar to shaft end 154A. While the rack and pinion arrangement shown in FIGS. 1A-1C is located within the interior region of the base frame, other variations include, but are not limited to, the gear rack and pinion gears located at or near the periphery of the base frame/sliding top plate, incorporated/integrated into at least one of the base frame and sliding top plate, and located near an external surface of the periphery of the base frame/sliding top plate.

The adjustment mechanism 108 can also include at least one bearing 158 optionally mounted to the base frame 110 and being configured to support a load exerted by the shaft 154 (e.g., radial load, axial load, thrust load, moment load, or a combination thereof). The at least one bearing 158 also reduces rotational friction between the gear shaft 154 and base frame 110, thereby making it easier for a user to rotate the shaft and pinion gear 152 via knob 156. While the gear shaft 154 of the embodiment illustrated in FIGS. 1A-1D extends across the entire width W of sliding top plate 102, it is also feasible that the gear shaft be configured to extend across only a portion of the sliding top plate. In such embodiments, the second shaft end 154B could be supported by a different component of the saw slide device 100. Alternatively, the pinion gear 152 could be fixed to the second end 154B of the shaft. Such a configuration may be desired for smaller-sized saw slide devices which do not need to support the heavier loads associated with larger-sized devices.

Due to the operative engagement of the rack 150 and pinion gear 152, rotational movement of the gear shaft 154 about fixed axis X causes the sliding top plate 102 to move linearly on a straight path as indicated by the arrows in FIG. 1A. In FIG. 1D, where the rack 150 and pinion gear 152 are illustrated separately from the remaining components of the saw slide device 100 to show how the rack and pinion gears are operatively engaged. In particular, the gear rack 150 includes a plurality of teeth 160 which mesh with a corresponding plurality of teeth 162 on the pinion gear 152, such that rotary motion of the pinion gear converts to linear motion as is commonly known in the art. Accordingly, the adjustment mechanism 108 of the saw slide device 100, and more particularly the gear rack 150 and pinion gear 152, advantageously provide for precise, incremental, and independent movement of the sliding top plate 102 and associated saw, relative to the base frame space 110, in order to finely tune the position and alignment of the saw blade in preparation for cutting of an associated workpiece which remains stationary as the sliding top plate and saw/saw blade are adjusted/aligned.

According to one exemplary embodiment, an example primary component material description/dimension(s) list is provided below:

FIGS. 1A-1D; Example Single Rack and Pinion Embodiment Primary Component Material Description/Dimension(s)

| Ref. Character | Material Description/Dimension(s) |
| --- | --- |
| 102 | 26" × 16" × 3/16" Aluminum Plate |
| L | 26" |
| W | 16" |
| 112A | 26" × 2" × 1/8" Aluminum Channel |
| 112B | 26" × 2" × 1/8" Aluminum Channel |
| 112C | 15¾" × 1" × 1" T-Slot Aluminum; MCMASTER-CARR 47065T101 |
| 112D | 15¾" × 1" × 1" T-Slot Aluminum; MCMASTER-CARR 47065T101 |

FIGS. 1A-1D; Example Single Rack and Pinion Embodiment Primary Component Material Description/Dimension(s)

| Ref. Character | Material Description/Dimension(s) |
| --- | --- |
| 118A | 24" × 1" × ½" DELRIN Glides; MCMASTER-CARR 8702K83 |
| 118B | 24" × 1" × ½" DELRIN Glides; MCMASTER-CARR 8702K83 |
| | Primary Components of the adjustment/alignment mechanism 108 |
| 150 | 8" × ½" × ½" Metal Gear Rack—20 degree pressure angle, rectangular, 24 pitch; MCMASTER-CARR 7854K15 |
| 152 | Metal Pinion Gear for ½" shaft—20 degree pressure angle, round bore, 24 pitch, 24 teeth; MCMASTER-CARR 6832K62 |
| 154 | 16" × ½" Aluminum Shaft |
| 156 | Stainless Steel Knob for ½" Shaft; MCMASTER-CARR 60205K58 |
| 158 | ½" Dry Running Bearings; MCMASTER-CARR 6389K446 |

Figure 2A:
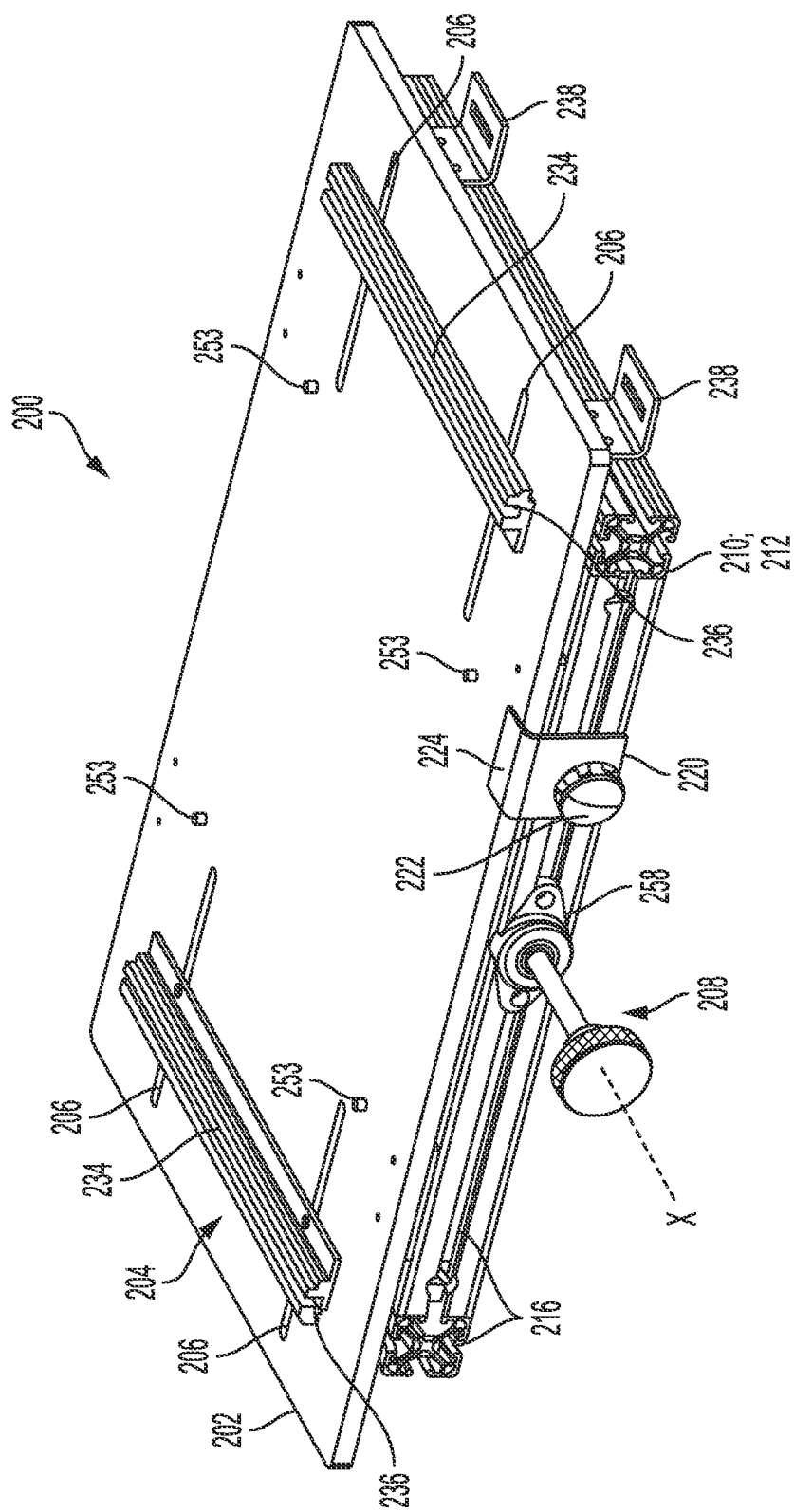
FIG. 2A is a perspective view of a saw slide according to another exemplary embodiment of the present disclosure, the saw slide including a dual rack and pinion gear side-to-side adjustment/alignment mechanism for aligning a mounted miter saw to crosscut a workpiece, and adjustable brace/bracket members to mount a miter saw to the saw slide.
Figure 2B:
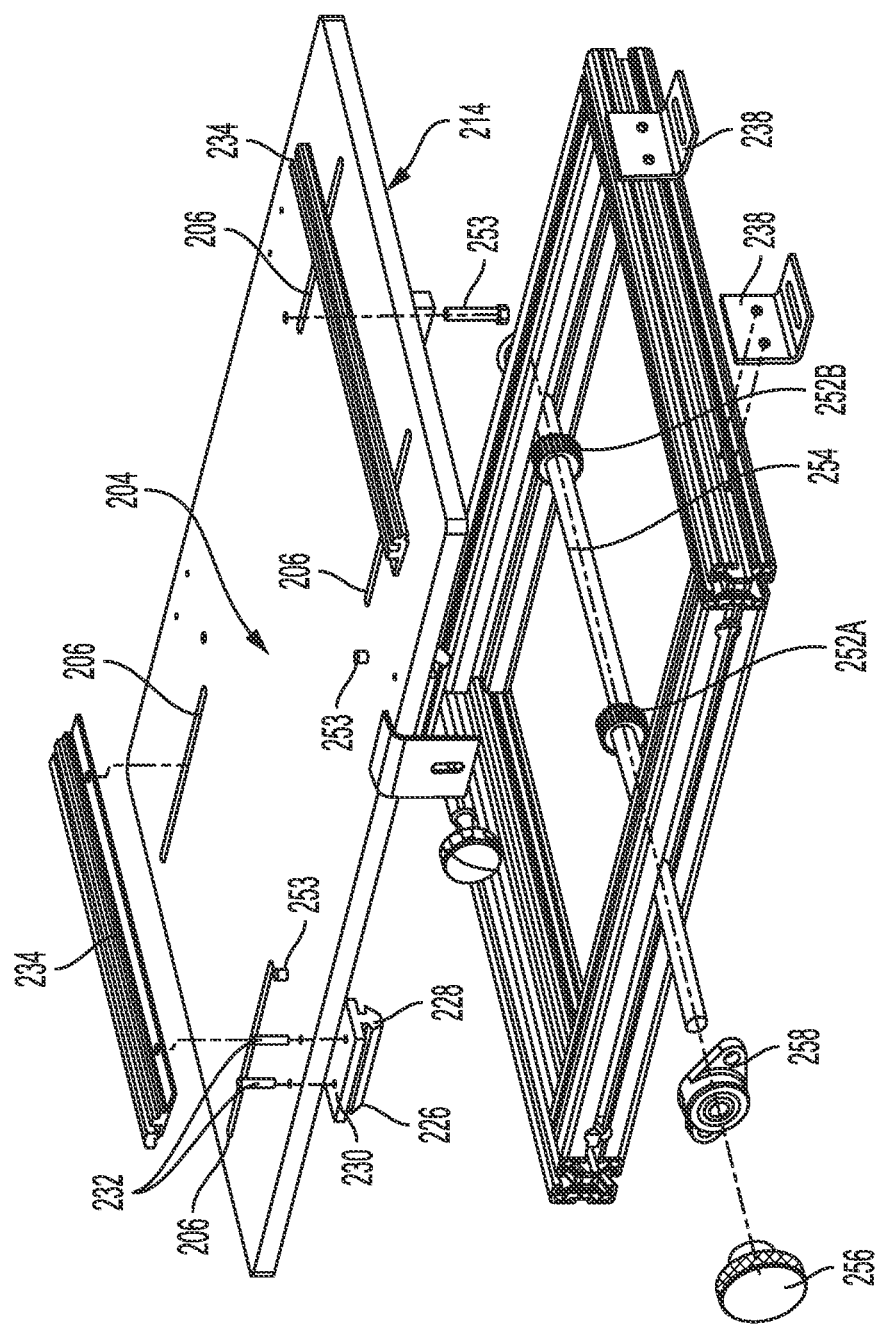
FIG. 2B is an exploded assembly view of the saw slide shown in FIG. 2A.
Figure 2C:
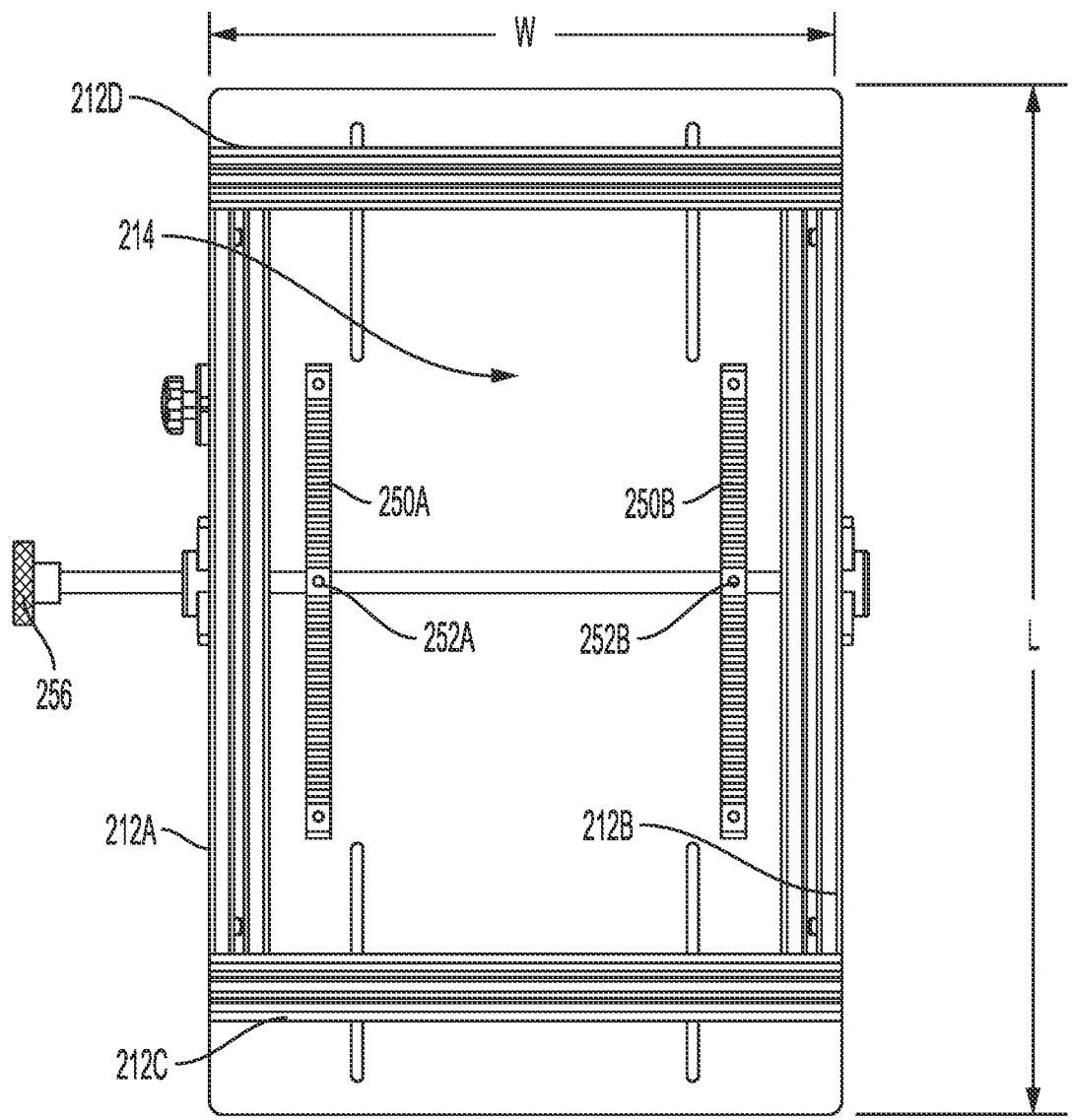
FIG. 2C is a bottom view of the saw slide shown in FIG. 2A including the exemplary dual rack and pinion gear side-to-side adjustment/alignment mechanism to traverse a top miter saw mount member plate from a first location to a second location to align a mounted miter saw to crosscut a workpiece.
Figure 2D:
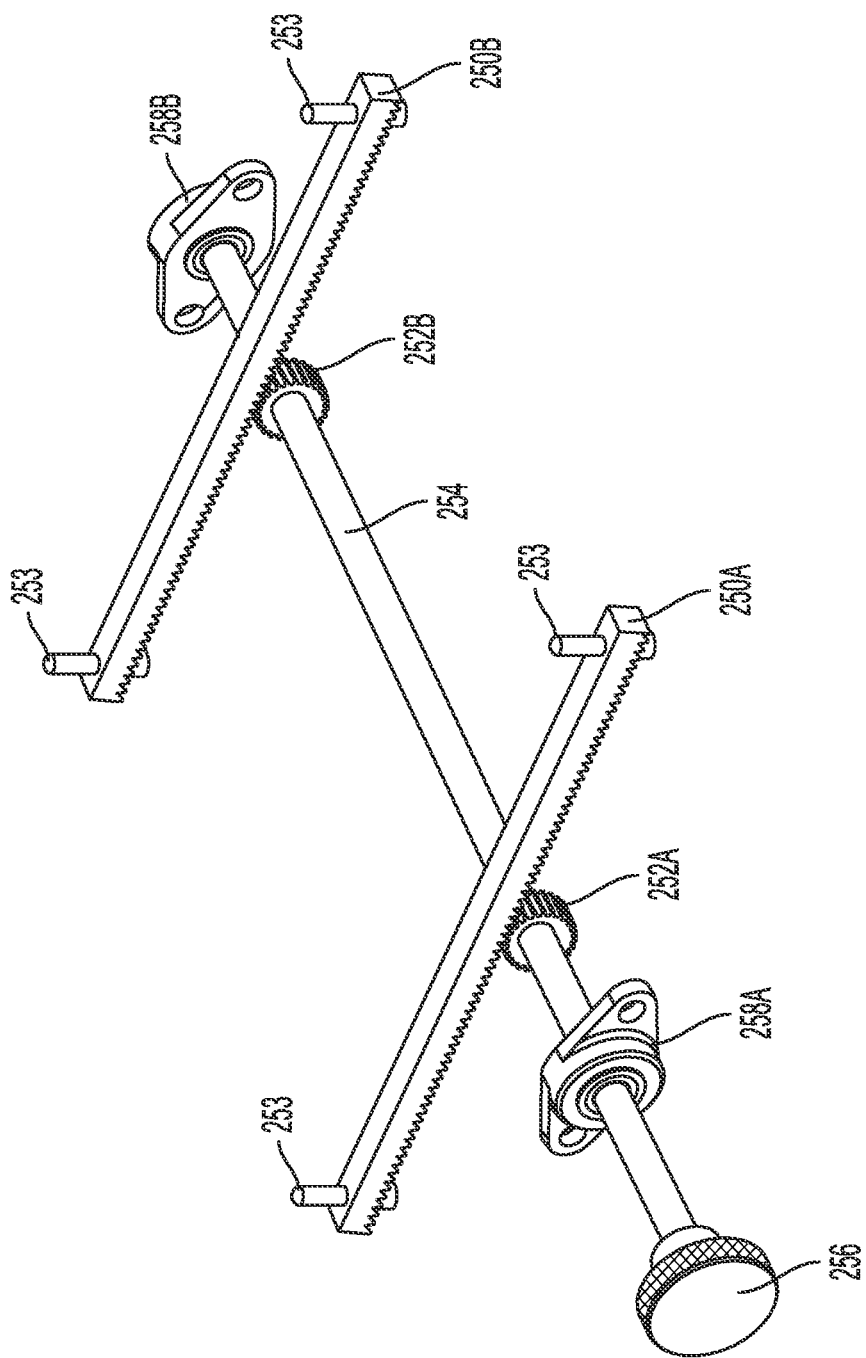
FIG. 2D is a detailed perspective view of the saw slide shown in FIG. 2A including the exemplary dual rack and pinion gear side-to-side adjustment/alignment mechanism to traverse a top miter saw mount member plate from a first location to a second location to align a mounted miter saw to crosscut a workpiece.

Referring now to FIGS. 2A-2D, FIG. 2A is a perspective view of a saw slide according to another exemplary embodiment of the present disclosure, the saw slide including a dual rack and pinion gear side-to-side adjustment/alignment mechanism for aligning a mounted miter saw to crosscut a workpiece, and adjustable brace/bracket members to mount a miter saw to the saw slide; FIG. 2B is an exploded assembly view of the saw slide shown in FIG. 2A; FIG. 2C is a bottom view of the saw slide shown in FIG. 2A including the exemplary dual rack and pinion gear side-to-side adjustment/alignment mechanism to traverse a top miter saw mount member plate from a first location to a second location to align a mounted miter saw to crosscut a workpiece; and FIG. 2D is a detailed perspective view of the saw slide shown in FIG. 2A including the exemplary dual rack and pinion gear side-to-side adjustment/alignment mechanism to traverse a top miter saw mount member plate from a first location to a second location to align a mounted miter saw to crosscut a workpiece.

The saw slide device 200 is for operative use with an associated saw and/or an associated saw stand (not shown). The saw slide device 200 is similar to and operates in substantially the same manner as saw slide 100 described above. Accordingly, the saw slide 200 includes a sliding plate 202 which is generally disposed between the saw and saw stand. An upper or top surface 204 defines a generally flat, horizontal plane on which the saw sits on or is otherwise mounted thereto. One or more fastening features 206 are included which help secure the saw to the sliding top plate. An adjustment mechanism 208 of the saw slide 200 is operably connected to a lower surface 214 of sliding top plate 202 such that the adjustment mechanism is configured to move the sliding top plate and associated saw supported thereon linearly along a flat plane defined by the upper surface 104 of the sliding top plate. A support or base frame 210 is located under the sliding top plate 202, and the sliding top plate is movably attached to or otherwise supported on the base frame. In addition, at least a portion of the adjustment mechanism 208 is mounted to or otherwise supported on at least a portion of the base frame 210. More particularly, the adjustment mechanism 208 is generally supported on at least one side section 212 of the base frame 210, for example 212A, 212B, 212C and/or 212D.

The sliding top plate 202, adjustment mechanism 208 and base frame 210 are thus arranged and configured similar to the corresponding components of saw slide device 100, such that operator control of the adjustment mechanism causes the sliding top plate and associated saw supported thereon to slide along the base frame, while the base frame maintains a fixed position relative to the moving plate. Furthermore, similar to saw slide device 100, the base frame 210 has one or more slots or channels 216 on each face of the base frame 210 which generally extend along the length of each side 212. The channels 216 are generally configured to receive associated fasteners having one end which fits within the channels and an opposite end which connects to the component which will be mounted to the base frame 210. Moreover, saw slide device 200 also includes a locking mechanism 220 which is similar to and operates in substantially the same manner as locking mechanism 120 of saw slide device 100. Thus, locking mechanism 220 includes a rotatable knob 222 configured to operatively engage a portion of the base frame 210 such that an L-shaped brace 224 of the locking mechanism exerts a clamping force between the sliding top plate 202 and base frame 210, thereby restricting movement of the sliding top plate relative to the frame.

One difference between saw slide device 200 and saw slide device 100 illustrated in FIG. 2B is, here, the channels 216 of the base frame 210 which face the lower surface 214 of sliding top plate 202 are configured to receive one or more drop-in fasteners or guide rails 226. One end of the drop-in guide rails 226 is formed with a flange 228 configured for sliding engagement with the channels 216 of the base frame 210. The opposite end of the drop-in guide rails 226 is formed with a flat 230 which abuts bottom surface 214 when mounted to sliding top plate 202 via pins 232. In particular, the pins 232 can be fixed to the one or more fastening features 206 formed in sliding top plate 202. The flange end 228 of one or more guide rails 226 are placed directly into the channels 216 to provide a bearing surface with the base frame 210 such that sliding top plate 202 can easily slide along channels in the desired direction when moved by the adjustment mechanism 208. Accordingly, the one or more drop-in guide rails 226 can be used in place of the low friction spacers 118 from the saw slide device 100.

Another difference between saw slide device 200 and saw slide device 100 can be seen with reference to FIGS. 2A and 2B. In particular, the saw slide device 200 includes one or more adjustable braces 234 mounted on the upper surface 214 of the sliding top plate 202. The adjustable braces 234 are mounted to the sliding top plate 202 through use of the fastening features 206 mentioned above. As best seen in FIG. 2B, the fastening features 206 of the present embodiment are fastening slots that extend all the way through sliding top plate 202, from the upper surface 204 to the lower surface 214. The fastening slots 206 are formed in general alignment with channels 216 which face the lower surface 214 of the sliding top plate 202 and which are located on sides 212A and 212B of the base frame 210. As such, the same pins 232 used to mount guide rails 226 to the bottom surface 214 of the sliding top plate can be configured to extend up through fastening slots 206 and above upper surface 204 for attachment to the adjustable braces 234. Moreover, adjustable braces 234 can be provided with one or more channels 236 which, similar to channels 216 of the base frame 210, are generally configured to receive associated fasteners (not shown) having one end which fits within the adjustable brace channels and an opposite end which connects to the associated saw.

The saw slide device 200 illustrated in FIGS. 2A-2D can further include one or more L-brackets 238 fastened to the channels 216 of base frame 210 as previously discussed. The L-brackets 238 are configured to mount the entire saw slide device 200 (including sliding top plate 202, adjustment mechanism 208, and base frame 210) to an associated table or stand as discussed in further detail below.

A final exemplary difference between saw slide devices 100 and 200, as best illustrated in FIGS. 2C-2D, relates to the adjustment mechanism 208. In particular, the adjustment mechanism 208 includes a dual rack and pinion gear setup compared to the single rack and pinion gear arrangement of adjustment mechanism 108. Thus, adjustment mechanism 208 has a first gear rack 250A and pinion gear 252A and a second gear rack 250B and pinion gear 252B which enable the sliding movement of the plate 202 and associated saw supported thereon. As best seen in FIG. 2C, first and second gear racks 250A and 250B are mounted with gear rack fasteners 253 to the lower surface 214 of sliding top plate 202 in a spaced apart relation such that first gear rack 250A is disposed adjacent first side 212A of the base frame 210 and second gear rack 250B is disposed adjacent the second side 212B. However, like adjustment mechanism 108, only one gear shaft 254 is required. Both the first and second pinion gears 252A and 252B are fixed to the shaft 254 for operative engagement with associated gear racks 250A and 250B, respectively. Moreover, a knob 256 and one or more shaft bearings 258A and 258B can also be provided similar to saw slide device 100.

The dual rack and pinion gear configuration of adjustment mechanism 208 may be desired for large-sized saw slide devices which are generally required to support heavier loads exerted by larger-sized associated saws. Otherwise, the dual rack and pinion gear arrangement of adjustment mechanism 208 operates in substantially the same manner as the single gear rack arrangement of adjustment mechanism 108. Accordingly, the adjustment mechanism 208 of the saw slide device 200, and more particularly the dual gear racks 250A/250B and pinion gear 252A/252B, advantageously provide for precise, incremental, and independent movement of the sliding top plate 202 and associated saw in order to finely tune the position and alignment of the saw blade in preparation for cutting an associated workpiece.

Figure 3A:
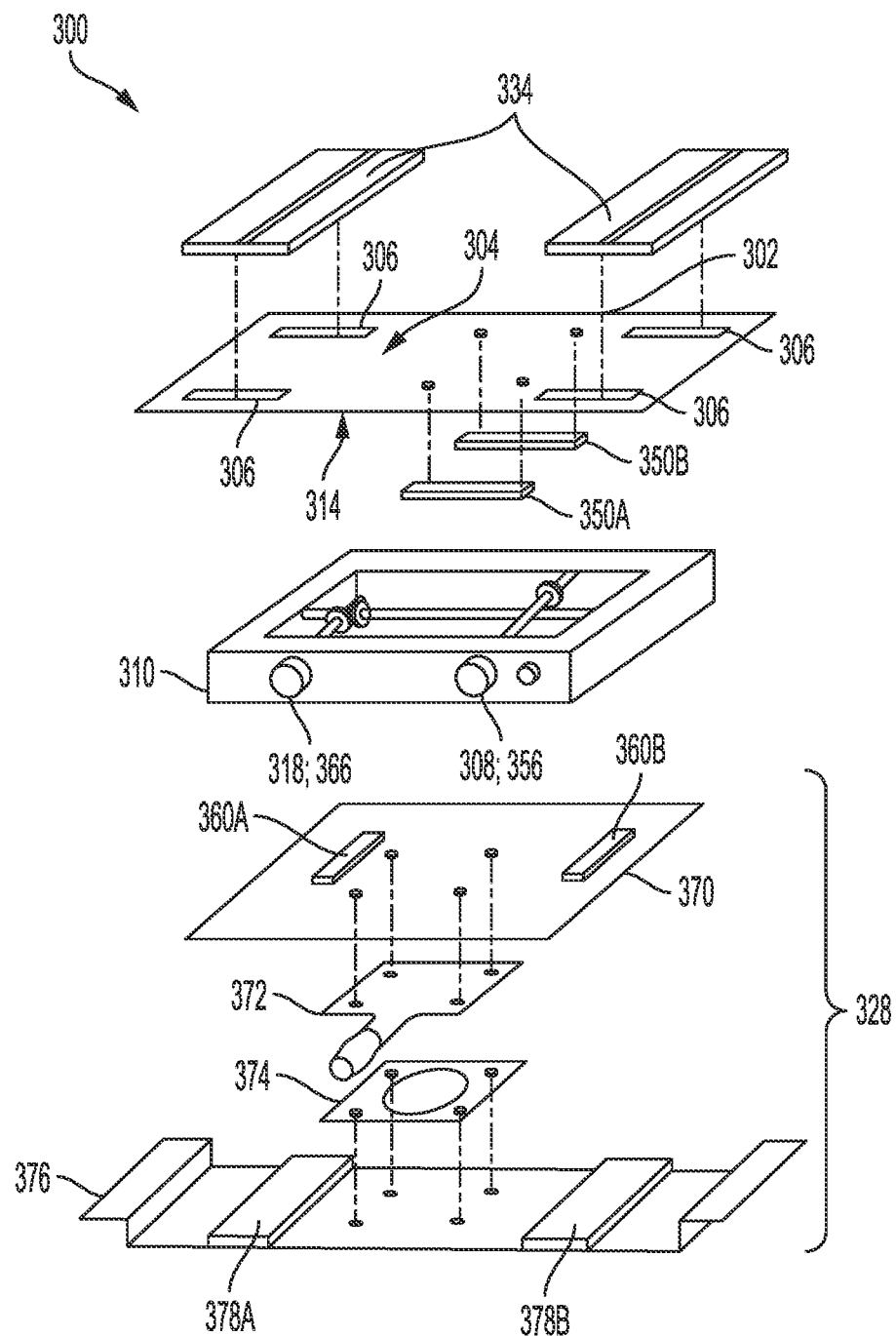
FIG. 3A is an exploded assembly view of a saw slide according to another exemplary embodiment of the present disclosure, the saw slide including a dual rack and pinion gear side-to-side adjustment/alignment mechanism for side-to-side alignment of a miter saw mount member/top plate; a combination bevel gear, rack and pinion gear adjustment/alignment mechanism for front-to-rear alignment of the miter saw mount member/top plate; and a swivel platform assembly.
Figure 3B:
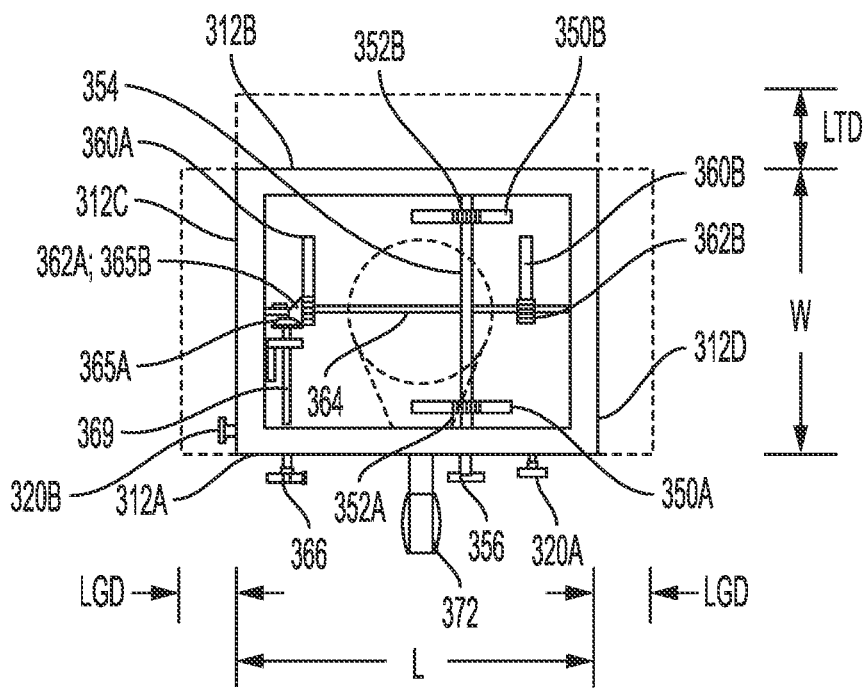
FIG. 3B is a top view of the saw slide shown in FIG. 3A.
Figure 3C:
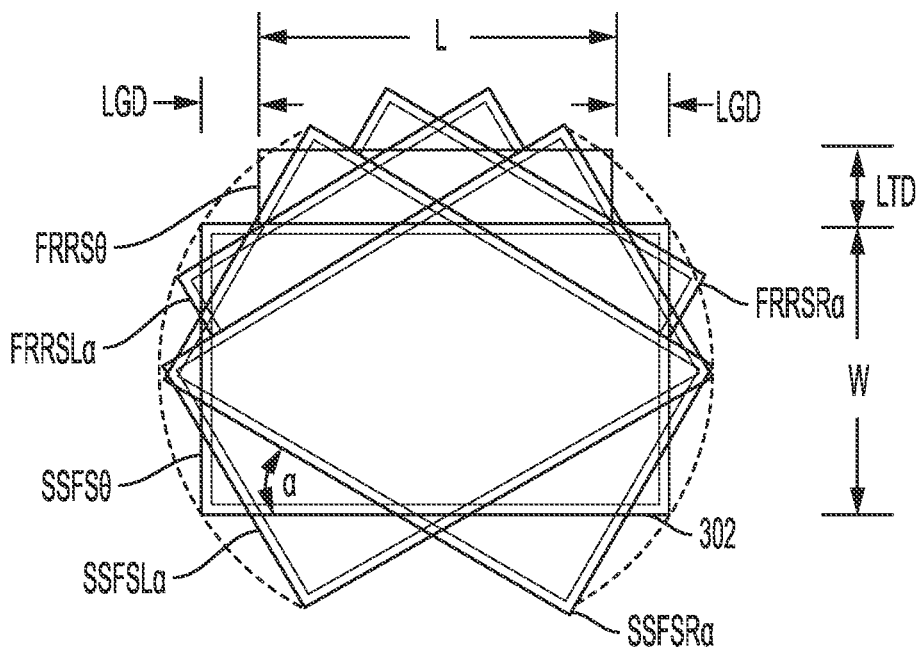
FIG. 3C is a top view of the base frame and adjustment/alignment mechanism associated with the saw slide shown in FIG. 3A including a diagram representative of the range of motion of the sliding plate according to an exemplary embodiment of this disclosure.
Figure 5:
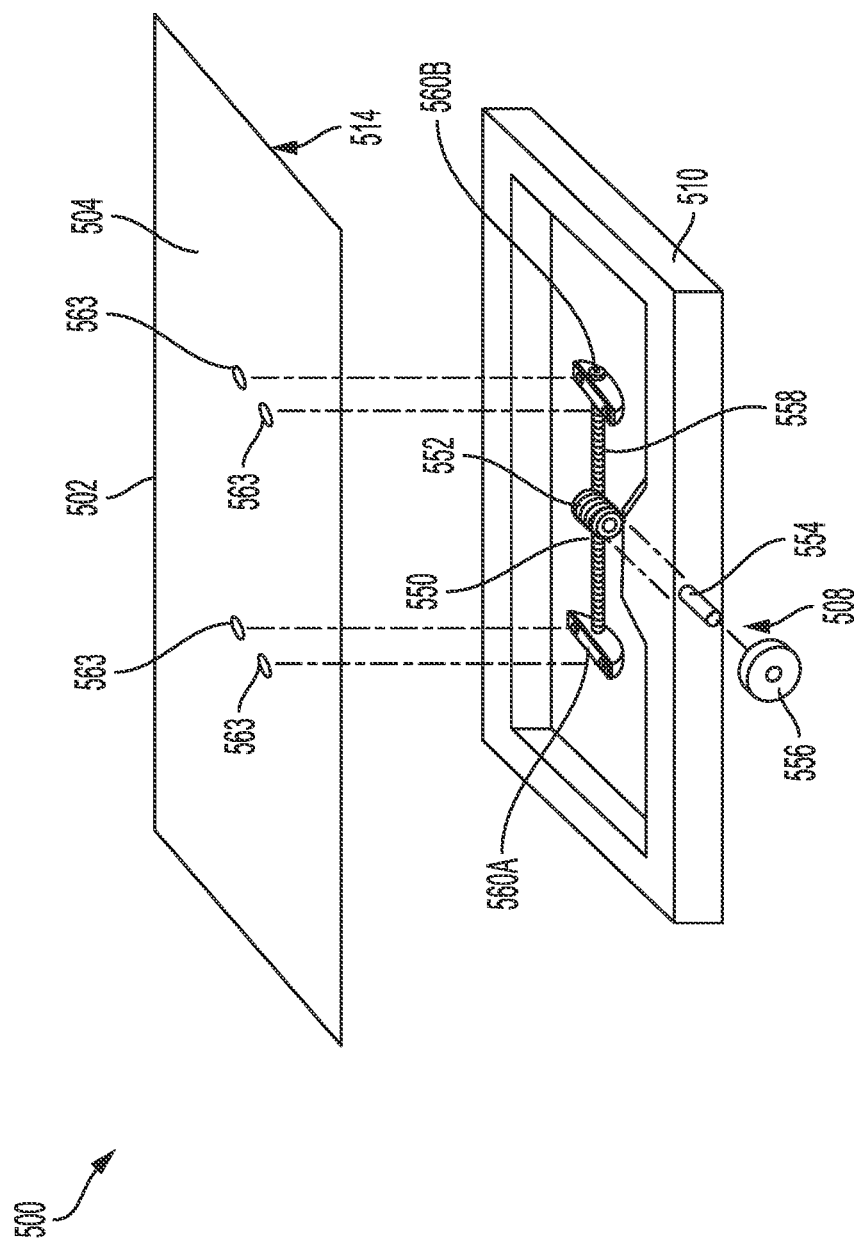
FIG. 5 is an exploded assembly view of a saw slide according to another exemplary embodiment of this disclosure, the saw slide including another exemplary worm gear drive arrangement for side-to-side alignment of a miter saw mount member/top plate.
Figure 8A:
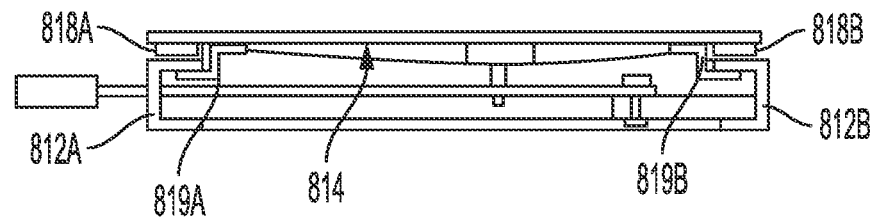
FIG. 8A is a side sectional view of a saw slide according to an exemplary embodiment of the present disclosure, the saw slide including C-shaped base frame sections, Z-shaped low friction slides/spacers operatively associated with the C-shaped base frame sections and a slotted lever/handlebar mechanism for side-to-side alignment of a miter saw mount member/top plate.
Figure 8B:
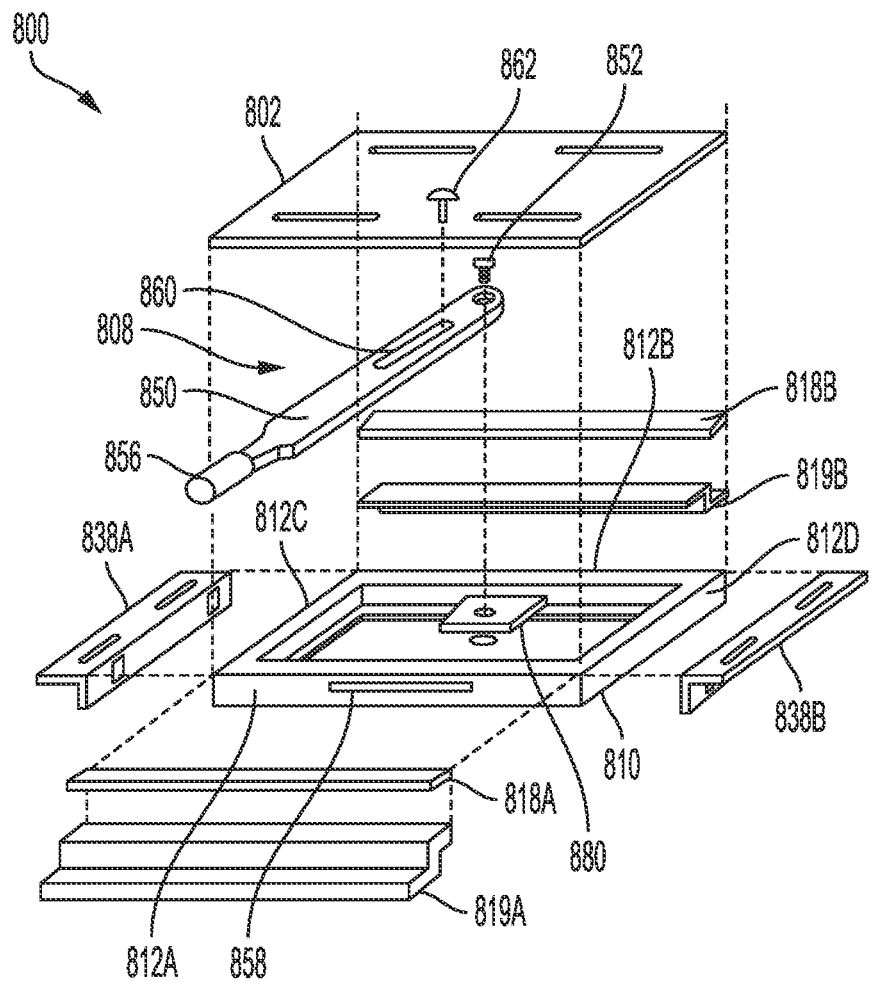
FIG. 8B is an exploded view of the saw slide shown in FIG. 8A.
Figure 9:
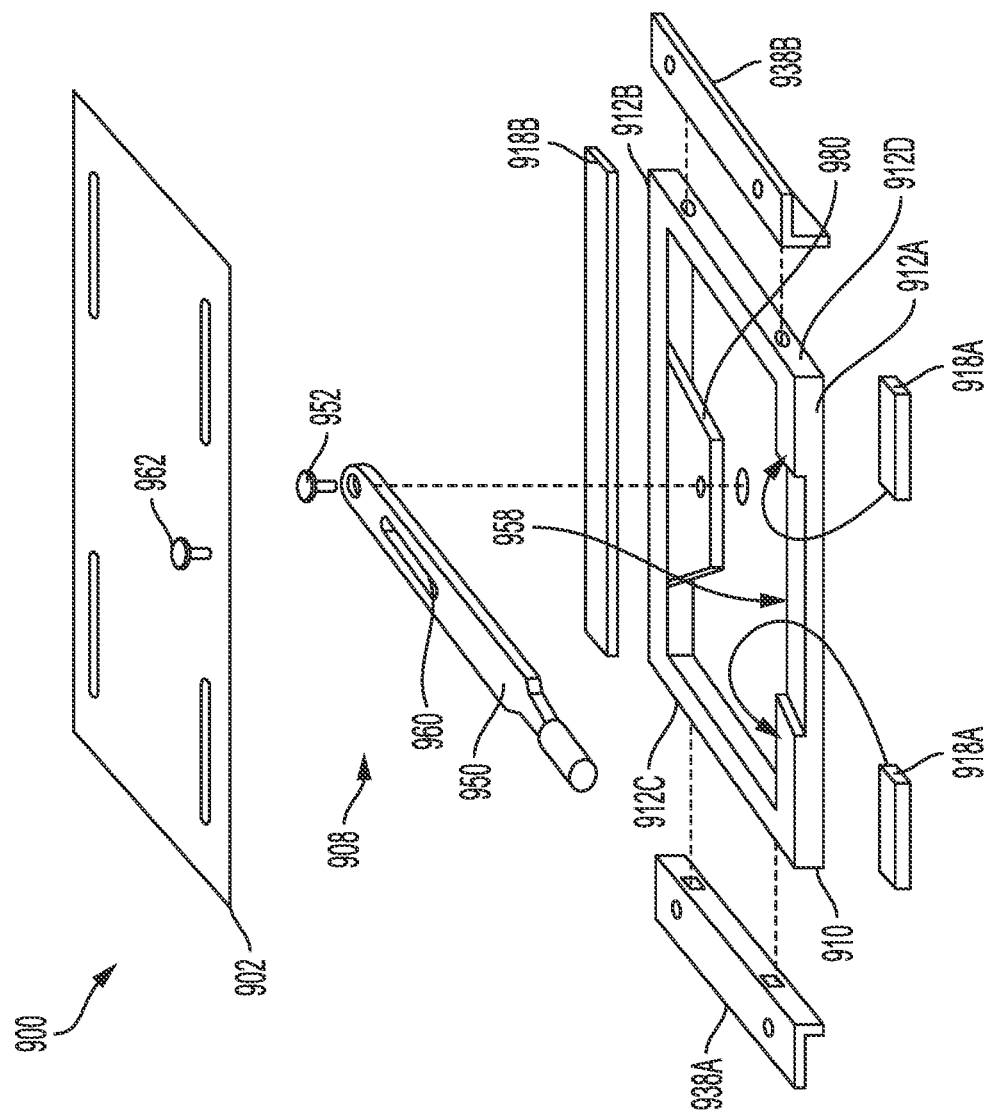
FIG. 9 is an exploded assembly view of a saw slide according to another exemplary embodiment of the present disclosure, the saw slide including base frame sections, low friction slides/spacers operatively associated with the base frame sections and a slotted lever/handlebar mechanism for side-to-side alignment of a miter saw mount member/top plate.
Figure 10A:
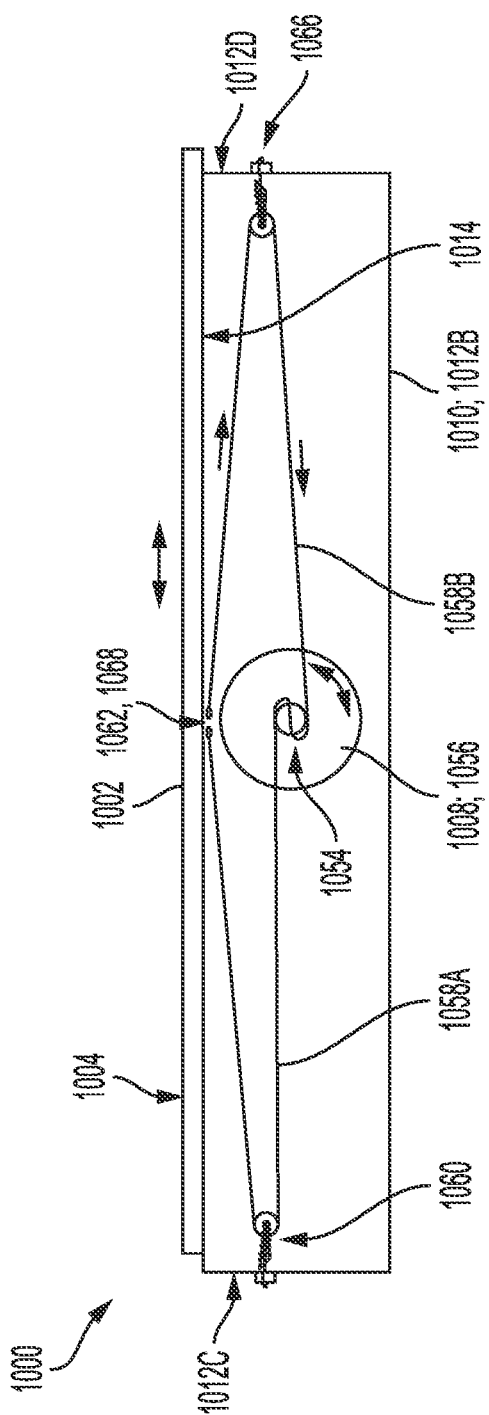
FIG. 10A is a side sectional view of a saw slide according to another exemplary embodiment of the present disclosure, the saw slide including a cable pully system for side-to-side alignment of a miter saw mount member/top plate.
Figure 10B:
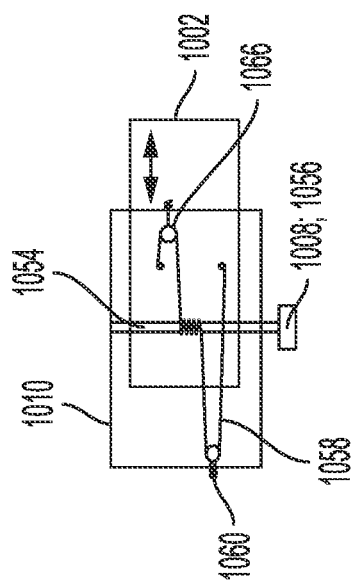
FIG. 10B is a top view of the saw slide shown in FIG. 10A including additional detail of the cable pulley system according to an exemplary embodiment of this disclosure, the detail representing the cable pulley system operation to provide a side-to-side alignment or movement of the miter saw mount member/top plate to the left.
Figure 10C:
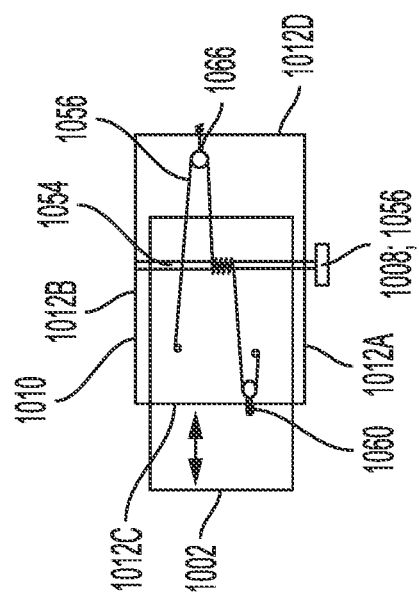
FIG. 10C is a top view of the saw slide shown in FIG. 10A including additional detail of the cable pulley system according to an exemplary embodiment of this disclosure, the detail representing the cable pulley system operation to provide a side-to-side alignment or movement of the miter saw mount member/top plate to the right.
Figure 11A:
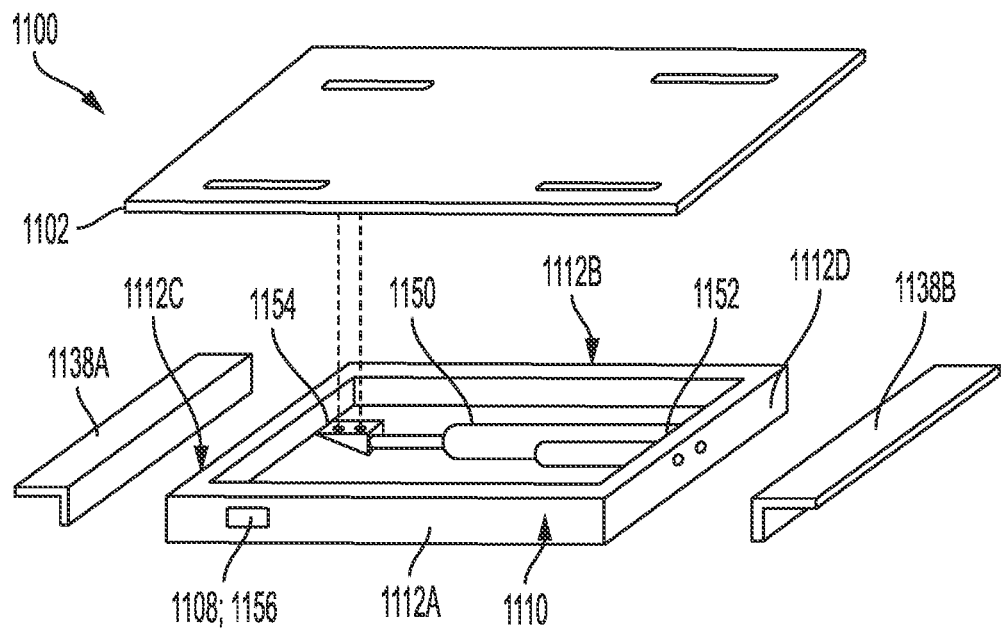
FIG. 11A is an exploded assembly view of a saw slide according to another exemplary embodiment of the present disclosure, the saw slide including a linear actuator for side-to-side alignment of a miter saw mount member/top plate.
Figure 11B:
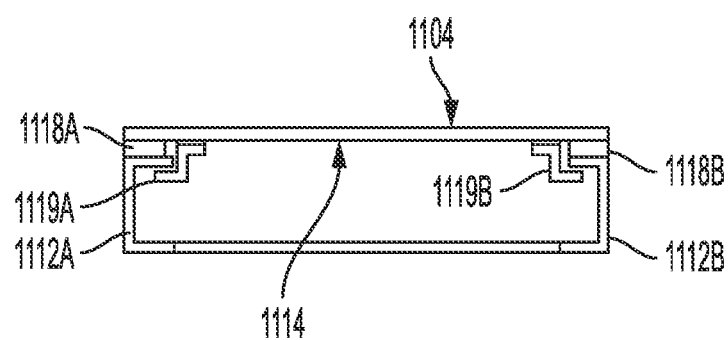
FIG. 11B is a side sectional view of the saw slide shown in FIG. 11A, the side sectional view also showing C-shaped base frame sections, and Z-shaped low friction slides/spacers operatively associated with the C-shaped base frame sections for side-to-side alignment of a miter saw mount member/top plate.

Additional embodiments directed to the adjustment mechanism of the saw slide devices disclosed herein will now be described with reference to FIGS. 3-11. In particular, FIGS. 3A-3C show a saw slide device 300 made in accordance with the present disclosure which has an adjustment mechanism configured to permit travel of the sliding plate in two or more directions. FIGS. 4A-4C show a saw slide device 400 made in accordance with the present disclosure which has an adjustment mechanism including a first embodiment of a worm gear drive configured to linearly move the sliding plate. FIG. 5 shows a saw slide device 500 made in accordance with the present disclosure which has an adjustment mechanism including a second embodiment of a worm gear drive. FIGS. 6A-6F show a saw slide device 600 made in accordance with the present disclosure which has an adjustment mechanism utilizing a scissor-jack drive to linearly move the sliding plate. FIGS. 7A-7D show a saw slide device 700 made in accordance with the present disclosure which has an adjustment mechanism including a first embodiment of a lever/handlebar configured to linearly move the sliding plate. FIGS. 8A-8B show a saw slide device 800 made in accordance with the present disclosure which has an adjustment mechanism including a second lever/handlebar embodiment. FIG. 9 shows a saw slide device 900 made in accordance with the present disclosure which has an adjustment mechanism including a third lever/handlebar embodiment. FIGS. 10A-10C show a saw slide device 1000 made in accordance with the present disclosure which has an adjustment mechanism utilizing a cable and pulley drive to linearly move the sliding plate. Finally, FIGS. 11A-11B show a saw slide device 1100 made in accordance with the present disclosure which has an adjustment mechanism utilizing a linear actuator to move the sliding plate.

Turning now to FIGS. 3A-3C, FIG. 3A is an exploded assembly view of a saw slide according to another exemplary embodiment of the present disclosure, the saw slide including a dual rack and pinion gear side-to-side adjustment/alignment mechanism for side-to-side alignment of a miter saw mount member/top plate; a combination bevel gear, rack and pinion gear adjustment/alignment mechanism for front-to-rear alignment of the miter saw mount member/top plate; and a swivel platform assembly; FIG. 3B is a top view of the saw slide base frame and adjustment/alignment mechanism shown in FIG. 3A; and FIG. 3C is a top view of the saw slide shown in FIG. 3A including a diagram representative of the range of motion of the sliding plate according to an exemplary embodiment of this disclosure.

The saw slide device 300 shown has an adjustment mechanism configured to permit travel of the sliding plate in two or more directions. Initially, it is noted that saw slide device 300 includes components which are similar to and operate in substantially the same manner as previously described saw slide devices of the present disclosure. These components include but are not necessarily limited to: a sliding plate 302 with an upper surface 304 and a lower surface 314; one or more fastening features 306 which help secure an associated saw to the sliding plate; base frame 310 having side sections 312 including four sides 312A, 312B, 312C and 312D; and, adjustable braces 334 for securely mounting the associated saw to the sliding top plate 302.

While some aspects of the adjustment mechanism of saw slide device 300 are similar to the exemplary adjustment mechanisms of other devices disclosed herein, there are also some differences. Similar to the adjustment mechanism 208 of saw slide device 200 described above, saw slide device 300 includes an adjustment mechanism 308 which utilizes a dual-rack and pinion gear arrangement including first and second gear racks 350A/350B, pinion gears 352A/352B, and associated gear shaft 354 to enable linear movement of the sliding top plate 302 in one direction along the flat plane defined by the upper surface 304 of the sliding top plate. Operator control knob 356 provides for rotation of the pinion gear shaft 354 for side-to-side movement of the saw slide top plate 302.

However, the saw slide device 300 also includes two other adjustment mechanisms which enable movement of the sliding top plate 302 in different directions. The first supplemental adjustment mechanism 318 is a bevel gear assembly, or alternatively a flexible shaft assembly (not shown), configured to enable the sliding top plate 302 and associated saw supported thereon to slide along the base frame 310 in a direction opposite to the direction enabled by the rack and pinion gear arrangement of adjustment mechanism 308. In other words, adjustment mechanism 308 enables linear movement of the sliding top plate 302 in a longitudinal direction while bevel gear assembly enables linear movement of the sliding top plate in an opposite, lateral direction. In addition, locking members 320A and 320B provide operator controlled saw slide locking or clamping of the sliding top plate to prevent movement of the sliding top plate during saw operation and/or transport.

In some embodiments, the longitudinal distance LGD which sliding top plate 302 can travel via adjustment mechanism 308 is about 3 inches in either direction, as shown in FIG. 3B. The lateral distance LTD which sliding top plate 302 can travel via bevel gear assembly is about 4 inches in the direction shown in FIG. 3B. Moreover, the sliding plate 302 can have a length L of about 26 inches and a width W of about 16 inches. It is to be understood that the disclosed embodiments are not limited to these travel/adjustment distances and slide plate dimensions. For example, lateral and longitudinal adjustment distances can be 1-12 inches or more, and the sliding top plate can have a length of 12-36 inches or more, and a width of 12-36 inches or more.

The bevel gear assembly is mounted to or otherwise supported by the base frame 310 in a manner similar to adjustment mechanism 308. The bevel gear assembly generally includes a first bevel gear shaft 369 supported by the base frame 310 in an orientation parallel to sides 312C/312D and parallel to gear shaft 354 of adjustment assembly 308. A first bevel gear 365A is fixed to the end of shaft 369 which is disposed within the base frame 310 and the opposite end of the bevel gear shaft is accessibly from outside the base frame. A second bevel and pinion gear shaft 364 is oriented perpendicular to first bevel gear shaft 369 and includes a second bevel gear 365B fixed thereto such that the second bevel gear operatively engages first bevel gear 365A. The second bevel and pinion gear shaft 364 further includes a first pinion gear 362A fixed thereto at a location generally adjacent to second bevel gear 365B and a second pinion gear 362B at a location generally adjacent to side 312D of the base frame 310. The first and second pinion gears 362A/362B operatively engage corresponding gear racks 360A and 360B mounted to bottom surface 314 of the sliding top plate 302 (see FIG. 3B). Thus, the operative connections between the first bevel gear shaft 369, the first bevel gear 365A, the second bevel gear shaft 364, the second bevel gear 365B, the first and second pinion gears 362A and 362B, and the first and second gear racks 360A and 360B together provide for lateral and longitudinal linear movement of the sliding top plate 302 upon rotation of the first bevel and pinion gear shaft 364. Optionally, the bevel gear arrangement can be replaced with a 90 degree flexible shaft operatively coupled to the pinion gear shaft 364. Operator control knob 366 provides for rotation of the first bevel gear shaft for front-to-rear movement of the saw slide top plate 302.

The second supplemental adjustment mechanism is a swivel platform assembly 328 configured to enable the sliding top plate 302 and associated saw supported thereon to rotate about a vertical axis. The swivel platform assembly 328 is generally positioned beneath base frame 310 and sliding plate 302. In this regard, the swivel platform assembly 328 includes a lower carriage mount 376 configured to support the other components of the swivel platform assembly, as well as provide additional support for the base frame 310 and sliding plate 302. A ball bearing member 374 is mounted on top of the lower carriage mount 376, and a paddle 372 is mounted on top of the ball bearing member 374. The paddle 372 is generally configured to activate the swiveling motion of the swivel platform assembly by a user.

Next, a transfer plate 370 mounted on top of paddle 372 is included which is configured to engage at least a portion of base frame 310 such that the when the swiveling motion is controlled via the paddle, the base frame also swivels. In this regard, the transfer plate 370 can include one or more transfer blocks (not shown) mounted on top of the transfer plate 370 or fasteners (not shown) attaching the base frame 310 to the transfer plate 370.

Finally, the lower carriage mount 376 can include one or more spaced apart friction/support blocks 378A and 378B which are configured to support the transfer plate 370. More particularly, the paddle 372 can be at least partially disposed between the friction/support blocks 378A/378B when the swivel platform is fully assembled such that the paddle handle is prevented from swiveling past the friction/support blocks 378A/378B. In some particular embodiments, the lower carriage mount is configured to provide a swivel platform assembly 328 swiveling angle $\alpha$ of no more than about 15 to 45 degrees in either direction from the normal 90 degree orientation of the paddle with respect to the lower carriage mount 376. Preferably, the lower carriage mount is configured to provide a swivel platform assembly 328 swiveling angle $\alpha$ of no more than about 30 degrees in either direction.

With reference to FIG. 3C, shown is a diagram representative of the range of motion of the sliding top plate 302 and associated saw supported thereon according to an exemplary embodiment of this disclosure. The saw slide device 300 advantageously provides for a wide range of motion as indicated in the diagram, where SSFS0 (side-to-side front swivel 0 degrees) indicates the sliding top plate range of side-to-side travel with a swivel or rotation of 0 degrees with the top plate located at the front of the base frame, where the front-to-rear adjustment mechanism is adjusted to position the top plate saw slide at the front position limit of the front-to-rear adjustment mechanism; SSFSL$\alpha$ (side-to-side front swivel left $\alpha$ degrees) indicates the sliding top plate range of side-to-side travel with a left swivel or rotation of $\alpha$ degrees with the top plate located at the front of the base frame, where the front-to-rear adjustment mechanism is adjusted to position the top plate saw slide at the front position limit of the front-to-rear adjustment mechanism; SSFSR$\alpha$ (side-to-side front swivel right $\alpha$ degrees) indicates the sliding top plate range of side-to-side travel with a right swivel or rotation of $\alpha$ degrees with the top plate located at the front of the base frame, where the front-to-rear adjustment mechanism is adjusted to position the top plate saw slide at the front position limit of the front-to-rear adjustment mechanism; FRRS0 (front-to-rear rear swivel 0 degrees) indicates the sliding top plate range of front-to-rear travel with a swivel or rotation of 0 degrees with the top plate located at the nominal lateral centerline of the base frame, where the side-to-side adjustment mechanism is adjusted to position the top plate saw slide at the nominal side-to-side center position of the side-to-side adjustment mechanism; FRRSL$\alpha$ (front-to-rear rear swivel left $\alpha$ degrees) indicates the sliding top plate range of front-to-rear travel with a left swivel or rotation of $\alpha$ degrees with the top plate located at the nominal lateral centerline of the base frame, where the side-to-side adjustment mechanism is adjusted to position the top plate saw slide at the nominal side-to-side center position of the side-to-side adjustment mechanism; and FRRSR$\alpha$ (front-to-rear rear swivel right $\alpha$ degrees) indicates the sliding top plate range of front-to-rear travel with a right swivel or rotation of $\alpha$ degrees with the top plate located at the nominal lateral centerline of the base frame, where the side-to-side adjustment mechanism is adjusted to position the top plate saw slide at the nominal side-to-side center position of the side-to-side adjustment mechanism.

According to one exemplary embodiment, an example primary component example material description/dimension(s) list is provided below:

the same manner as previously described saw slide devices of the present disclosure. These components include but are not necessarily limited to: a sliding top plate 402 with an upper surface 404 and a lower surface 414; a base frame 410 having four sides, including a front side section 412A and a rear side section 412B, one or more mounting features 416 which help secure the sliding top plate 402 and adjustment mechanism 408 to the support frame; and, one or more low FIGS. 3A-3C; Example Side-to-Side, Front-to-Rear, Swivel Platform
Embodiment Primary Component Material Description/Dimension(s)

| Ref. Character | Material Description/Dimension(s) |
|---|---|
| 302 | 26" × 16" × 3⁄16" Aluminum Plate |
| L | 26" |
| W | 16" |
| LGD | 3" |
| LTD | 4" |
| 312A | 26" × 2" × 1⁄8" Aluminum Channel |
| 312B | 26" × 2" × 1⁄8" Aluminum Channel |
| 312C | 15¾" × 1¼" × 1¼" × 1⁄8" Aluminum Angle L |
| 312D | 15¾" × 1¼" × 1¼" × 1⁄8" Aluminum Angle L |
| 334 | 16" 3075 80/20 Aluminum Profile |
| | Components of the adjustment/alignment mechanism 308 (side-to-side) |
| 350A | 8" × ½" × ½" Metal Gear Rack—20 degree pressure angle, rectangular, 20 pitch; MCMASTER-CARR 5174T1 |
| 350B | 8" × ½" × ½" Metal Gear Rack—20 degree pressure angle, rectangular, 20 pitch; MCMASTER-CARR 5174T1 |
| 352A | Metal Pinion Gear—20 degree pressure angle, round bore, 20 pitch, 20 teeth; MCMASTER-CARR 5172T12 |
| 352B | Metal Pinion Gear—20 degree pressure angle, round bore, 20 pitch, 20 teeth; MCMASTER-CARR 5172T12 |
| 354 | 18" × ¼" Carbon Steel D Shaft; MCMASTER-CARR 8632T141 |
| 356 | Stainless Steel Knob for ½" Shaft; MCMASTER-CARR 60205K58 |
| | Components of the adjustment/alignment mechanism 318 (front-to-rear) |
| 360A | 7" × ½" × ½" Metal Gear Rack—20 degree pressure angle, rectangular, 20 pitch; MCMASTER-CARR 5174T1 |
| 360B | 7" × ½" × ½" Metal Gear Rack—20 degree pressure angle, rectangular, 20 pitch; MCMASTER-CARR 5174T1 |
| 362A | Metal Pinion Gear—20 degree pressure angle, round bore, 20 pitch, 20 teeth; MCMASTER-CARR 5172T12 |
| 362B | Metal Pinion Gear—20 degree pressure angle, round bore, 20 pitch, 20 teeth; MCMASTER-CARR 5172T12 |
| 364 | 90 degree flexible shaft driver and operatively connect shaft substituted for Bevel Gear Arrangement shown in FIGS. |
| 365A | |
| 365B | |
| 366 | Stainless Steel Knob for ½" Shaft; MCMASTER-CARR 60205K58 |
| 369 | 90 degree flexible shaft driver and operatively connect shaft substituted for Bevel Gear Arrangement shown in FIGS. |
| | Components of the swivel/rotating platform assembly 328 |
| 370 | 26" × 16" × 3⁄16" Aluminum Plate |
| 374 | 12" OD Round Steel Ball Bearing Turntable; MCMASTER-CARR 1797K2 |
| 376 | 31" × 16" × 3⁄16" Aluminum Plate |

Referring now to FIGS. 4A-4C, FIG. 4A is a side sectional view of a saw slide according to another exemplary embodiment of the present disclosure, the saw slide including a worm gear drive for side-to-side alignment of a miter saw mount member/top plate; FIG. 4B is a top view of the saw slide shown in FIG. 4A including a range of motion of a worm gear driven miter saw mount member/top plate according to an exemplary embodiment of this disclosure; and FIG. 4C is a detailed view the saw slide shown in FIG. 4A including additional details of the exemplary worm gear drive and attached linkage.

Saw slide device 400 includes an adjustment mechanism utilizing a worm gear drive to linearly move the sliding plate. Initially, it is noted that saw slide device 400 includes components which are similar to and operate in substantially friction or friction reducing elements 418 including first and second low friction slides 418A, 418B.

While some aspects of the adjustment mechanism of saw slide device 400 are similar to the exemplary adjustment mechanisms of other devices disclosed herein, there are also some differences. First, the one or more mounting features 416 of the base frame 410 take the form of one or more C-shaped sidewalls. The upper leg of the C-shaped sidewalls 416 are configured to receive the low friction slides 418A and 418B which are provided here as L-shaped members. The low friction slides 418A and 418B are included between the sliding top plate 402 and base frame 410 to provide a bearing surface which allows the sliding top plate to easily slide in the desired direction. The lower leg of the C-shaped sidewalls 416 are configured to at least partially support the adjustment mechanism 408.

Another difference in saw slide device 400 is that the adjustment mechanism includes a worm gear drive 450 that enables linear movement of the sliding top plate 402 in one direction along the flat plane defined by the upper surface 404 of the sliding top plate. As best seen in FIG. 4C, the worm gear drive 450 includes a first gear 452 attached to one end of a rotatable handle 454 and the opposite end of the rotatable handle 454 is accessible from outside the base frame 410. The first gear 452 is operatively engaged with a second gear 456 fixed to one end of a worm screw 458. The worm screw 458 is operatively engaged with a worm wheel 460 at a location adjacent side 412A. A linkage 462 is attached to the worm wheel 460 and is made of at least two bars 462A and 462B. The first bar 462A is fixed at one end to the worm wheel 460 at point 464, while the opposite end of the first bar is pivotally attached to one end of the second bar 462B at pivot point 466. The opposite end of the second bar 462B is pivotally mounted to a bracket/spacer/linkage anchor 470 attached to the bottom surface 414 of the sliding plate 402 at pivot point 468.

As best seen in FIG. 4B, the operative connections between the first gear 452, rotatable handle 454, second gear 456, worm screw 458, worm wheel 460, linkage 462, pivot point 466, and pivot point 468 together provide for longitudinal, linear movement of the sliding top plate 402 upon rotation of the handle 454. With reference to FIG. 4C, the longitudinal distance LGD which sliding top plate 402 can travel via adjustment mechanism 408 is about 3 inches in either direction, i.e. LLGD (left longitudinal distance of travel (side-to-side)) travel is 3 inches and RLGD (right longitudinal distance of travel (side-to-side)) travel is 3 inches, however other side-to-side travel distances are within the scope of this discloser, including more or less than 3 inches such as 4-12 inches or more and 1-3 inches or less.

According to one exemplary embodiment, an example primary component material description/dimension(s) list is provided below:

| FIGS. 4A-4C; Example Worm Bear (Crank) Embodiment Primary Component Material Description/Dimension(s) | |
| --- | --- |
| Ref. Character | Material Description/Dimension(s) |
| 402 | 26" × 16" × ¼" Aluminum Plate |
| LGD | 3" |
| LLGD | 3" |
| RLGD | 3" |
| 412A | 20" × 1¾" × ⅛" Aluminum Channel |
| 412B | 20" × 1¾" × ⅛" Aluminum Channel |
| 418A | 1" × 1" × ⅛" PVC 90 degree angle glides; MCMASTER-CARR 8659K39 |
| 418B | 1" × 1" × ⅛" PVC 90 degree angle glides; MCMASTER-CARR 8659K39 |
| Components of the adjustment/alignment mechanism 408 | |
| 450 | Casement Window Crank with Handle |

Now referring to FIG. 5, shown is an exploded assembly view of a saw slide according to another exemplary embodiment of this disclosure, the saw slide including another exemplary worm gear drive arrangement for side-to-side alignment of a miter saw mount member/top plate.

The saw slide device 500 includes an adjustment mechanism 508 utilizing a second worm gear drive design different from that of saw slide device 400. Initially, it is noted that saw slide device 500 includes components which are similar to and operate in substantially the same manner as previously described saw slide devices of the present disclosure. These components include but are not necessarily limited to a sliding plate 502 with an upper surface 504 and a lower surface 514 and a base frame 510.

The primary difference with saw slide device 500 is that the adjustment mechanism includes an alternate design for a worm gear drive 550 that enables linear movement of the sliding top plate 504 in one direction along the flat plane defined by the upper surface 504 of the sliding top plate. The worm gear drive 550 includes a gear shaft 552 with a knob 554 attached at one end such that the knob is accessible from outside the base frame 510. A worm screw 556 is fixed to the opposite end of the gear shaft 552. Instead of being operatively connected to a worm wheel like the worm gear drive 450 of saw slide device 400, the worm screw 556 is operatively engaged with a gear rack 558. The gear rack 558 is generally positioned along a middle portion of the lower surface 514 of the sliding top plate 502 and includes first and second mounting brackets 560A and 560B. The first and second mounting brackets 560A and 560B are fixed to the bottom surface 514 of the sliding top plate 502 with fasteners 563. The operative connections between the gear shaft 552, knob 554, worm screw 556, and gear rack 558 together provide for longitudinal, linear movement of the sliding top plate 502 upon rotation of the knob 554.

With reference to FIGS. 6A-6F, FIG. 6A is a top view of a saw slide base frame according to another exemplary embodiment of the present disclosure, the saw slide base frame including a scissor jack drive for side-to-side alignment of a miter saw mount member/top plate; FIG. 6B is a side sectional view of the saw slide base frame shown in FIG. 6A including a miter saw mount member/top plate and bracket members to operatively mount the scissor jack drive to the saw slide; FIG. 6C is a front view of the saw slide shown in FIGS. 6A and 6B including a slot formed in a frame sidewall, the slot providing for the extension of the scissor jack control arm outside of the frame to enable operation of the scissor jack drive; FIG. 6D is a detail top view of the saw slide scissor jack drive shown in FIGS. 6A-6C including additional movement detail of the scissor jack drive according to an exemplary embodiment of this disclosure, the movement detail representing the extension of the scissor jack drive bar linkage/arms to provide a side-to-side alignment or movement of the miter saw mount member/top plate to the left; FIG. 6E is a detail top view of the saw slide scissor jack drive shown in FIGS. 6A-6C including additional movement detail of the scissor jack drive according to an exemplary embodiment of this disclosure, the movement detail representing the contraction of the scissor jack drive bar linkage/arms to provide a side-to-side alignment or movement of the miter saw mount member/top plate to the right; and FIG. 6F is a detailed top view of the saw slide base frame shown in FIG. 6A including a dual scissor jack drive for side-to-side alignment of a miter saw mount member/top plate according to another exemplary embodiment of this disclosure.

The saw slide device 600 includes an adjustment mechanism which utilizes a scissor-jack drive to linearly move the sliding plate. Initially, it is noted that saw slide device 600 includes components which are similar to and operate in substantially the same manner as previously described saw slide devices of the present disclosure. These components include but are not necessarily limited to a sliding plate 602 with an upper surface 604 and a lower surface 614 and a base frame 610.

The primary difference in saw slide device 600 is that the adjustment mechanism 608 includes a scissor-jack drive 650 that enables linear movement of the sliding top plate 602 in one direction along the flat plane defined by the upper surface 604 of the sliding top plate. The scissor-jack drive 650 includes a shaft 652 with a knob 654 attached at one end such that the knob is accessible from outside the base frame 610. A slot 656 formed in one side of the base frame 610 permits the shaft 652 to slide back and forth therein. A linkage 658 made of at least four bars 658A, 658B, 658C and 658D is also operatively connected to the shaft 652. The first two bars 658A and 658B are pivotally attached to one another on one end at pivot point 660 while also being slidably attached to the shaft 652 at point 660. The opposite end of the first bar 658A is pivotally attached to a fixed L-bracket 662 at pivot point 664, and the L-bracket is mounted to the bottom surface 614 of the sliding top plate 602. The opposite end of the second bar 658B is pivotally attached to a fixed bracket 666 at pivot point 668, and the fixed bracket is mounted to one side of the base frame 610. Moreover, one end of the third bar 658C is pivotally attached to the first bar 658A at pivot point 664 on the fixed L-bracket 662. Additionally, one end of the fourth bar 658D is pivotally attached to the second bar 658B at pivot point 668 on the fixed bracket 666. The opposite ends of the third and fourth bars 658C and 658D are pivotally attached to one another on one end at pivot point 670 while also being slidably attached to the shaft 652 at point 670.

As best seen in FIGS. 6D and 6E, the operative connections between the shaft 652, linkage 658, pivot/connection points 660, 664, 668, and 670, and fixed brackets 662 an 666 together provide for longitudinal, linear movement of the sliding top plate 602 upon sliding the shaft and knob 654 within slot 656.

Referring now to FIG. 6F, an alternate design for the scissor-jack drive 650 is shown which includes a second linkage 659 operatively attached to the first linkage 658. Such a configuration may be used when it is desired to move the shaft 652 and knob 654 shorter distances while the sliding distance of sliding top plate 602 remains the same as in the single scissor-jack design.

Figure 7A:
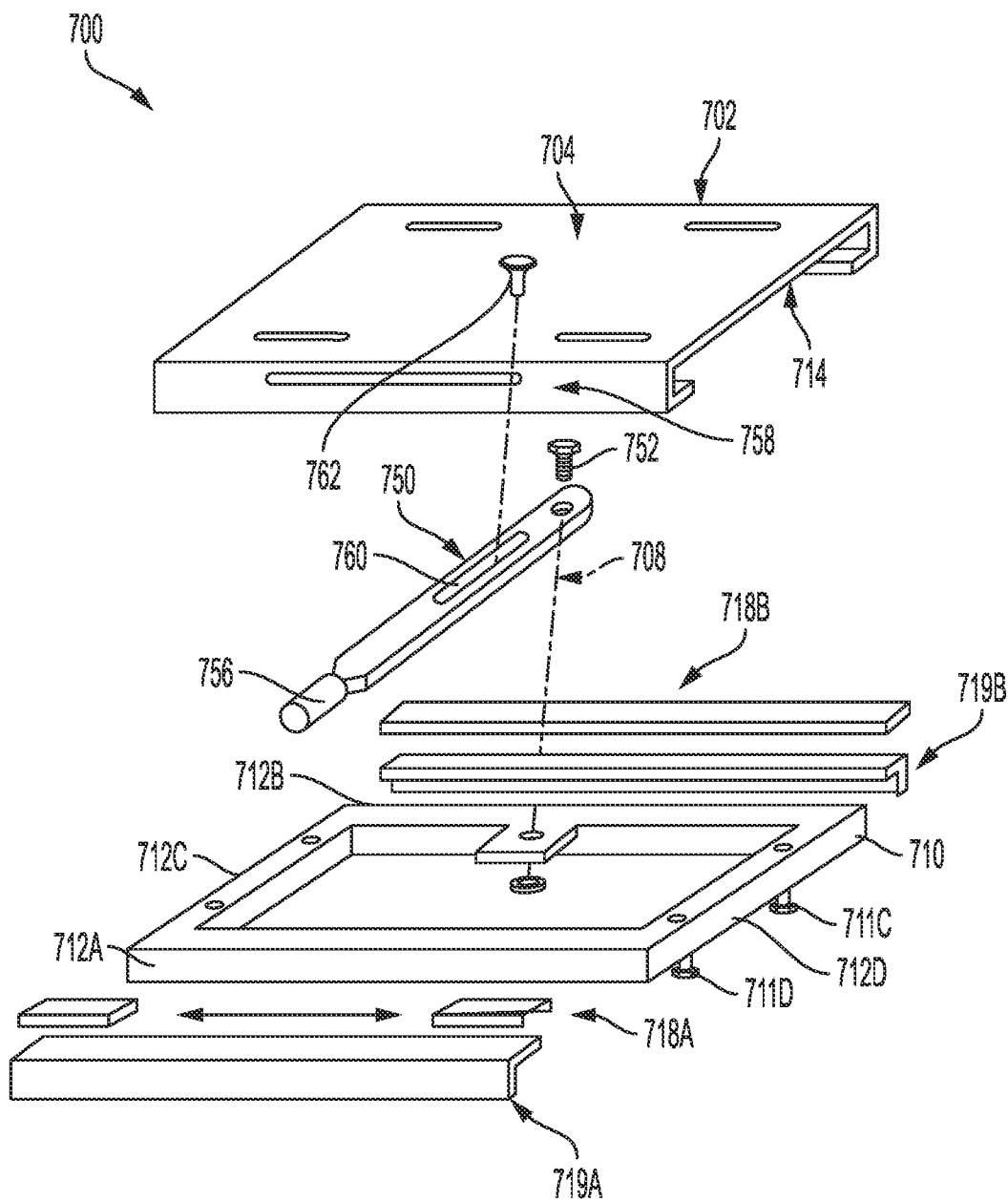
FIG. 7A is an exploded assembly view of a saw slide according to another exemplary embodiment of the present disclosure, the saw slide including a slotted lever/handlebar mechanism for side-to-side alignment of a miter saw mount member/top plate.
Figure 7B:
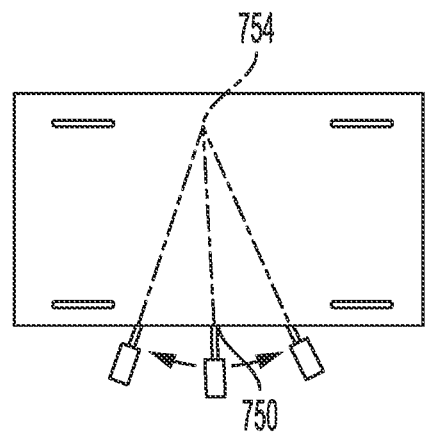
FIG. 7B is a top view of the saw slide shown in FIG. 7A including a range of motion of the lever/handlebar mechanism for side-to-side alignment of a miter saw mount member/top plate according to an exemplary embodiment of this disclosure.
Figure 7C:
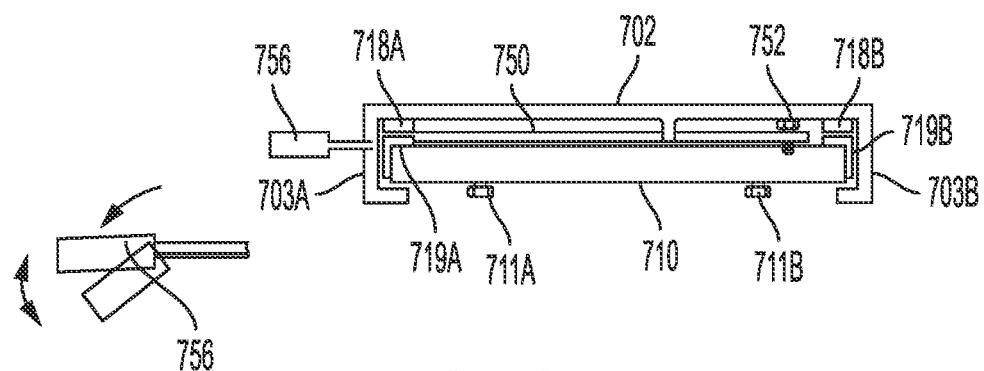
FIG. 7C is a side sectional view of the saw slide shown in FIG. 7A including a handle of the lever/handlebar configured as a locking member according to an exemplary embodiment of this disclosure.
Figure 7D:
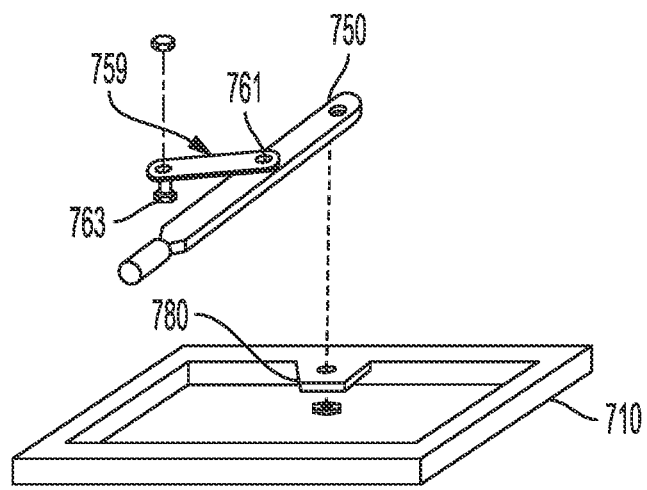
FIG. 7D is an exploded partial assembly view of the saw slide shown in FIG. 7A, the saw slide including a lever/handlebar and pivot arm mechanism for side-to-side alignment of a miter saw mount member/top plate according to an exemplary embodiment of this disclosure.

Now turning to FIGS. 7A-7D, FIG. 7A is an exploded assembly view of a saw slide according to another exemplary embodiment of the present disclosure, the saw slide including a slotted lever/handlebar mechanism for side-to-side alignment of a miter saw mount member/top plate; FIG. 7B is a top view of the saw slide shown in FIG. 7A including a range of motion of the lever/handlebar mechanism for side-to-side alignment of a miter saw mount member/top plate according to an exemplary embodiment of this disclosure; FIG. 7C is a side sectional view of the saw slide shown in FIG. 7A including a handle of the lever/handlebar configured as a locking member according to an exemplary embodiment of this disclosure; and FIG. 7D is an exploded partial assembly view of the saw slide shown in FIG. 7A, the saw slide including a lever/handlebar and pivot arm mechanism for side-to-side alignment of a miter saw mount member/top plate according to an exemplary embodiment of this disclosure.

The saw slide device 700 includes an adjustment mechanism including a lever/handlebar configured to linearly move the sliding plate. Initially, it is noted that saw slide device 700 includes components which are similar to and operate in substantially the same manner as previously described saw slide devices of the present disclosure. These components include, but are not necessarily limited to, a sliding plate 702 with an upper surface 704 and a lower surface 714; a base frame 710 including a first side section 712A, a second side section 712B, a third side section 712C and a fourth side section 712D; one or more low friction or friction reducing elements including low friction slide/spacer 718A and 718B, and one or more L-shaped low friction slide/spacer 719A and 719B.

While some aspects of the adjustment mechanism of saw slide device 700 are similar to the exemplary adjustment mechanisms of other devices disclosed herein, there are also some differences. First, sliding top plate 702 has a wrap-around design which is configured with two C-shaped sidewalls 703A and 703B. The upper leg of the C-shaped sidewalls 703A/703B are each configured to receive first low friction slides 718A and 718B, while the lower leg of the C-shaped sidewalls 703A/703B are each configured to be positioned under the base frame 710 such that the lower legs of the C-shaped sidewalls 703A/703B "wrap around' the base frame (see FIG. 7C). In addition, a second set of low fiction slides 719A and 719B are also included which are configured to be received on opposing sides 712A and 712B of the base frame 710. The low fiction slides 719A and 719B are provided as an L-shaped member in order to provide reduced friction bearing surfaces between the base frame 710 and the bottom surface 714 of the sliding top plate 702 as well as between the base frame and the vertical leg portion of the C-shaped sidewalls 703A/703B. Furthermore, the base frame 710 includes height adjustable legs or saw stand/table/bench mounting fasteners 711A, 711B, 711C and 711D.

Another difference in saw slide device 700 is that the adjustment mechanism 708 includes a simple handlebar 750 that enables linear movement of the sliding top plate 702 in one direction along the flat plane defined by the upper surface 704 of the sliding top plate. As best seen in FIG. 7A, one end of the handlebar 750 is pivotally attached to side 712B of base frame 710 via a bolt 752 at pivot point 754 with the use of a base frame protrusion member or lever/handlebar rear support bracket 780. A grip or handle 756 is fixed to the opposite end of the handlebar 750 such that the handle 756 is accessible from outside the base frame 710. With reference to FIG. 7C, the handle 756 can optionally be configured to fold downward for frictional engagement with the C-shaped sidewall 703A of the sliding top plate 702. In such embodiments, the handle 756 is configured as a locking mechanism which locks the sliding plate 702 in a fixed position to prevent any unintended movement thereof. A slot 758 formed in the side 712A of base frame 710 permits the handlebar 750 to slide back and forth therein. Moreover, as shown in FIG. 7A, low friction slide 718A can be split and spaced apart to allow the handlebar 750 to slide back and forth on the low friction, L-shaped slide 719A located beneath slide 719B. Additionally, a slot 760 formed in a generally central portion of the handlebar 750 is configured to operatively engage the free end of a stud 762. The opposite end of the stud 762 is fixed to the bottom surface 714 of the sliding top plate 702. The operative connection at pivot point 754 and between slot 760 and fixed stud 762 together provide for longitudinal, linear movement of the sliding top plate 702 upon sliding the handlebar 750 from side to side (see FIG. 7B) within slot 758.

Referring now to FIG. 7D, an alternate design for the handlebar 750 is shown which includes a pivot arm 759 instead of the centrally located slot 758. In this regard, one end of the pivot arm 759 is pivotally attached to a midpoint of the handlebar 750 at pivot point 761. The opposite end of pivot arm 759 is pivotally attached to a free end of a bolt 763, and the opposite end of the bolt is fixed to the bottom surface 714 of the sliding top plate 702. The operative connections in the alternate design of FIG. 7D similarly provide for longitudinal, linear movement of the sliding top plate 702 upon sliding the handlebar 750 from side to side within slot 758.

According to one exemplary embodiment, an example primary component material description/dimensions(s) list is provided below:

| FIGS. 7A-7D; Example Lever/Handlebar Embodiment Primary Component Material Description/Dimension(s) | |
|---|---|
| Ref. Character | Material Description/Dimension(s) |
| 702 | 26" × 16" × ¼" Aluminum Plate |
| 712A | 26" × 2" × ⅛" Aluminum Channel |
| 712B | 26" × 2" × ⅛" Aluminum Channel |
| 712C | 15¾" × 1¼" × 1¼" × ⅛" Aluminum Angle L |
| 712D | 15¾" × 1¼" × 1¼" × ⅛" Aluminum Angle L |
| 718A | 24" × 1" × ½" DELRIN Glides; MCMASTER-CARR 8702K83 |
| 718B | 24" × 1" × ½" DELRIN Glides; MCMASTER-CARR 8702K83 |
| 719A | 4-8" × 1" × 1" × ⅛" DELRIN Angle Glides; MCMASTER-CARR 8659K39 |
| 719B | 4-8" × 1" × 1" × ⅛" DELRIN Angle Glides; MCMASTER-CARR 8659K39 |
| | Components of the adjustment mechanism 708 |
| 750 | 24" × 1¾" × ¼" Aluminum Flat Stock |
| 756 | Lever Handle; MCMASTER-CARR 97065K23 |
| 759 | 4" × 1" × ⅜" Aluminum Flat Stock |

Now referring to FIGS. 8A-8B, FIG. 8A is a side sectional view of a saw slide according to an exemplary embodiment of the present disclosure, the saw slide including C-shaped base frame sections, Z-shaped low friction slides/spacers operatively associated with the C-shaped base frame sections and a slotted lever/handlebar mechanism for side-to-side alignment of a miter saw mount member/top plate; and FIG. 8B is an exploded view of the saw slide shown in FIG. 8A.

The saw slide device 800 includes an adjustment mechanism 808 having a lever/handlebar design 850 similar to device 700. Initially, it is noted that saw slide device 800 includes components which are similar to and operate in substantially the same manner as the previously described saw slide device 700 of the present disclosure. The primary difference in saw slide device 800 is that the sliding top plate 802 is not configured with the "wrap-around' design of device 700. Instead, sliding top plate 802 is provided with Z-shaped slide members 819A and 819B mounted to the bottom surface 814 of the sliding top plate. The Z-shaped slide members 819A and 819B are configured to operatively engage an upper leg of C-shaped sidewalls 812A and 812B of base frame 810. In addition, flat low friction slides 818A and 818B are also used between the sliding top plate 802 and the C-shaped sidewalls 812A and 812B. Moreover, saw slide device 800 includes one or more L-brackets fastened to base frame 810 sides 812C and 812D of the base frame 810. The L-brackets 838A and 838B are configured to mount the entire saw slide device 800 to an associated table or stand as discussed in further detail below.

Further details of this handlebar embodiment 850 include a bolt or pin 852 which pivotally attaches the handlebar or lever to a base frame protrusion member/rear support bracket 880, a handlebar slot 860 and sliding top plate welded stud 862 arrangement to provide swinging of the handlebar 850 side-to-side and a handlebar grip 856.

According to one exemplary embodiment, an example primary component material description/dimension(s) list is provided below:

| FIGS. 8A-8B; Example Lever/Handlebar Embodiment Primary Component Material Description/Dimension(s) | |
|---|---|
| Ref. Character | Material Description/Dimension(s) |
| 802 | 26" × 16" × ¼" Aluminum Plate |
| 812A | 26" × 2" × ⅛" Aluminum Channel |
| 812B | 26" × 2" × ⅛" Aluminum Channel |
| 812C | 15¾" × 1¼" × 1¼" × ⅛" Aluminum Angle |
| 812D | 15¾" × 1¼" × 1¼" × ⅛" Aluminum Angle |
| 818A | 24" × 1" × ½" DELRIN Glides; MCMASTER-CARR 8702K83 |
| 818B | 24" × 1" × ½" DELRIN Glides; MCMASTER-CARR 8702K83 |
| 819A | 24" Aluminum Z-Bar/Angle |
| 819B | 24" Aluminum Z-Bar/Angle |
| | Components of the adjustment mechanism 808 |
| 850 | 24" × 1¾" × 14" Aluminum Flat Stock |
| 856 | Lever Handle; MCMASTER-CARR 97065K23 |
| 859 | 4" × 1" × ⅜" Aluminum Flat Stock |

Turning to FIG. 9, shown is an exploded assembly view of a saw slide according to another exemplary embodiment of the present disclosure, the saw slide including base frame sections, low friction slides/spacers operatively associated with the base frame sections and a slotted lever/handlebar mechanism for side-to-side alignment of a miter saw mount member/top plate.

The saw slide device 900 includes an adjustment mechanism 908 having a lever/handlebar design 950 similar to devices 700 and 800. More particularly, saw slide device 900 is substantially identical to saw slide device 800 described above and shown in FIGS. 8A and 8B, including a sliding top plate 902, a base frame 910 including side sections 912A, 912B, 912C and 912D. However, the saw slide device 900 uses a simple, flat design for the sliding plate 902 without the C-shaped or Z-shaped members utilized in devices 700 and 800. Moreover, saw slide device 900 uses only flat low friction slides 918A and 918B which have been previously described. In addition, the saw slide embodiment shown includes saw stand mount L-bracket (left) 938A, saw stand mount L-bracket (right) 938B, a bolt or pin 952 which pivotally attaches the handlebar or lever to a base frame protrusion member/rear support bracket 980, a handlebar slot 960 and sliding top plate stud or pin 962 arrangement to provide swinging of the handlebar 950 side-to-side. A slot/cutout 958 formed on front side 912A of base frame 910 permits lever/handlebar 950 movement of the sliding top plate 902 side-to-side.

With reference to FIGS. 10A-10C, FIG. 10A is a side sectional view of a saw slide according to another exemplary embodiment of the present disclosure, the saw slide including a cable pully system for side-to-side alignment of a miter saw mount member/top plate; FIG. 10B is a top view of the saw slide shown in FIG. 10A including additional detail of the cable pulley system according to an exemplary embodiment of this disclosure, the detail representing the cable pulley system operation to provide a side-to-side alignment or movement of the miter saw mount member/top plate to the left; and FIG. 10C is a top view of the saw slide shown in FIG. 10A including additional detail of the cable pulley system according to an exemplary embodiment of this disclosure, the detail representing the cable pulley system operation to provide a side-to-side alignment or movement of the miter saw mount member/top plate to the right.

The saw slide device 1000 includes an adjustment mechanism that utilizes a cable and pulley system to linearly move the sliding plate 1002. Initially, it is noted that saw slide device 1000 includes components which are similar to and operate in substantially the same manner as previously described saw slide devices of the present disclosure. These components include but are not necessarily limited to a sliding plate 1002 with an upper surface 1004 and a lower surface 1014 and a base frame 1010 including side sections 1012A, 1012B, 1012C and 1012D.

The primary difference in saw slide device 1000 is that the adjustment mechanism 1008 includes a cable pulley system which enables linear movement of the sliding top plate 1002 in a direction along the flat plane defined by the upper surface 1004 of the sliding top plate. The cable pulley system includes a shaft 1052 with a knob 1054 attached at one end such that the knob is accessible from outside the base frame 1010. A cable 1056 is operatively connected to the shaft 1052 in a generally central location with respect to the base frame 1010. A first section 1056A of the cable 1056 extends toward side 1012C of the support frame 1010 and is operatively mounted thereto via a block-pulley 1060. The first section 1056A of cable 1056 ends at mounting point 1062 located on the bottom surface 1014 of the sliding top plate 1002. A second section 1056B of cable 1056 extends toward side 1012D of the support frame 1010 and is operatively mounted thereto via an adjustable cable tensioner 1066. The adjustable cable tensioner 1066 is configured to increase or decrease tension in the cable 1056 depending on whether more or less sensitivity is desired when moving the sliding top plate 1002 via shaft 1052 and knob 1054. The second section 1056B of cable 1056 ends at mounting point 1068 also located on the bottom surface 1014 of the sliding top plate 1002.

and Z-shaped low friction slides/spacers operatively associated with the C-shaped base frame sections for side-to-side alignment of a miter saw mount member/top plate.

The saw slide device 1100 includes an adjustment mechanism 1108 which utilizes a linear actuator 1150 to move the sliding plate 1102. Initially, it is noted that saw slide device 1100 includes components which are similar to and operate in substantially the same manner as previously described saw slide devices of the present disclosure. These components include but are not necessarily limited to: a sliding plate 1102 with upper and lower surfaces 1104/1114; a base frame 1110; Z-shaped slide members 1119A/1119B mounted to the bottom surface 1114 of the sliding top plate; C-shaped sidewalls 1112A/1112B of the base frame 1110; flat low friction slides 1118A/1118B; and, one or more L-brackets 1138A and 1138B fastened to sides 1112C and 1112D of the base frame 1110.

The primary difference in saw slide device 1100 is that the adjustment mechanism 1108 includes a linear actuator 1150 that enables linear movement of the sliding top plate 1102 in a direction along the flat plane defined by the upper surface 1104 of the sliding top plate. The actuator has a fixed end 1152 mounted to side 1112D of the base frame 1110 and a rod end 1154 mounted to lower surface 1114 of the sliding top plate 1102 such that a linear movement of the rod end of the actuator in one direction enables a linear movement of the sliding top plate in the same direction. An operator activation switch 1156 is also included to control movement of the rod end 1154 of the actuator 1150. Various kinds of actuators known in the art may be used without departing from the scope of the present disclosure, including but not limited to electric, pneumatic, and hydraulic linear actuators.

According to one exemplary embodiment, an example primary component material description/dimension(s) list is provided below:

| FIGS. 11A-11B; Example Lever/Handlebar Embodiment Primary Component Material Description/Dimension(s) | |
| --- | --- |
| Ref. Character | Material Description/Dimension(s) |
| 1102 | 26" × 16" × ¼" Aluminum Plate |
| 1112A | 26" × 2" × ⅛" Aluminum Channel |
| 1112B | 26" × 2" × ⅛" Aluminum Channel |
| 1112C | 15¾" × 1¼" × 1¼" × ⅛" Aluminum Angle |
| 1112D | 15¾" × 1¼" × 1¼" × ⅛" Aluminum Angle |
| 1118A | 24" × 1" × ½" DELRIN Glides; MCMASTER-CARR 8702K83 |
| 1118B | 24" × 1" × ½" DELRIN Glides; MCMASTER-CARR 8702K83 |
| 1119A | 24 "Aluminum Z-Bar/Angle |
| 1119B | 24" Aluminum Z-Bar/Angle |
| Components of the adjustment mechanism 1108 | |
| 1150 | 12 Volt Linear Actuator with 6 inch stroke; FIRGELLI AUTOMATIONS FA-240-2-12-6 |
| 1156 | Momentary Rocker Switch |

As best seen in FIGS. 10B and 10C, the operative connections between the shaft 1052, cable 1056, block pulley 1060 and adjustable cable tensioner 1066 together provide for longitudinal, linear movement of the sliding top plate 1002 by rotating the shaft 1052 and knob 1054.

Now turning to FIGS. 11A-11B, FIG. 11A is an exploded assembly view of a saw slide according to another exemplary embodiment of the present disclosure, the saw slide including a linear actuator for side-to-side alignment of a miter saw mount member/top plate; and FIG. 11B is a side sectional view of the saw slide shown in FIG. 11A, the side sectional view also showing C-shaped base frame sections, The exemplary saw slide devices of the present disclosure may include a number of additional or optional features which can generally be configured for use with many or all of the embodiments described herein, including saw slide devices 100-1100 described above. These additional or optional features will now be described with reference to FIGS. 12-22.

Figure 12A:
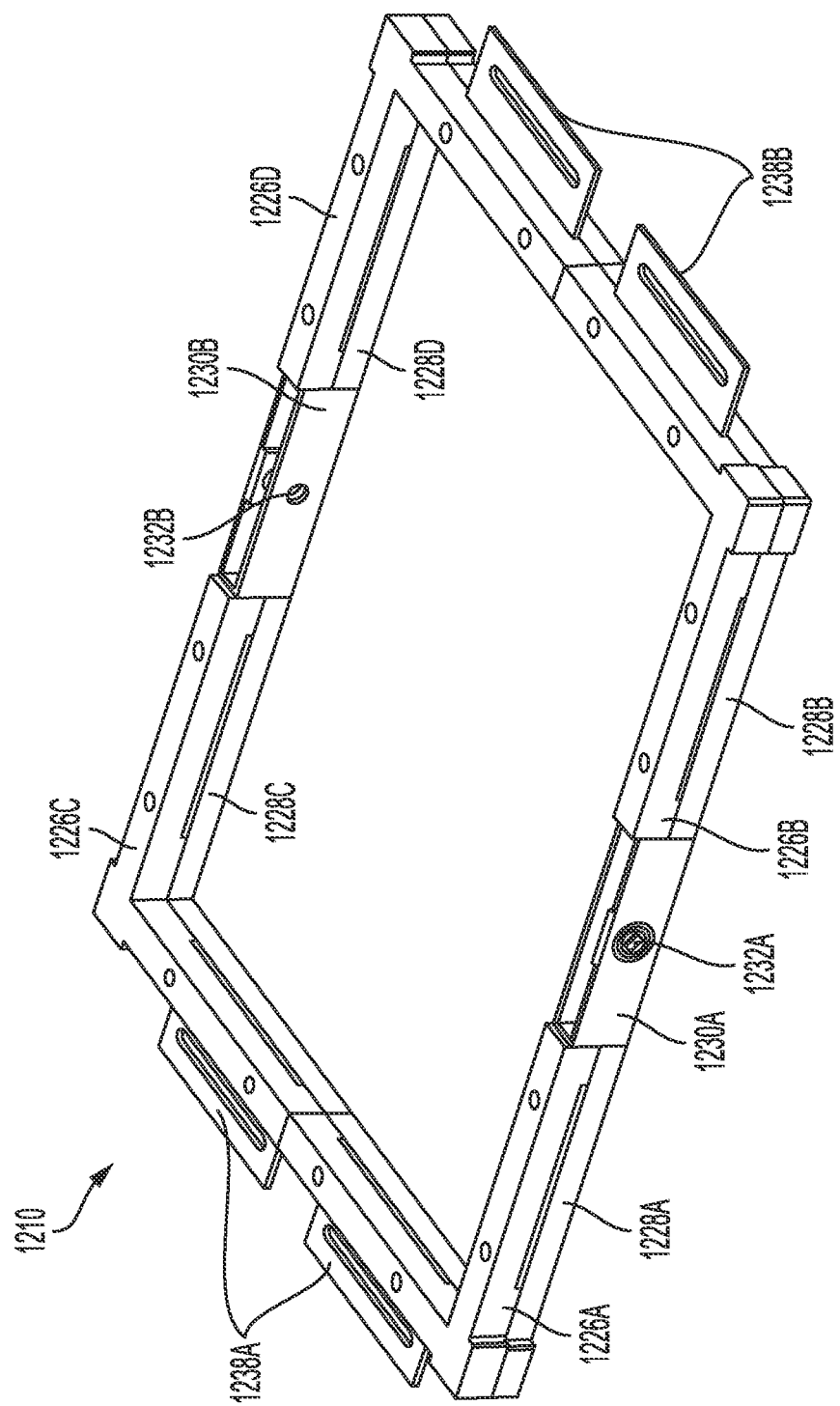
FIG. 12A is a perspective view of a 3D printed base frame suitable for use as a saw stand mount member; support frame; and base frame for a saw slide according to an exemplary embodiment of the present disclosure.
Figure 12D:
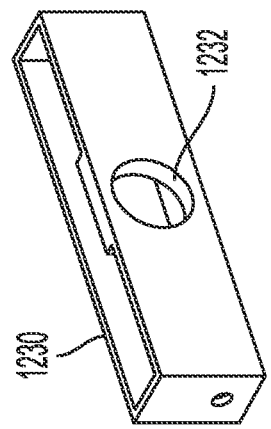
FIG. 12D is a detailed perspective view of an example 3D printed adjustment/alignment mechanism support block (front and rear) operatively associated with the 3D printed base frame shown in FIG. 12A.
Figure 12B:
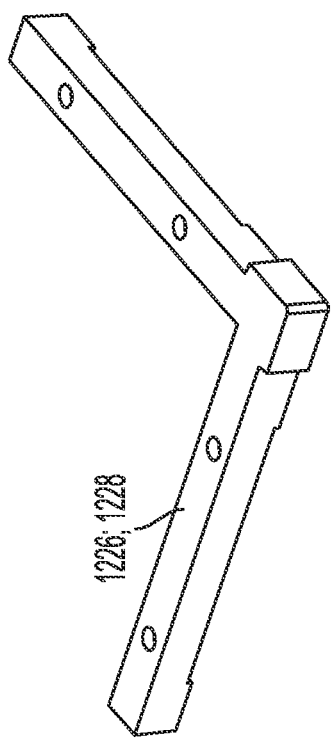
FIG. 12B is a detailed top view of an example 3D printed corner piece operatively associated with the 3D printed base frame shown in FIG. 12A.
Figure 12C:
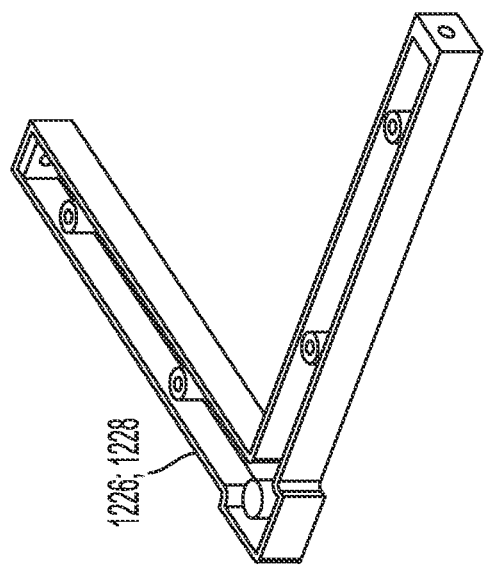
FIG. 12C is a detailed bottom view of an example 3D printed corner piece operatively associated with the 3D printed base frame shown in FIG. 12A.
Figure 12E:
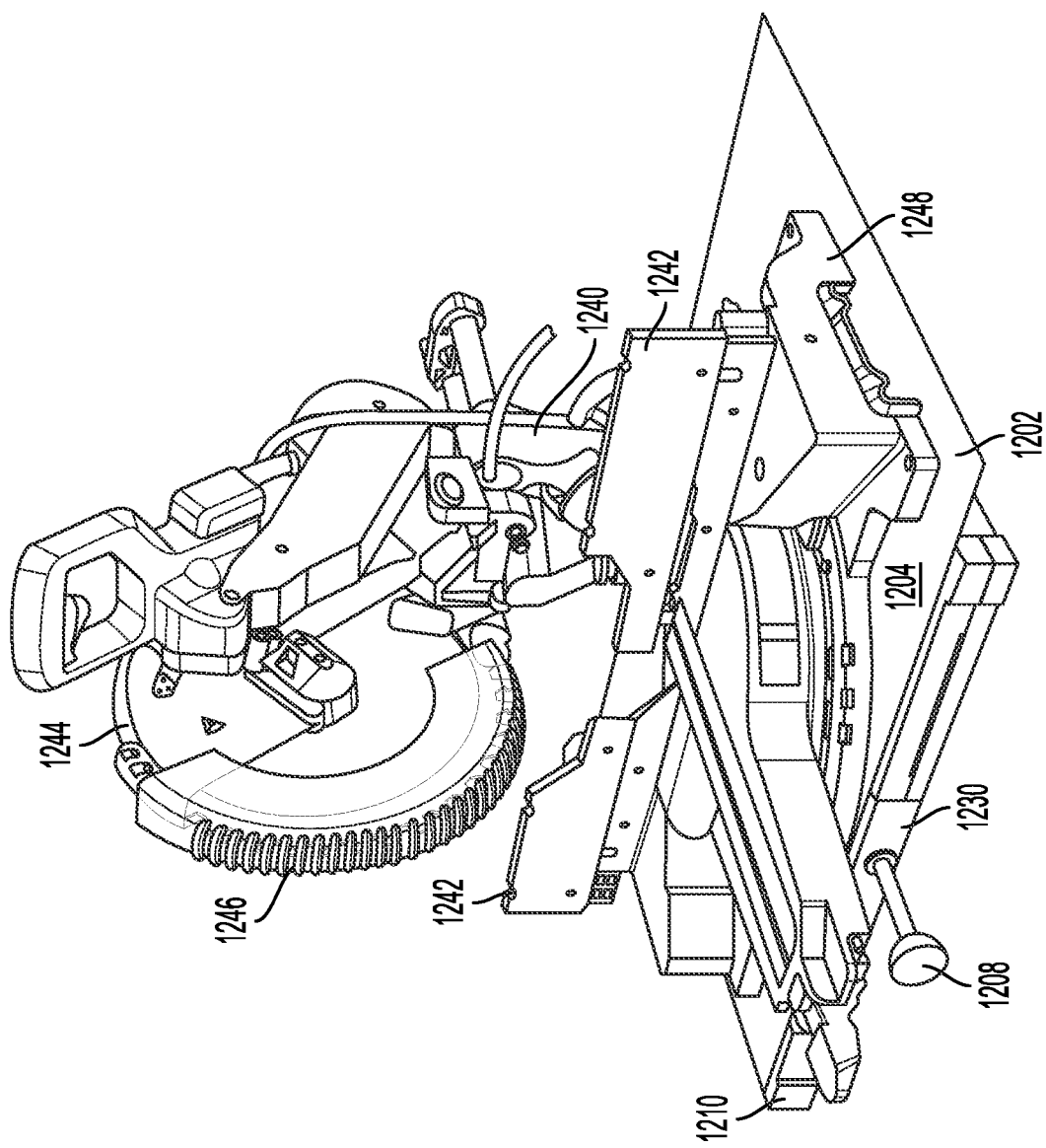
FIG. 12E is a perspective view of a saw slide and associated miter saw mounted to a saw slide which includes a 3D printed base frame as shown in FIG. 12A.

Turning now to FIGS. 12A-12E, FIG. 12A is a perspective view of a 3D printed base frame suitable for use as a saw stand mount member; support frame; and base frame for a saw slide according to an exemplary embodiment of the present disclosure; FIG. 12B is a detailed top view of an example 3D printed corner piece operatively associated with the 3D printed base frame shown in FIG. 12A; FIG. 12C is a detailed bottom view of an example 3D printed corner piece operatively associated with the 3D printed base frame shown in FIG. 12A; FIG. 12D is a detailed perspective view of an example 3D printed adjustment/alignment mechanism support block (front and rear) operatively associated with the 3D printed base frame shown in FIG. 12A; and FIG. 12E is a perspective view of a saw slide and associated miter saw mounted to a saw slide which includes a 3D printed base frame as shown in FIG. 12A.

The base frame 1210 shown can optionally be used as the base frame in any of the previously described saw slide devices 100-1100. Best seen in FIG. 12A, the base frame 1210 is built using cost-effective additive manufacturing or 3D printing processes known in the art. It is noted that injection molding could alternatively be used as a cost-effective manufacturing method for a base frame having a design similar to base frame 1210. A plurality of individual pieces, such as those illustrated in FIGS. 12B-12D, can be manufactured first and subsequently assembled to form the final base frame product 1210. Exemplary individual pieces which are assembled to make the base frame 1210 include but are not limited to four corner pieces 1226A, 1226B, 1226C and 1226D configured to form an upper portion of the base frame, four corner pieces 1228A, 1228B, 1228C and 1228D configured to form an lower portion of the base frame, and two adjustment mechanism support blocks 1230A and 1230B which are centrally arranged, longitudinally, on the base frame side sections, i.e. front and rear side sections. The adjustment mechanism support blocks 1230A and 1230B may be configured with an aperture 1232A and 1232B extending through both sides of the support blocks such that a rotatable shaft or gear shaft (not shown) can be supported thereon. However, such a configuration is non-limiting. Finally, the base frame 1210 includes one or more brackets 1234 fastened to sides 1212C and 1212D of the base frame 1210. The L-brackets 1238A and 1238B are provided such that the entire saw slide device using the exemplary base frame 1210 can be mounted to or otherwise supported on an associated table or stand.

To show additional details of the individual components of base frame 1210, individual corner pieces 1226;1228 are illustrated in FIGS. 12B/12C, and an individual adjustment mechanism support block 1230 is illustrated in FIG. 12D. Referring to FIG. 12E, an exemplary base frame 1210 is pictured which has been manufactured using 3D printing techniques. Similar to the base frame components of previously described saw slide devices 100-1100, base frame 1210 is generally positioned below a sliding plate 1202, and the sliding plate is movably attached to or otherwise supported on the base frame. Moreover, at least a portion of an adjustment mechanism 1208 is mounted to or otherwise supported within aperture 1232 of the adjustment mechanism support block 1230. Finally, the sliding plate 1202 and base frame 1210 are pictured as supporting an associated miter saw 1240 on the top surface 1204 of the sliding plate, the miter saw 1240 including a fence 1242, circular blade 1244, blade guard 1246 and saw base 1248.

Figure 13:
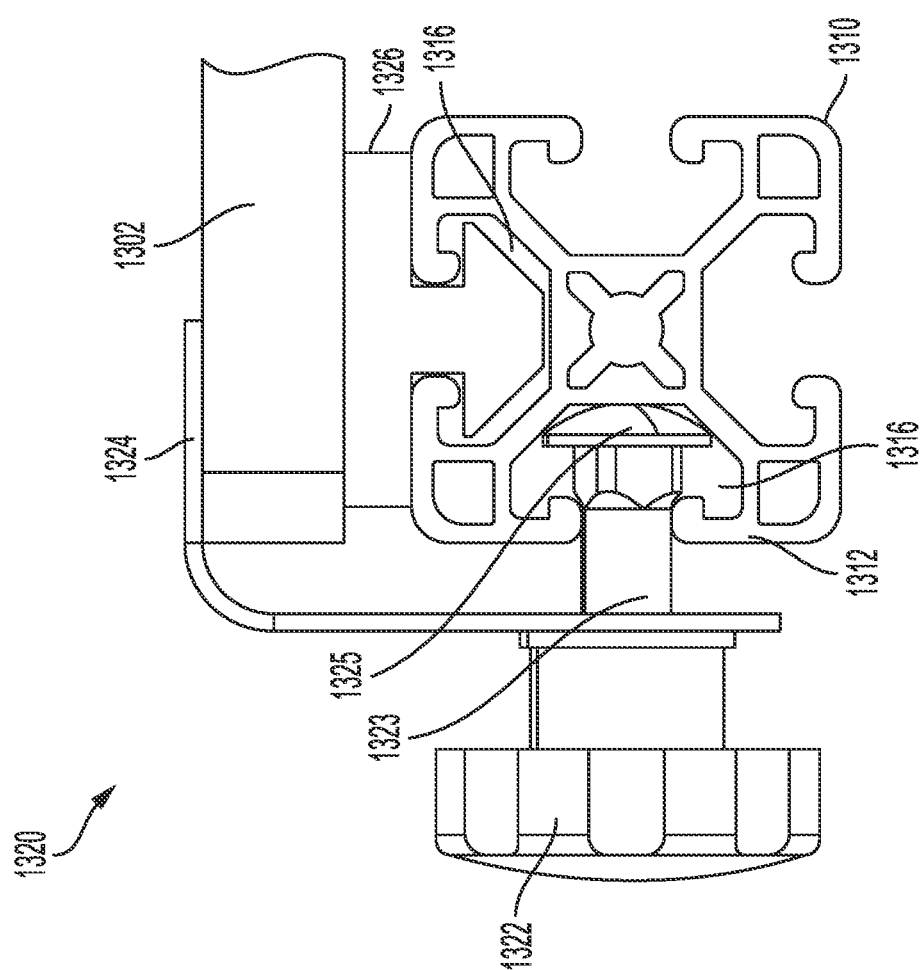
FIG. 13 is a side sectional view of a saw slide locking mechanism according to an exemplary embodiment of this disclosure, the saw slide locking mechanism including an operator tightened drop-in fastener engaged with a base frame section track and an L-bracket operatively associated with the operator tightened drop-in fastener to prevent movement of the saw slide.
Figure 14:
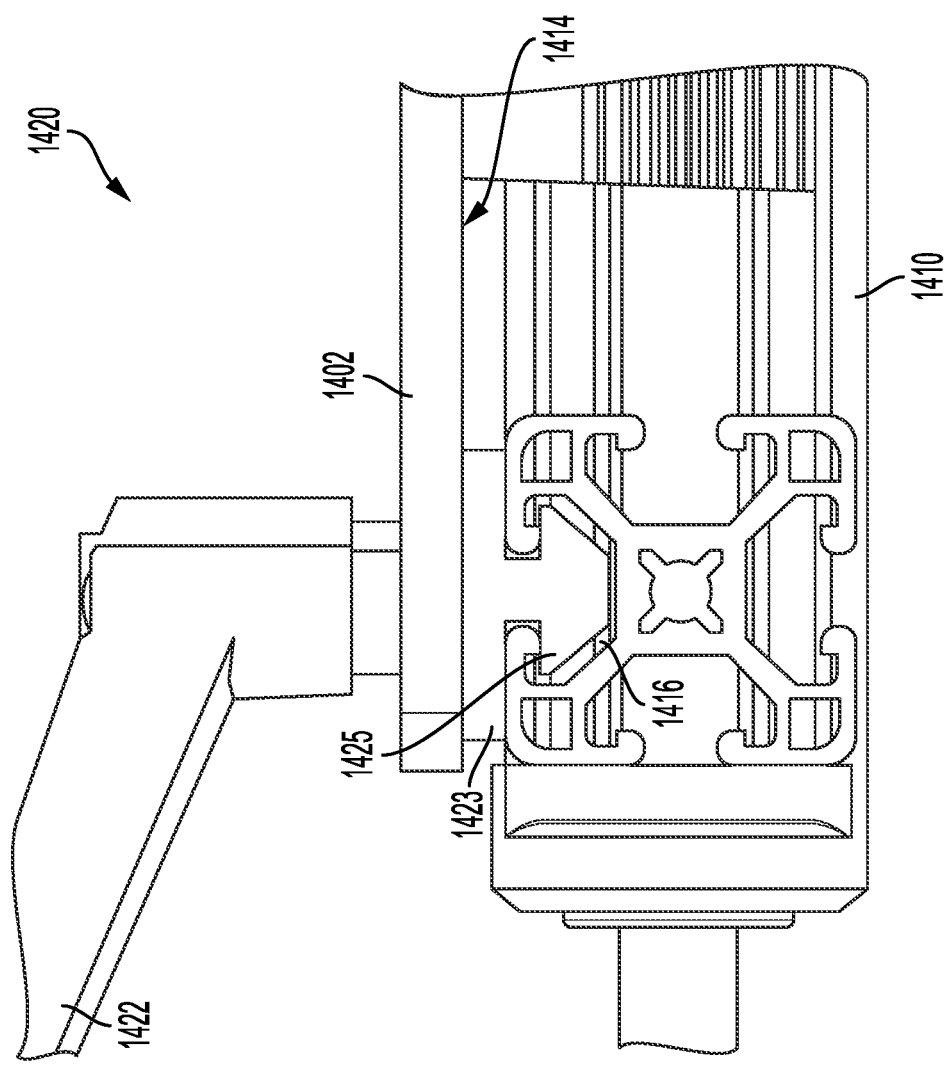
FIG. 14 is a side sectional view of another saw slide locking mechanism according to an exemplary embodiment of this disclosure, the saw slide locking mechanism including an operator tightened top drop-in fastener engaged with a base frame section track to prevent movement of the saw slide.

Turning now to FIGS. 13-15, exemplary embodiments of a locking mechanism 1320, 1420, and 1520, respectively, are shown which generally could be configured for use as a locking mechanism in any of the previously described saw slide devices 100-1100.

FIG. 13 is a side sectional view of a saw slide locking mechanism according to an exemplary embodiment of this disclosure, the saw slide locking mechanism including an operator tightened drop-in fastener engaged with a base frame section track and an L-bracket operatively associated with the operator tightened drop-in fastener to prevent movement of the saw slide.

The locking mechanism 1320 illustrated in FIG. 13 is configured to restrict unintended movement of a sliding plate and is mounted to one side 1312 of a base frame 1310 having one or more mounting features 1316. The locking mechanism 1320 generally includes a rotatable knob 1322 configured to operatively engage a threaded end (not shown) of a drop-in fastener 1323. The opposite end of the drop-in fastener 1323 includes a flange 1325 which is configured to be received within mounting channel 1316. When rotatable knob 1322 is rotated and engages the threaded end of fastener 1323, an L-shaped brace 1324 is caused to exert a clamping force between the sliding top plate 1302/drop-in guide rail/block 1326 and the base frame 1310, thereby restricting movement of the sliding top plate relative to the frame.

FIG. 14 is a side sectional view of another saw slide locking mechanism according to an exemplary embodiment of this disclosure, the saw slide locking mechanism including an operator tightened top drop-in fastener engaged with a base frame section track to prevent movement of the saw slide.

Locking mechanism 1420 operates in substantially the same manner as locking mechanism 1320 described, except for a few key differences. First, instead of a knob, locking mechanism 1420 includes a turn lever 1422 configured to operatively engage a threaded end (not shown) of a drop-in guide rail or fastener 1423. The opposite end of the drop-in fastener 1423 includes a flange 1425 configured to be received within a mounting channel 1416 of the base frame 1410 which faces the bottom surface 1414 of the sliding plate 1402. When the turn lever 1422 is rotated, the threaded end of fastener 1423 is engaged and the fastener begins moving upward. Continued turning causes the lever 1422 and flange 1425 to exert a clamping force between the sliding top plate 1402 and the base frame 1410, thereby restricting movement of the sliding top plate relative to the frame.

FIGS. 15A and 15B show a third exemplary embodiment of a locking mechanism 1520 which is configured to restrict unintended movement of sliding plate 1502. The locking mechanism 1520 is mounted to one side 1512 of a base frame 1510 which includes a C-shaped sidewall 1512. The locking mechanism 1520 generally includes a bar lever 1522 with a first end accessible from outside base frame 1510. A slot 1529 formed on side 1512 of the base frame 1510 permits the bar lever 1522 to pivot up and down with respect to the sidewall 1516. The opposite end of the bar lever 1522 is pivotally attached to a friction drum 1524 at pivot point 1525. The friction drum 1524 is supported within the C-shaped sidewall 1516 by a stationary support block 1526 and is configured to rotate about a fixed axis defined by pivot point 1525 when the bar lever 1522 pivots up or down (see FIG. 15B). A surface feature 1528 formed on the friction drum 1524 is configured to frictionally engage at least a portion of the bottom surface 1514 of the sliding plate 1502 when the bar lever 1522 is pivoted fully downward. Optionally, the surface feature 1528 is configured to frictionally engage an L-shaped guide rail 1530 mounted to the bottom surface 1514 of the sliding plate 1502. As shown in FIG. 15B, the surface feature 1528 is an increased diameter portion of the drum 1524. The frictional engagement of the surface feature 1528 with the sliding plate 1502 acts to prevent unintended movement of the sliding top plate relative to the base frame 1510.

FIG. 16 is a detail side sectional view of a rack and pinion gear arrangement which uses a chuck as a locking mechanism 1620 which is configured to restrict unintended movement of sliding plate 1602. In particular, the locking mechanism 1620 is configured as a chuck 1624 which restricts movement of the sliding plate 1602 by acting on the adjustment mechanism 1608. The adjustment mechanism 1608 shown in FIG. 16 has at least one gear rack 1650 built-in or otherwise mounted to the bottom of the sliding plate 1602 and is operatively engaged with an associated pinion gear 1652. The pinion gear 1652 is fixed on gear shaft 1654 at a location corresponding to the installation location of the gear rack 1650. The gear rack 1650 and pinion gear 1652 operate in a substantially similar manner as previously described gear rack and pinion gears. The chuck 1624 of the locking mechanism 1620 is mounted on the gear shaft 1654 adjacent one side of the base frame or C-shaped sidewall 1612. Additionally, the chuck 1624 is generally disposed on the shaft 1654 at a location between the C-shaped sidewall 1612 and optional knob 1656. The optional knob 1656 is fixed to one end of the shaft 1654 and permits easy rotation of the shaft and pinion gear 1652. The chuck 1624 includes one or more jaws 1626 configured to frictionally engage at least a portion of the C-shaped sidewall 1612. Although not seen in FIG. 16, jaws 1626 are typically arranged in a radially symmetrical pattern around the circumference of the chuck 1624. The jaws 1626 advance toward and frictionally engage the C-shaped sidewall 1612 upon rotation of the chuck 1626 in one direction and move away from the C-shaped sidewall upon rotation of the chuck in the opposite direction, as is known in the art. The jaws 1626 can optionally be tightened or loosened with a chuck key (not shown) or by hand force alone. The frictional engagement of the one or more jaws 1626 of the chuck 1624 with the C-shaped sidewall 1612 acts to prevent unintended movement of the gear shaft 1654, thereby also preventing movement of the sliding top plate 1602.

FIG. 17 is a detail side sectional view of a saw slide rack and pinion gear arrangement according to an exemplary embodiment of this disclosure, the saw slide base frame including a C-shaped sidewall front section.

With reference now to FIG. 17, the adjustment mechanism 1708 includes a specific rack and pinion gear arrangement which could generally be configured for use as the adjustment mechanism in any of the previously described saw slide devices which utilize a rack and pinion gear, including but not limited to saw slide devices 100, 200, and 300. Alternatively, adjustment mechanism 1708 could be used in place of the adjustment mechanisms in any of the previously described saw slide devices which utilize a C-shaped sidewall on the sliding plate or base frame, including but not limited to saw slide devices 400, 700, and 1100.

The adjustment mechanism 1708 shown in FIG. 17 has at least one gear rack 1750 built-in or otherwise mounted to a C-shaped wrap-around sidewall 1703 which is operatively connected to the sliding top plate 1702. More particularly, the gear rack 1750 is fixed to the upper leg of C-shaped sliding top plate sidewall 1713 and is operatively engaged with an associated pinion gear 1752. The pinion gear 1752 is fixed on a gear shaft 1754 and operatively connected or mounted to base frame 1710 which includes a C-shaped side section 1712. The pinion gear location corresponds to the installation location of the gear rack 1750 to provide an operative engagement of the pinion gear 1752 and gear rack 1750. The gear rack 1750 and pinion gear 1752 operate in a substantially similar manner as previously described rack and pinion gears. However, the specific arrangement of gear rack 1750 and pinion gear 1752 relative to the sliding top plate 1702 C-shaped sidewall 1703 provides for a compact, space-saving adjustment mechanism 1708 which may be desired for smaller saw slide devices.

Figure 18:
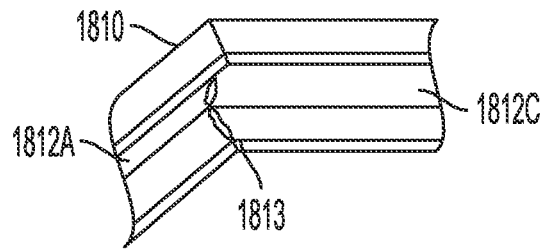
FIG. 18 is a detail view of a base frame corner including a welded corner joint, the base frame including two side sections of the base frame according to an exemplary embodiment of the present disclosure.
Figure 19:
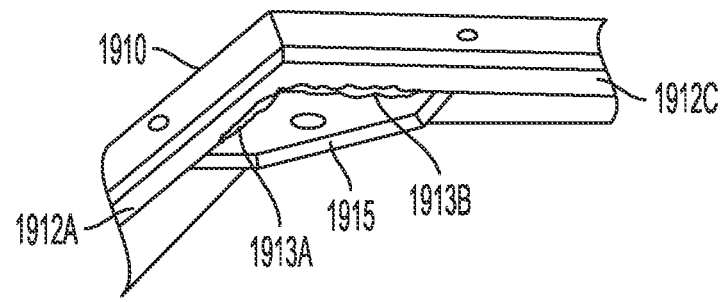
FIG. 19 is a detail view of a base frame corner including a welded gusset plate corner joint, the base frame including two side sections of the base frame according to an exemplary embodiment of the present disclosure.
Figure 20:
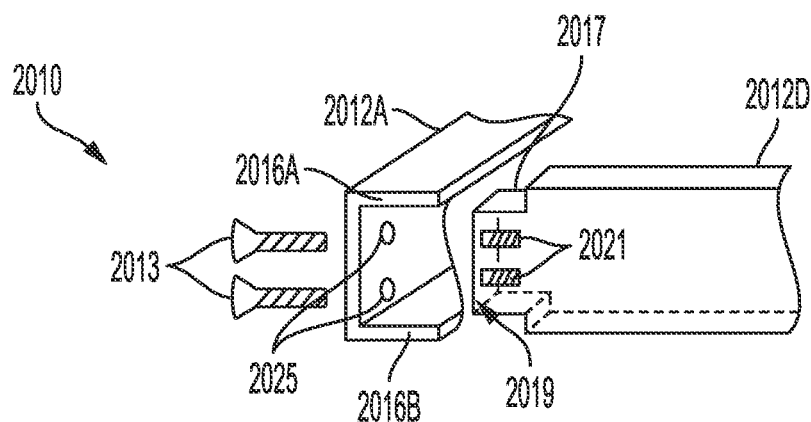
FIG. 20 is a detail view of a base frame corner including threaded fasteners and threaded holes to provide a corner joint, the base frame including a C-shaped side section and a mating tongued side section of the base frame according to an exemplary embodiment of the present disclosure.

Turning now to FIGS. 18-20, some exemplary but non-limiting techniques for assembling one or more sides of a base frame 1810, 1910, and 2010 are shown. These assembly techniques can generally be applied to base frames 110, 210, 310, 410, 510, 610, 710, 810, 910, 1010 and 1110, in any of the previously described saw slide devices 100, 200, 300, 400, 500, 600, 700, 800, 900, 1000 and 1100.

FIG. 18 is a detail view of a base frame corner including a welded corner joint, the base frame including two side sections of the base frame according to an exemplary embodiment of the present disclosure. In FIG. 18, two side components 1812A and 1812C of an exemplary base frame 1810 are shown. A welded joint 1813 is used to fix the two side components 1812A and 1812C together at a location where the two sides meet to substantially form a right angle.

FIG. 19 is a detail view of a base frame corner including a welded gusset plate corner joint, the base frame including two side sections of the base frame according to an exemplary embodiment of the present disclosure. As shown in FIG. 19, included are two side components 1912A and 1912C of an exemplary base frame 1910. A right-angle gusset plate 1915 is also included which is fixed to each side component 1912A/1912C along a respective weld joint 1913A/1913B. As such, the gusset plate 1915 securely fixes the two side components 1912A and 1912C together.

FIG. 20 is a detail view of a base frame corner including threaded fasteners and threaded holes to provide a corner joint, the base frame including a C-shaped side section and a mating tongued side section of the base frame according to an exemplary embodiment of the present disclosure. As shown in FIG. 20, included are two side components 2012A and 2012D of a base frame 2010 to be joined together. The first side component 2012A is a C-shaped wall having upper and lower legs 2016A/2016B, respectively. The upper and lower legs 2016A/2016B are configured to receive at least a portion of side component 2012D. The side component 2012D is generally a solid piece of material having a protrusion 2017 formed on one end. The protrusion 2017 is sized to fit within the C-shaped wall 2012A between upper and lower legs 2016A/20166 thereof. Protrusion 2017 also includes a mounting face 2019 which abuts an inner surface of the C-shaped wall 2012A when fully inserted therein. One or more tapped holes 2021 drilled perpendicularly into the mounting face 2019 are configured to receive one or more threaded fasteners 2013 when the protrusion 2017 is fit within the C-shaped wall 2012A. Once the one or more tap holes 2021 are aligned with one or more corresponding apertures 2025 in the inner surface of the C-shaped wall 2012A, threaded fasteners 2013 are inserted through the apertures and into the tap holes such that the two side components 2012A and 2012D are joined together.

FIG. 21A is a perspective view of a saw mount adapter bracket according to an exemplary embodiment of this disclosure; FIG. 21B is a front view of a saw slide according to an exemplary embodiment of this disclosure, the saw slide including saw mount adapter brackets as shown in FIG. 21A to mount a miter saw to the saw slide; and FIG. 21C is an overhead view of an exemplary arrangement of multiple saw mount adapter brackets as shown in FIG. 21A, where the arrangement corresponds to a footprint of a miter saw base mounted to the saw mount adapter plates.

Now referring to FIGS. 21A-21C, the one or more saw mount brackets 2134 can generally be used with any of the previously described saw slide devices 100, 200, 300, 400, 500, 600, 700, 800, 900, 1000 and 1100. As discussed herein, saw mount brackets are typically installed, if desired, on the upper surface of the sliding plates so that an associated saw can be securely mounted thereto.

Similarly, the one or more saw mount brackets 2134 shown in FIGS. 21A-21C are also configured to be installed on the upper surface 2104 of sliding plate 2102 to provide a secure mounting location for the associated saw, the sliding plate associated with a sliding device including an adjustment mechanism 2108, and a base frame 2110 including a front side section 2112A. The saw mount brackets 2134 each include a base plate 2137, base frame mounting slot 2136 and saw mounting stud 2141 welded to the base plate 2137. More particularly, four saw mount brackets 2134A, 2134B, 2134C and 2134D are installed on the upper surface 2104 using fasteners 2135 which extend up through lower surface 2114 and above the upper surface of the sliding plate 2102 such that slots 2136A, 2136B, 2136C and 2136D formed on base plates 2137A, 2137B, 2137C and 2137D of each saw mount bracket can receive a threaded end of one of the fasteners. A nut and/or washer is then installed on the threaded end of each fastener 2135 to secure each base plate 2137A, 2137B, 2137C and 2137D of saw mount brackets 2134A, 2134B, 2134C and 2134D to the upper surface 2104 of the sliding plate 2102.

The base plates 2137A, 2137B, 2137C and 2137D are mounted to the sliding plate 2102 in an arrangement corresponding to the shape of the footprint 2138 defined by the base 2148 of associated miter saw 2140. The base plates 2137A, 2137B, 2137C and 2137D of each saw mount bracket 2134A, 2134B, 2134C and 2134D each have a stud 2141A, 2141B, 2141C and 2141D welded thereto such that a threaded end of each stud is positioned above the base plates. The threaded end of each stud 2141A, 2141B, 2141C and 2141D can then be positioned at an appropriate location one the associated miter saw base 2148. A nut and/or washer is then installed on the threaded end of each stud 2141A, 2141B, 2141C and 2141D to secure the base 2148 and associated miter saw 2140 to the base plates 2137A, 2137B, 2137C and 2137D of saw mount brackets 2134A, 2134B, 2134C and 2134D.

In some particular embodiments, the base plates 2137A, 2137B, 2137C and 2137D of saw mount brackets 2134A, 2134B, 2134C and 2134D have a thickness T of only about ¼ inch. Accordingly, use of the exemplary saw mount brackets 2134A, 2134B, 2134C and 2134D illustrated in FIGS. 21A-21C in a saw slide device made in accordance with the present disclosure will reduce the overall assembly height by about ¾ inch compared to other saw slide devices described herein. Finally, the sliding plate 2102 and base frame 2110 are pictured as supporting an associated miter saw 2140 on the top surface 2104 of the sliding plate, the miter saw 2140 including a fence 2142, circular blade 2144, blade guard 2146 and saw base 2148.

Referring now to FIGS. 22-27, exemplary non-limiting embodiments will now be discussed related to various systems and/or assemblies which may incorporate a saw slide device made in accordance with the present disclosure.

Figure 22A:
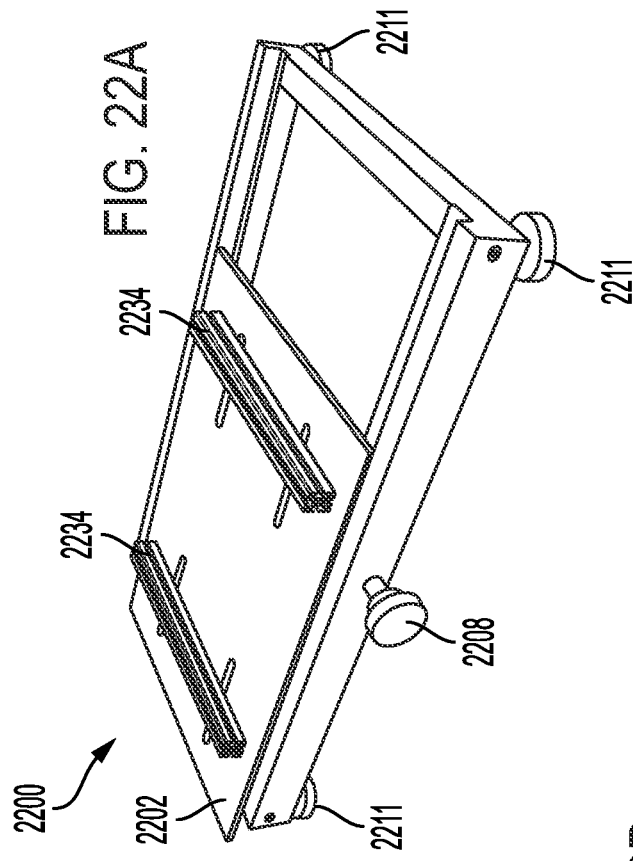
FIG. 22A is a perspective view of a saw slide according to an exemplary embodiment of this disclosure, the saw slide including height adjustable legs adapted to provide a tabletop/bench top stand-alone saw slide without the use of a saw stand.
Figure 22B:
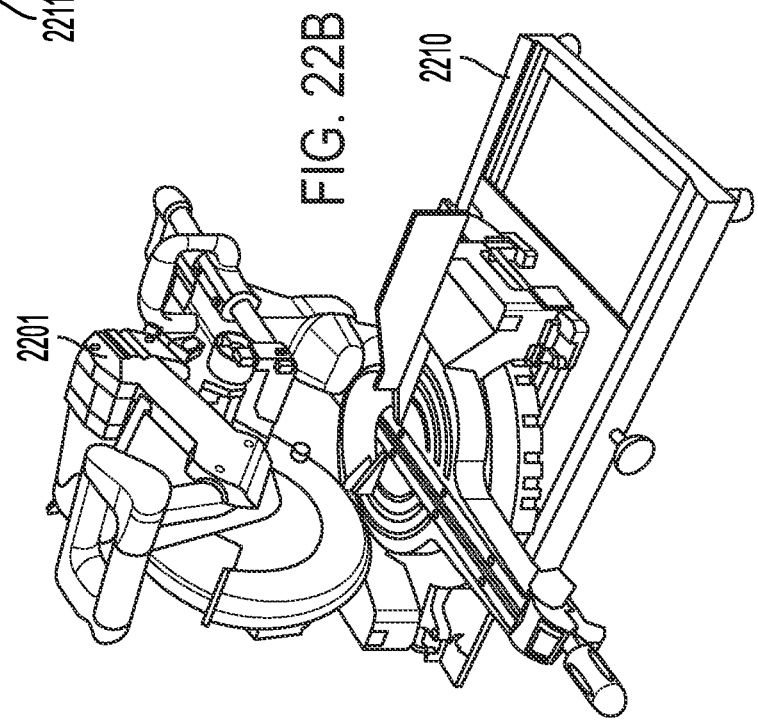
FIG. 22B is a perspective view of the saw slide shown in FIG. 22A including a sliding compound miter saw supported and attached to the saw slide.

FIG. 22A is a perspective view of a saw slide according to an exemplary embodiment of this disclosure, the saw slide including height adjustable legs adapted to provide a tabletop/bench top stand-alone saw slide without the use of a saw stand; and FIG. 22B is a perspective view of the saw slide shown in FIG. 22A including a sliding compound miter saw supported and attached to the saw slide.

Figure 23A:
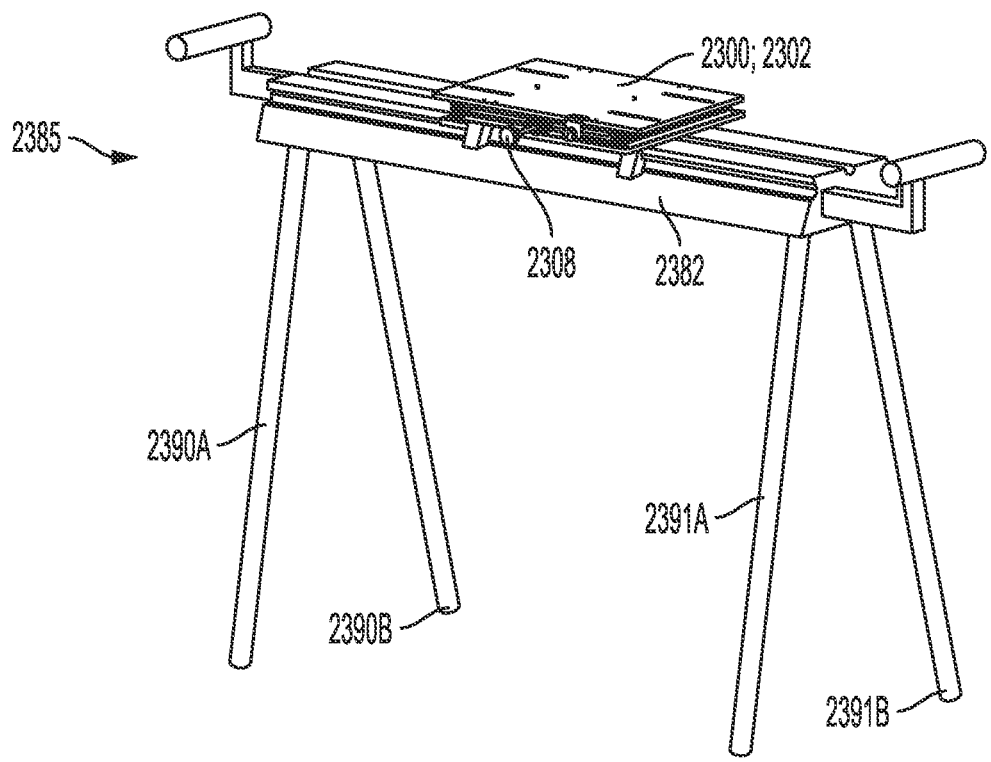
FIG. 23A is a perspective view of a combination saw slide and saw stand assembly according to an exemplary embodiment of this disclosure, the combination including a saw slide fixed to the saw stand using saw stand brackets.
Figure 23B:
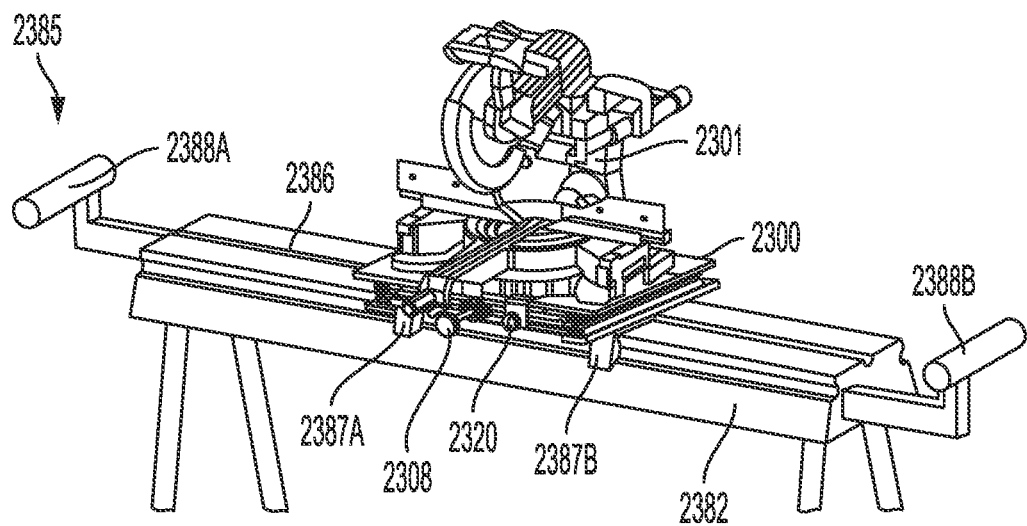
FIG. 23B is a perspective view of the combination saw slide and saw stand assembly shown in FIG. 23A including a sliding compound miter saw supported and attached to the saw slide.
Figure 23C:
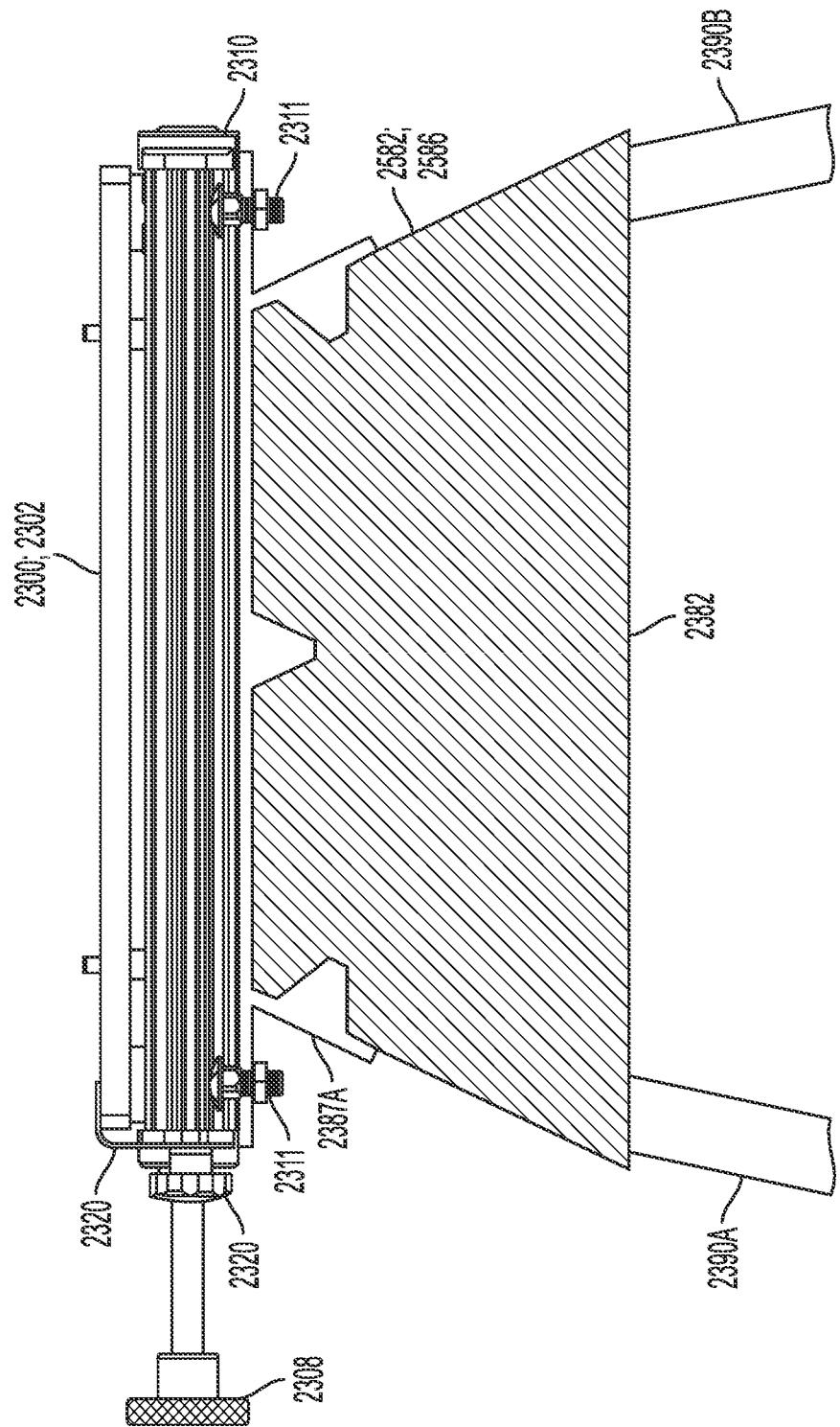
FIG. 23C is a side sectional view of the combination miter saw, saw slide and saw stand assembly shown in FIG. 23A including details of the saw slide mounted to the saw stand brackets.

FIG. 23A is a perspective view of a combination saw slide and saw stand assembly according to an exemplary embodiment of this disclosure, the combination including a saw slide fixed to the saw stand using saw stand brackets; and FIG. 23B is a perspective view of the combination saw slide and saw stand assembly shown in FIG. 23A including a sliding compound miter saw supported and attached to the saw slide; and FIG. 23C is a side sectional view of the combination miter saw, saw slide and saw stand assembly shown in FIG. 23A including details of the saw slide mounted to the saw stand brackets.

FIG. 24A is a front view of a combination sliding compound miter saw, saw slide and saw stand assembly according to another exemplary embodiment of this disclosure, the saw slide recessed and mounted between the saw stand brackets, thereby reducing the height of the saw slide and sliding compound miter saw above the saw stand track/base height and associated workpiece supports (not shown); and FIG. 24B is a detail view of a saw slide base frame side mount bracket as shown in FIG. 24A.

Figure 25A:
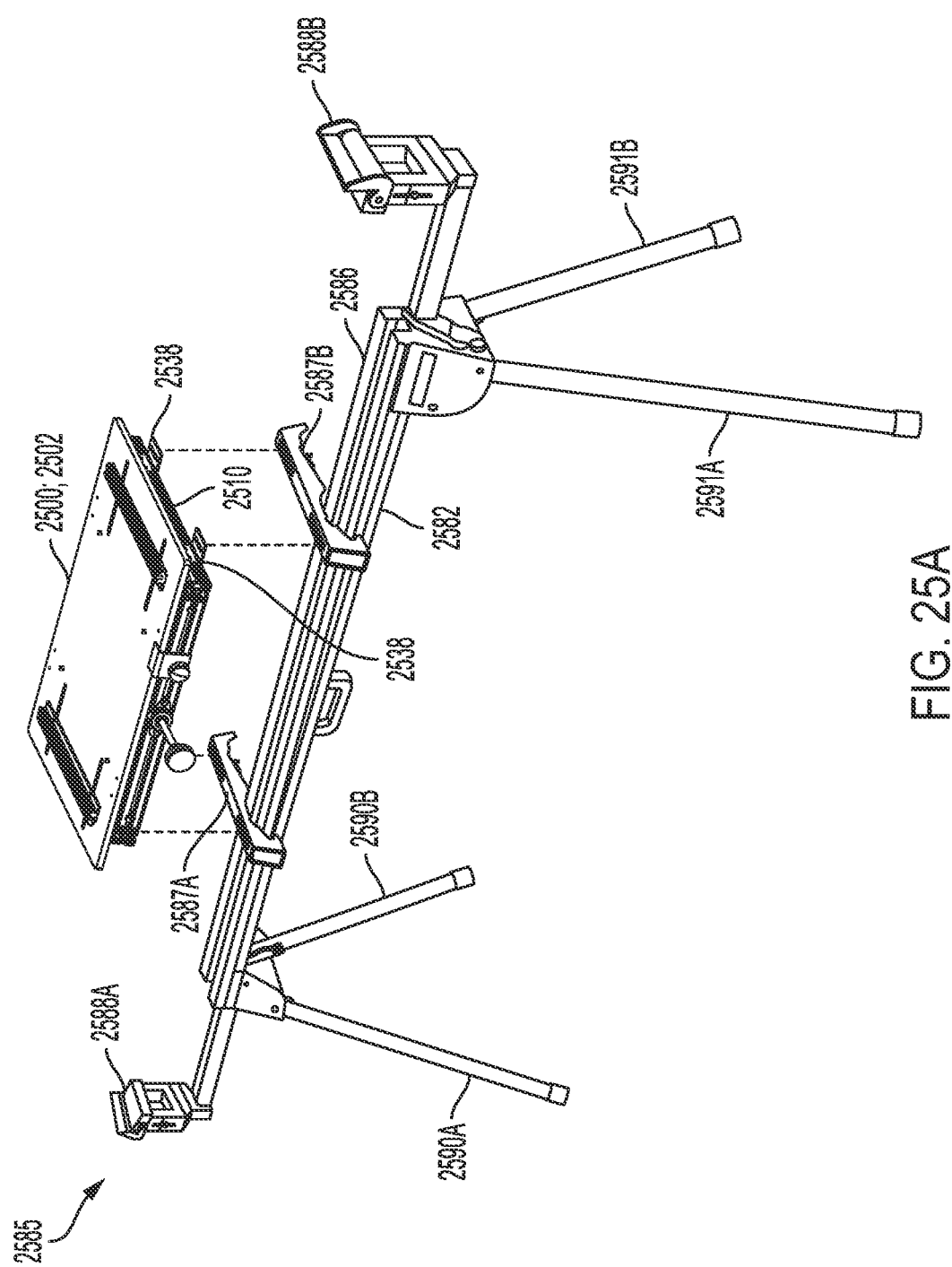
FIG. 25A is a perspective assembly view of a combination saw slide and saw stand assembly according to an exemplary embodiment of this disclosure, the combination including a saw slide fixed to the saw stand using saw stand brackets which are movably attached to a crossmember rail.
Figure 25B:
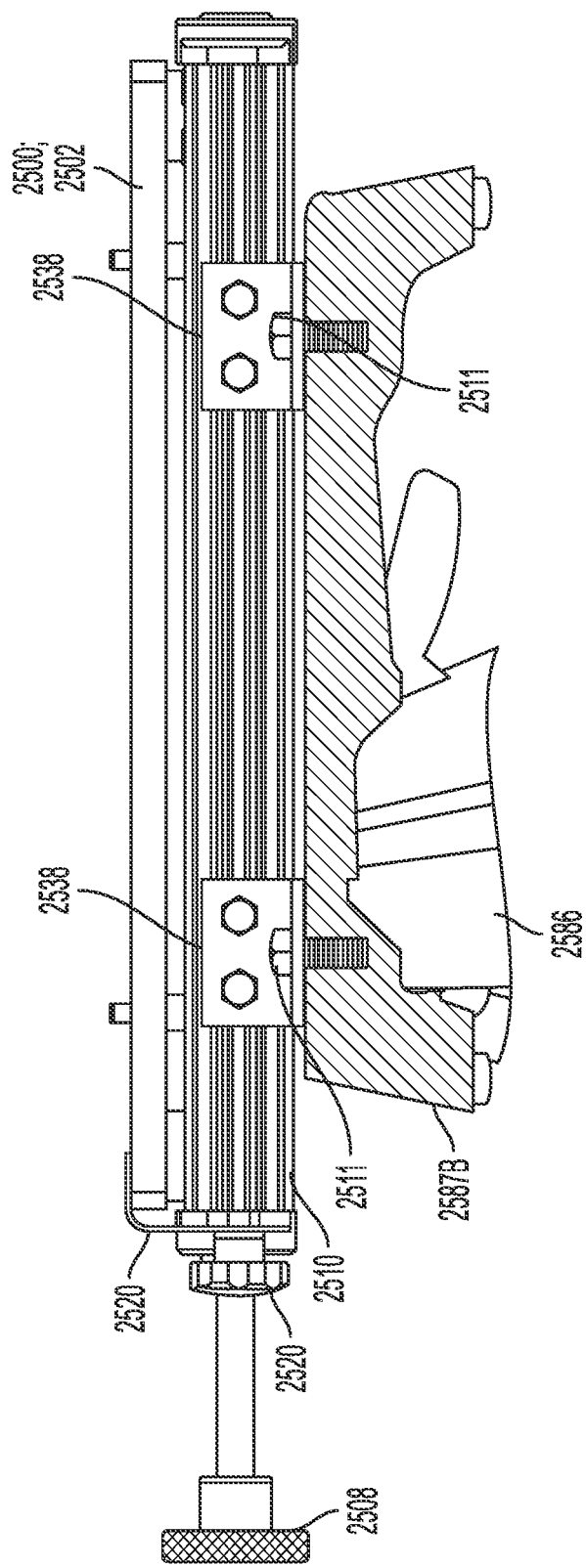
FIG. 25B is a side sectional view of the combination saw slide and saw stand assembly shown in FIG. 25A a including details of the saw slide mounted to the saw stand brackets.

FIG. 25A is a perspective assembly view of a combination saw slide and saw stand assembly according to an exemplary embodiment of this disclosure, the combination including a saw slide fixed to the saw stand using saw stand brackets which are movably attached to a crossmember rail; and FIG. 25B is a side sectional view of the combination saw slide and saw stand assembly shown in FIG. 25A a including details of the saw slide mounted to the saw stand brackets.

Figure 26:
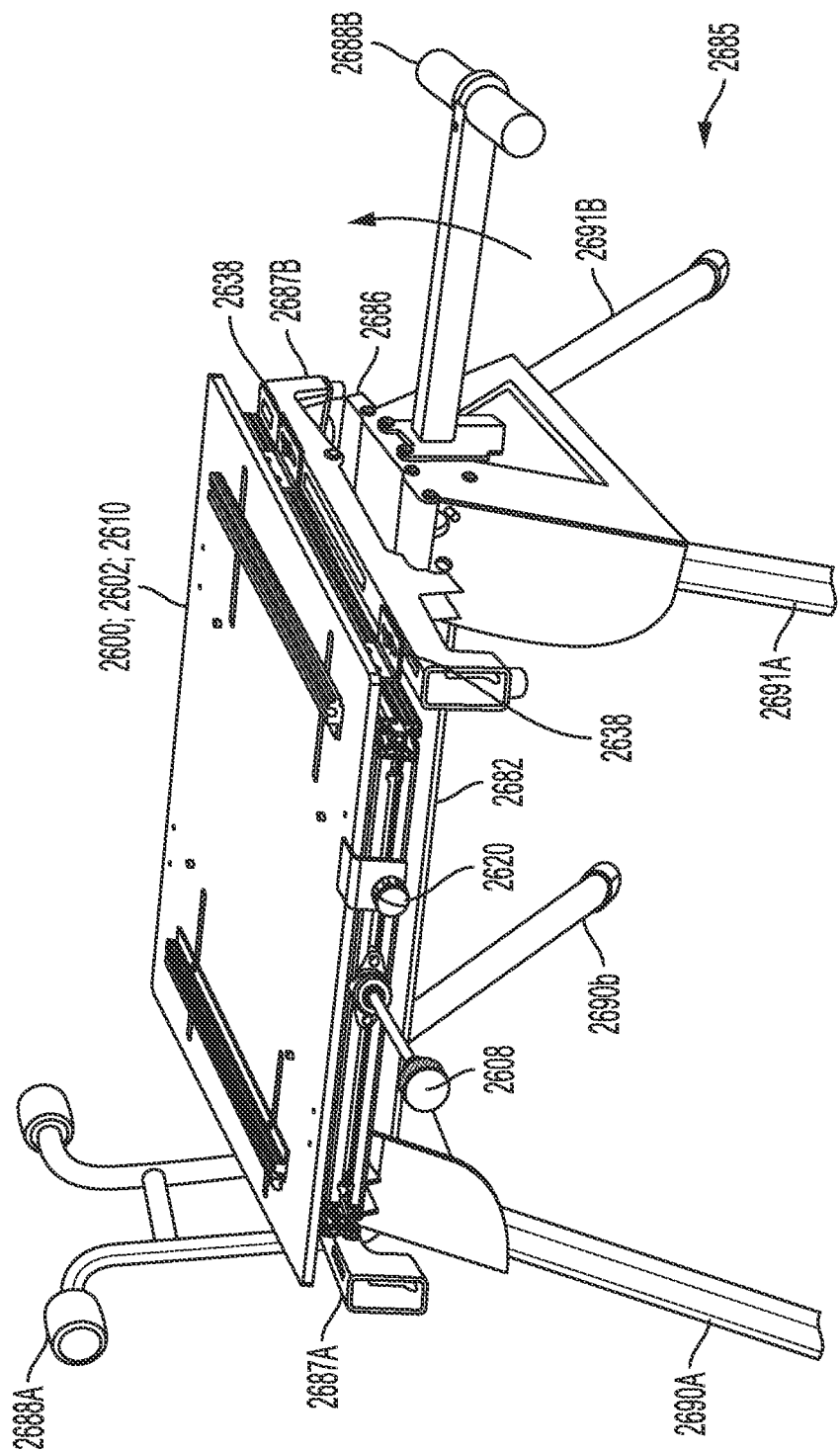
FIG. 26 is a perspective view of another combination saw slide and saw stand assembly according to an exemplary embodiment of this disclosure, the combination including a saw slide fixed to the saw stand using saw stand brackets which are movably attached to a cross member rail.

FIG. 26 is a perspective view of another combination saw slide and saw stand assembly according to an exemplary embodiment of this disclosure, the combination including a saw slide fixed to the saw stand using saw stand brackets which are movably attached to a cross member rail.

Figure 27A:
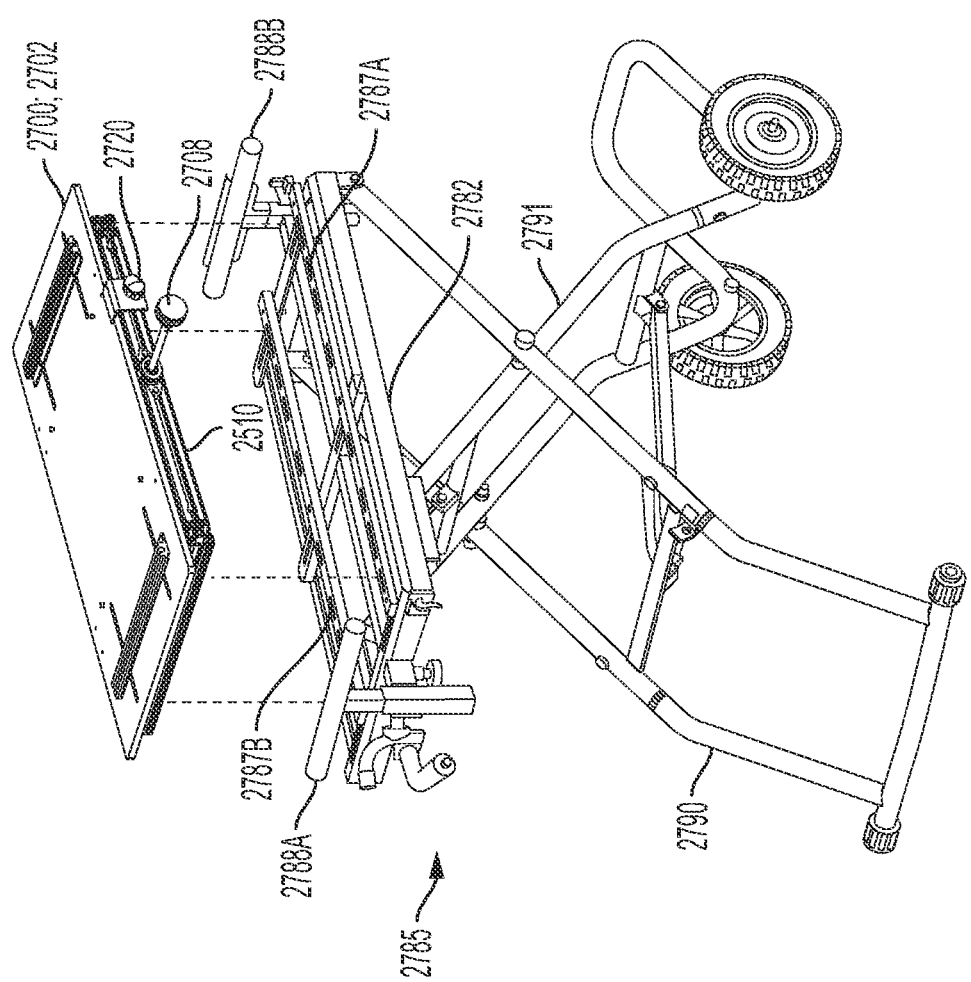
FIG. 27A is a perspective view of another combination saw slide and saw stand assembly according to an exemplary embodiment of this disclosure, the combination including the saw slide fixed directly to C-shaped mounting rails/brackets normally used to accommodate a plurality of distinct miter saw mounting configurations.
Figure 27B:
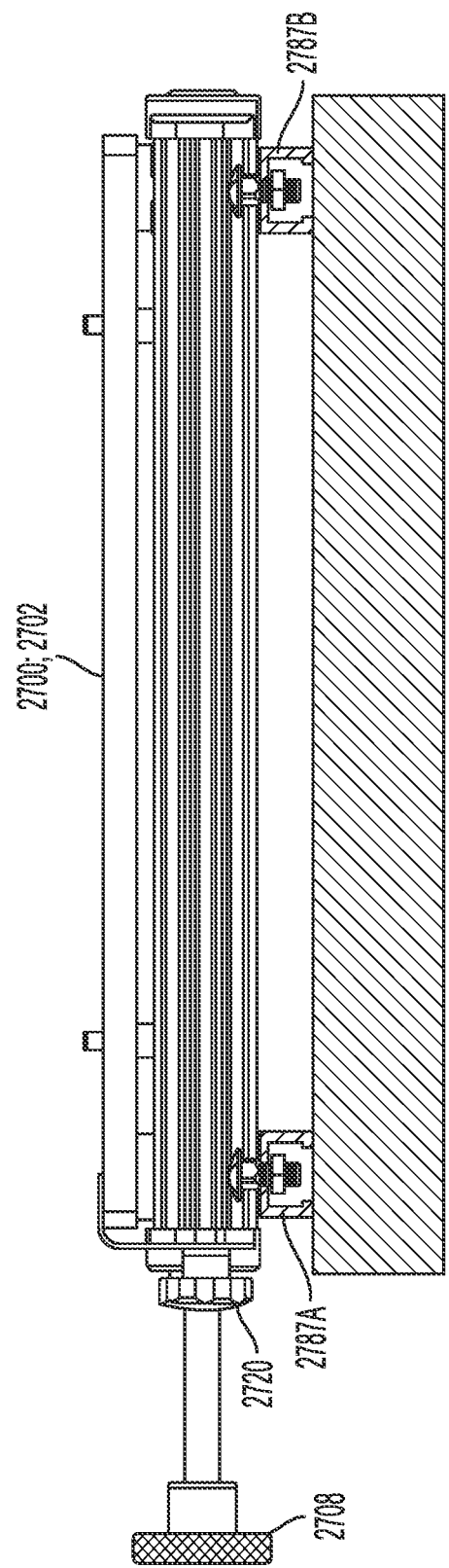
FIG. 27B is a side sectional view of the combination saw slide and saw stand assembly shown in FIG. 27A including details of the saw slide mounted to the saw stand mounting rails.

FIG. 27A is a perspective view of another combination saw slide and saw stand assembly according to an exemplary embodiment of this disclosure, the combination including the saw slide fixed directly to C-shaped mounting rails/brackets normally used to accommodate a plurality of distinct miter saw mounting configuration; and FIG. 27B is a side sectional view of the combination saw slide and saw stand assembly shown in FIG. 27A including details of the saw slide mounted to the saw stand mounting rails.

Referring first to FIGS. 22A and 22B, a saw slide device 2200 and an associated miter saw 2201 are pictured. The saw slide device 2200 is generally configured as a stand-alone accessory which is not specially adapted for any particular type or brand of miter saw. Similarly, the saw slide device 2200 is not specially adapted for any particular type or brand of saw table or stand. Rather, the saw slide device 2200 is configured with adjustable components such that the saw slide device can be used with a wide variety of miter saws and/or tables and stands. For example, as described in greater detail in the embodiments discussed above, adjustable braces 2234, i.e. saw mount adapter brackets, are utilized so that use of the saw slide device 2200 is not restricted to miter saws having bases of a specific size or geometry. Furthermore, one or more height-adjustable leg elements 2211 installed on the base frame 2210 allow the saw slide device 2200 to be used on top of any suitable surface which can safely support the both the saw slide device and associated miter saw 2201 mounted thereon. In addition, the saw slide device 2200 includes a sliding top plate 2202, and adjustment mechanism 2208.

In addition, it should be understood that saw slide devices in accordance with the present disclosure are not required to include adjustable elements like elements 2211/2234 of device 2200 to be considered a universal accessory type device. Rather, a device's inclusion or exclusion of adjustable elements is only a factor to consider. Accordingly, when configured in the manner pictured in FIGS. 22A-22B and as discussed above, the saw slide devices of the present disclosure are not required to be incorporated with any other system or assembly (i.e., specific miter saw having a particular base or a specific saw stand or table). Moreover, any of the saw slide device embodiments discussed above can be provided as a stand-alone device like device 2200.

On the other hand, it also further contemplated the exemplary saw slide devices 100, 200, 300, 400, 500, 600, 700, 800, 900, 1000 and 1100 disclosed herein can optionally be provided as an incorporated component belonging to a larger system or assembly. For example, although not illustrated by FIGS. 22A-22B, the associated miter saw 2201 could alternatively be provided with a base which incorporates the saw slide device 2200 in such a manner that both devices are included as part of a single, inseparable unit. Moreover, and discussed in further detail below, FIGS. 23A-23C, 24A-24B, 25A-25B, 26, 27A and 27B illustrate additional examples where a saw slide device made in accordance with the present disclosure is combined with an associated saw table as part of a single device.

Turning now to FIGS. 23A, 23B and 23C, a saw slide device 2300, an associated miter saw 2301, and an associated table or stand 2385 are pictured, the saw slide device 2300 including a sliding top plate 2302, a base frame 2310 and adjustment mechanism 2308, and a locking member 2320. Similar to saw slide device 2200 discussed above with reference to FIGS. 22A and 22B, device 2300 is not specially adapted for any particular type or brand of miter saw. That is, saw slide device 2300 is generally configured with one or more features which can optionally be utilized to support a wide variety of saws like associated miter saw 2301. However, contrary to device 2200, saw slide device 2300 is generally not configured as a stand-alone accessory, but rather is specially adapted for use with associated stand 2385 using fasteners 2311 to mount the saw slide base frame 2310 to saw stand brackets 2387A and 2387B.

For example, the associated saw stand 2385 includes a base 2382, left legs 2390A and 2390B, right legs 2391A and 2391B, and a track 2386 defined at least partially by channels and guides that have a specific geometry and arrangement with respect to one another. As such, the saw slide device 2300 is provided with brackets 2387A and 2387B having engagement features which permit the slide device to be mounted on and movable along track 2386 of associated stand 2385. Moreover, associated saw stand 2385 also includes a pair of rollers 2388A and 2388B which help to support a workpiece at an appropriate height or level which ensures that the saw slide device 2300 can be safely used when cutting a workpiece with the associated miter saw 2301. Likewise, brackets 2387A and 2387B are also generally configured at an appropriate height or level which ensures safe use of the saw slide device 2300 in conjunction with the associated miter saw 2301, support rollers 2388A and 2388B, and any other component of the associated saw stand 2385. Accordingly, when configured in the manner illustrated in FIGS. 23A, 23B and 23C and as discussed above, the saw slide devices of the present disclosure are intended to be incorporated as part of another system or assembly like the associated saw stand 2385.

Turning now to FIGS. 24A and 24B, a saw slide device 2400, an associated miter saw 2401, and an associated table or stand 2485 are illustrated. The saw slide device 2400 includes a base frame 2410, sliding top plate 2402 and adjustment mechanism 2408. Similar to saw slide devices 2200 and 2300 discussed above with reference to FIGS. 22A-22B and 23A-23C, device 2400 is not specially adapted for any particular type or brand of miter saw. That is, saw slide device 2400 is generally configured with one or more features which can optionally be utilized to support a wide variety of saws like associated miter saw 2401. However, contrary to device 2200, saw slide device 2400 is also generally not configured as a stand-alone accessory, but rather is specially adapted for use with associated stand 2485. For example, the associated saw stand 2485 includes a base 2482, left leg 2490, right leg 2491, saw mount brackets 2487A and 2487B and a track 2486 defined at least partially by channels and guides that have a specific geometry and arrangement with respect to one another. A side mount bracket arrangement 2438A and 2438B integrated with the saw slide device base frame or formed on or otherwise provided with the saw stand is configured to provide a low mounting position for the saw slide device 2400 relative to the associated saw stand 2485. As shown, the saw slide is mounted to bracket 2438A using fastener 2411A and bracket 2438A is mounted to saw stand mount 2487A using fastener 2492A. According to an exemplary embodiment of this disclosure, the saw slide device 2400 includes a sled component having corresponding engagement features which ensure that the low mounting position of the side mount bracket arrangement is maintained when the sled is mounted thereto. Accordingly, when configured in the manner illustrated in FIGS. 24A and 24B and as discussed above, the saw slide devices of the present disclosure are incorporated as part of another system or assembly like the associated saw stand device 2485.

Moreover, it is not intended that the present disclosure be limited by specific features of a system or assembly which incorporates a saw slide device as described herein. Rather, the illustrations of FIGS. 23A-23C and 24A-24B are intended to show that any of the exemplary saw slide devices 100, 200, 300, 400, 500, 600, 700, 800, 900, 1000 and 1100 disclosed herein can optionally be configured for use with or otherwise provided in a specific system or assembly such as saw stand 2385 or saw stand 2485.

Turning now to FIG. 25A and FIG. 25B, another saw slide device 2500 and an associated table or stand 2585 are illustrated. The saw slide device 2500 includes a base frame 2510, sliding top plate 2502, locking member 2520 and adjustment mechanism 2508. Similar to saw slide devices 2200, 2300 and 2400 discussed above with reference to FIGS. 22A-22B, 23A-23C and FIGS. 24A-24B device 2500 is not specially adapted for any particular type or brand of miter saw. That is, saw slide device 2500 is generally configured with one or more features which can optionally be utilized to support a wide variety of saws like associated miter saw 2401 shown in FIG. 24A. However, contrary to device 2200, saw slide device 2400 is also generally not configured as a stand-alone accessory, but rather is specially adapted for use with associated stand 2585. For example, the associated saw stand 2585 includes a base 2582, left legs 2590A and 2590B, right legs 2591A and 2591B, saw mount brackets 2587A and 2587B, a track 2586 and workpiece support rollers 2588A and 2588B. A side mount bracket arrangement 2538 integrated with the saw slide device base frame 2510 or formed on or otherwise provided with the saw stand is configured to mount the saw slide device 2400 on the associated saw stand 2485. As shown, the saw slide is mounted to brackets 2538 and brackets 2538 are mounted to saw stand mount brackets 2587A and 2587B using fasteners 2511.

Turning now to FIG. 26, another saw slide device 2600 and an associated table or stand 2685 are illustrated. The saw slide device 2600 includes a base frame 2610, sliding top plate 2602, locking member 2620 and adjustment mechanism 2608. Similar to saw slide devices 2200, 2300, 2400 and 2500 discussed above with reference to FIGS. 22A-22B, 23A-23C, FIGS. 24A-24B and FIGS. 25A-23B, device 2600 is not specially adapted for any particular type or brand of miter saw. That is, saw slide device 2600 is generally configured with one or more features which can optionally be utilized to support a wide variety of saws like associated miter saw 2401 shown in FIG. 24A. However, contrary to device 2200, saw slide device 2600 is also generally not configured as a stand-alone accessory, but rather is specially adapted for use with associated stand 2685. For example, the associated saw stand 2685 includes a base 2682, left legs 2690A and 2690B, right legs 2691A and 2691B, saw mount brackets 2687A and 2687B, a track or cross member rail 2686 and workpiece support rollers 2688A and 2688B. A side mount bracket arrangement 2638 integrated with the saw slide device base frame 2610 or formed on or otherwise provided with the saw stand is configured to mount the saw slide device 2600 on the associated saw stand 2685.

Disclosed herein are exemplary embodiments including, but not limited to the following:

[A1] A saw slide device for an associated miter saw comprising: a top plate having a lower surface and an upper surface, the upper surface of the top plate being configured to support and attach the associated miter saw; a top plate adjustment mechanism operably connected to the lower surface of the top plate, the top plate adjustment mechanism being configured to move the top plate and associated miter saw supported and attached thereon linearly along a plane defined by the upper surface of the top plate; and, a base frame positioned under the top plate, the top plate being movably attached to the base frame, the top plate adjustment mechanism being supported on at least a portion of the base frame, and the base frame having a fixed position relative to the top plate.

[A2] The saw slide device for an associated miter saw according to paragraph [A1], wherein the top plate adjustment mechanism includes at least one gear rack, pinion gear, and associated gear shaft disposed under the lower surface of the top plate, the at least one pinion gear being fixed on the associated gear shaft and operatively engaged with the at least one gear rack.

[A3] The saw slide device for an associated miter saw according to paragraph [A2], further comprising: a knob disposed on the gear shaft at a position accessible from outside the base frame.

[A4] The saw slide device for an associated miter saw according to paragraph [A2], wherein the top plate adjustment mechanism includes a bevel gear assembly.

[A5] The saw slide device for an associated miter saw according to paragraph [A4], wherein the at least one gear rack and pinion gear enables linear movement of the top plate in a first direction and the bevel gear assembly enables linear movement of the top plate in a second direction, the first direction associated with movement along a first axis and the second direction associated with movement along a second axis offset 45-135 degrees from the first axis.

[A6] The saw slide device for an associated miter saw according to paragraph [A1], wherein the top plate adjustment mechanism includes a worm wheel, a worm screw operatively engaged with the worm wheel, and a linkage connected to the worm wheel and the top plate.

[A7] The saw slide device for an associated miter saw according to paragraph [A6], further comprising: a rotatable handle with a gear, the rotatable handle being accessible from outside the base frame and the gear being operatively engaged with the worm screw such that rotation of the handle enables linear movement of the top plate along the plane defined by the upper surface of the top plate.

[A8] The saw slide device for an associated miter saw according to paragraph [A1], wherein the top plate adjustment mechanism includes a worm wheel, a worm screw operatively engaged with the worm wheel, a shaft having one end connected to the worm wheel, and a knob attached to an opposite end of the shaft at a position accessible from outside the base frame.

[A9] The saw slide device for an associated miter saw according to paragraph [A1], wherein the top plate adjustment mechanism includes a scissor jack attached to the base frame and to the lower surface of the top plate.

[A10] The saw slide device for an associated miter saw according to paragraph [A9], further comprising: a shaft operatively connected to the scissor jack and one end of the shaft disposed at a position accessible from outside the base frame such that movement of the shaft in one direction enables linear movement of the top plate in the same direction.

[A11] The saw slide device for an associated miter saw according to paragraph [A1], wherein the top plate adjustment mechanism includes a handlebar having one end pivotally attached to the lower surface of the top plate and an opposite end of the handlebar is disposed at a position accessible from outside the base frame.

[A12] The saw slide device for an associated miter saw according to paragraph [A11], further comprising: a slot formed in the handlebar and a stud mounted to the lower surface of the top plate on one end and an opposite end of the stud disposed in the slot such that movement of the handlebar in one direction enables linear movement of the top plate in the same direction.

[A13] The saw slide device for an associated miter saw according to paragraph [A12], further comprising: a slot formed on the base frame which receives the opposite end of the handlebar and permits movement of the handlebar back and forth within the slot.

[A14] The saw slide device for an associated miter saw according to paragraph [A11], further comprising: a pivot arm pivotally attached to the handlebar and to the bottom surface of the top plate.

[A15] The saw slide device for an associated miter saw according to paragraph [A1], wherein the top plate adjustment mechanism includes a shaft, a cable operatively engaged with the shaft, a first pulley block attached to one side of the base frame, and a second pulley block attached to an opposite side of the base frame.

[A16] The saw slide device for an associated miter saw according to paragraph [A15], wherein a first section of the cable engages the first pulley block and is attached to the lower surface of the top plate and a second section of the cable engages the second pulley block and is attached to the lower surface of the top plate such that rotation of the shaft enables a linear movement of the top plate.

[A17] The saw slide device for an associated miter saw according to paragraph [A1], wherein the top plate adjustment mechanism includes an actuator having a fixed end mounted to one side of the base frame and a rod end mounted to the lower surface of the top plate such that linear movement of the rod end of the actuator in one direction enables linear movement of the top plate in the same direction.

[A18] The saw slide device for an associated miter saw according to paragraph [A1], further comprising: at least one low friction spacer disposed between the top plate and the base frame.

[A19] The saw slide device for an associated miter saw according to paragraph [A1], further comprising: one or more braces attached on the upper surface of the top plate such that the associated saw can be mounted thereto.

[A20] The saw slide device for an associated miter saw according to paragraph [A1], further comprising: one or more fastening members attached on the base frame such that the saw slide device is mountable on one or more of an associated saw stand, associated saw bench and associated saw table.

[A21] The saw slide device for an associated miter saw according to paragraph [A1], further comprising: one or more adjustable legs attached on a lower surface of the base frame to support the saw slide device on top of one or more of an associated saw stand and associated saw table.

[A22] The saw slide device for an associated miter saw according to paragraph [A1], further comprising: a locking member mounted on the base frame and configured to engage the top plate and prevent unintended movement of the top plate and the associated miter saw.

[B1] A miter saw assembly comprising: a miter saw with a base; a sliding top plate with a lower surface and an upper surface, the base of the miter saw being mounted to the upper surface of the sliding top plate; a top plate adjustment mechanism operably connected to the lower surface of the sliding top plate, the top plate adjustment mechanism being configured to move the sliding top plate and miter saw linearly along a plane defined by the upper surface of the sliding top plate; and a frame which movably supports the lower surface of the sliding top plate and which supports at least a portion of the top plate adjustment mechanism, the frame having a fixed position relative to the sliding top plate.

[B2] The miter saw assembly according to paragraph [B1], wherein the top plate adjustment mechanism includes at least one gear rack, pinion gear, and associated gear shaft disposed under the lower surface of the sliding top plate, the at least one pinion gear being fixed on the associated gear shaft and operatively engaged with the at least one gear rack.

[B3] The miter saw assembly according to paragraph [B1], further comprising: one or more braces attached on the upper surface of the sliding top plate such that the miter saw can be mounted thereto, and one or more fastening members attached on the base frame such that the miter saw assembly is mountable on one or more of an associated saw stand, associated saw bench and associated saw table.

[B4] The miter saw assembly according to paragraph [B1], further comprising: a locking member mounted on the base frame and configured to engage the sliding top plate and prevent unintended movement of the sliding top plate and the miter saw attached to the sliding top plate.

[C1] A saw stand assembly for an associated miter saw comprising: a saw stand; a sliding top plate with a lower surface and an upper surface, the upper surface of the sliding top plate being configured to support the associated miter saw; a top plate adjustment mechanism operably connected to the lower surface of the sliding top plate, the top plate adjustment mechanism being configured to move the sliding top plate and associated miter saw linearly along a plane defined by the upper surface of the sliding top plate; and, a frame mounted to the saw stand which movably supports the sliding top plate above the frame and which at least a partially supports the top plate adjustment mechanism, the frame having a fixed position on the saw stand relative to the sliding top plate.

[C2] The saw stand assembly for an associated miter saw according to paragraph [C1], wherein the top plate adjustment mechanism includes at least one gear rack, pinion gear, and associated gear shaft disposed under the lower surface of the sliding top plate, the at least one pinion gear being fixed on the associated gear shaft and operatively engaged with the at least one gear rack.

[C3] The saw stand assembly for an associated miter saw according to paragraph [C1], further comprising: one or more braces attached on the upper surface of the sliding top plate such that the associated saw can be mounted thereto, and one or more fastening members attached on the base frame such that the base frame is mountable on the saw stand.

[C4] The saw stand assembly for an associated miter saw according to paragraph [C1], further comprising: a locking member mounted on the base frame and configured to engage the sliding top plate and prevent unintended movement of the sliding top plate and the associated miter saw.

[D1] A traversing miter saw table operatively associated with a miter saw and miter saw stand comprising: a miter saw mount member, the miter saw mount member including a top surface and a bottom surface, the miter saw mount member adapted to operatively attach and fix an associated miter saw to the top surface, the associated miter saw including a work piece table, a circular saw blade oriented to crosscut a work piece supported by the work piece table; and a work piece fence extending along an axis perpendicular to a zero degree crosscut alignment axis of the associated miter saw circular saw blade; a saw stand mount member, the saw stand mount member operatively supporting the miter saw mount member and the saw stand mount member adapted to operatively attach and fix the saw stand mount member to at least one associated saw stand rail, the at least one associated saw stand rail extending along a longitudinal axis parallel to the associated miter saw work piece fence and perpendicular to the zero degree crosscut alignment axis of the associated miter saw circular saw blade; and an operator controlled miter saw alignment mechanism, the operator controlled miter saw alignment mechanism operatively connected to the miter saw mount member and the saw stand mount member, the miter saw alignment mechanism linearly traversing the miter saw mount member from a first location to a second location relative to a fixed location of the saw stand mount member operatively attached and fixed to the at least one associated saw stand rail to laterally align the associated miter saw and circular saw blade along an axis parallel to the at least one associated saw stand rail longitudinal axis.

[D2] The traversing miter saw table operatively associated with a miter saw and miter saw stand according to paragraph [D1], wherein the miter saw mount member is a substantially flat plate made of one or more of steel, aluminum, metal, wood, plastic and composite material.

[D3] The traversing miter saw table operatively associated with a miter saw and miter saw stand according to paragraph [D1], wherein the miter saw mount member includes a plurality of slots extending from the top surface to the bottom surface to operatively attach and fix the associated miter saw to the miter saw mount member.

[D4] The traversing miter saw table operatively associated with a miter saw and miter saw stand according to paragraph [D1], wherein the miter saw mount member includes at least one miter saw mounting bracket attached to the top surface, the miter saw mounting bracket adapted to attach and fix a plurality of miter saw bases to the miter saw mount member top surface.

[D5] The traversing miter saw table operatively associated with a miter saw and miter saw stand according to paragraph [D1], wherein the saw stand mount member includes a plurality of slotted brackets to operatively attach and fix the saw stand mount member to the at least one associated saw stand rail.

[D6] The traversing miter saw table operatively associated with a miter saw and miter saw stand according to paragraph [D1], wherein the saw stand mount member includes a plurality of brackets to operatively attach and fix the saw stand mount member to at least one independent bracket moveable, attachable and fixable to the at least one associated saw stand rail.

[D7] The traversing miter saw table operatively associated with a miter saw and miter saw stand according to paragraph [D1], wherein the saw stand mount member includes a plurality of slotted brackets to operatively attach and fix the saw stand mount member to at least one independent bracket moveable, attachable and fixable to the at least one associated saw stand rail.

[D8] The traversing miter saw table operatively associated with a miter saw and miter saw stand according to paragraph [D1], further comprising: a locking member operatively associated with fixing in place the miter saw mount member to the saw stand mount member to prevent movement of the miter saw mount member relative to the saw stand mount member with the operator controlled miter saw alignment mechanism.

[D9] The traversing miter saw table operatively associated with a miter saw and miter saw stand according to paragraph [D1], wherein the operator controlled miter saw alignment mechanism includes at least one gear rack, pinion gear and associated pinion gear shaft, the at least one gear rack mounted to the miter saw mount member bottom surface and extending along an axis parallel to the associated miter saw work piece fence axis and perpendicular to the zero degree crosscut orientation of the associated miter saw circular saw blade, the at least one pinion gear operatively fixed to the saw stand mounting member, attached to the associated pinion gear, and rotatably engaged within the at least one gear rack to linearly traverse the miter saw mount member from the first location to the second location relative to the fixed location of the saw stand mount member operatively attached and fixed to the at least one associated saw stand rail to laterally align the associated miter saw and circular saw blade along the axis parallel to the at least one associated saw stand rail longitudinal axis.

[D10] The traversing miter saw table operatively associated with a miter saw and miter saw stand according to paragraph [D9], wherein the gear rack, pinion gear and associated pinion gear shaft are made of one or more of metal, aluminum, steel, plastic, rubber and ceramic.

[E1] A traversing miter saw table and miter saw stand combination operatively associated with a miter saw comprising: a miter saw stand including a base and at least one saw stand rail including at least one moveable and fixable bracket to attach the adjustable miter saw table; and the traversing miter saw table including a miter saw mount member, the miter saw mount member including a top surface and a bottom surface, the miter saw mount member adapted to operatively attach and fix an associated miter saw to the top surface, the associated miter saw including a work piece table, a circular saw blade oriented to crosscut a work piece supported by the work piece table; and a work piece fence extending along an axis perpendicular to the zero degree crosscut orientation of the associated miter saw circular saw blade; a saw stand mount member, the saw stand mount member operatively supporting the miter saw mount member and the saw stand mount member adapted to operatively attach and fix the saw stand mount member to the at least one associated saw stand rail, the at least one associated saw stand rail extending along a longitudinal axis parallel to the associated miter saw work piece fence and perpendicular to a zero degree crosscut alignment axis of the associated miter saw circular saw blade; and an operator controlled miter saw alignment mechanism, the operator controlled miter saw alignment mechanism operatively connected to the miter saw mount member and the saw stand mount member, the miter saw alignment mechanism linearly traversing the miter saw mount member from a first location to a second location relative to a fixed location of the saw stand mount member operatively attached and fixed to the at least one associated saw stand rail to laterally align the associated miter saw and circular saw blade along an axis parallel to the at least one associated saw stand rail longitudinal axis.

[E2] The traversing miter saw table and miter saw stand combination operatively associated with a miter saw according to paragraph [E1], wherein the miter saw mount member is a substantially flat plate made of one or more of steel, aluminum, metal, wood, plastic and composite material.

[E3] The traversing miter saw table and miter saw stand combination operatively associated with a miter saw according to paragraph [E1], wherein the miter saw mount member includes a plurality of slots extending from the top surface to the bottom surface to operatively attach and fix the associated miter saw to the miter saw mount member.

[E4] The traversing miter saw table and miter saw stand combination operatively associated with a miter saw according to paragraph [E1], wherein the miter saw mount member includes at least one miter saw mounting bracket attached to the top surface, the miter saw mounting bracket adapted to attach and fix a plurality of miter saw bases to the miter saw mount member top surface.

[E5] The traversing miter saw table and miter saw stand combination operatively associated with a miter saw according to paragraph [E1], wherein the saw stand mount member includes a plurality of slotted brackets to operatively attach and fix the saw stand mount member to the at least one associated saw stand rail.

[E6] The traversing miter saw table and miter saw stand combination operatively associated with a miter saw according to paragraph [E1], wherein the saw stand mount member includes a plurality of slotted brackets to operatively attach and fix the saw stand mount member to a at least one independent bracket moveable, attachable and fixable to the at least one associated saw stand rail.

[E7] The traversing miter saw table and miter saw stand combination operatively associated with a miter saw according to paragraph [E1], wherein the saw stand mount member includes a plurality of brackets to operatively attach and fix the saw stand mount member to the at least one associated saw stand rail.

[E8] The traversing miter saw table and miter saw stand combination operatively associated with a miter saw according to paragraph [E1], further comprising: a locking member operatively associated with fixing in place the miter saw mount member to the saw stand mount member to prevent movement of the miter saw mount member relative to the saw stand mount member with the operator controlled miter saw alignment mechanism.

[E9] The traversing miter saw table and miter saw stand combination operatively associated with a miter saw according to paragraph [E1], wherein the operator controlled miter saw alignment mechanism includes at least one gear rack, pinion gear and associated pinion gear shaft, the at least one gear rack mounted to the miter saw mount member bottom surface and extending along an axis parallel to the associated miter saw work piece fence axis and perpendicular to the zero degree crosscut orientation of the associated miter saw circular saw blade, the at least one pinion gear operatively fixed to the saw stand mounting member, attached to the associated pinion gear, and rotatably engaged within the at least one gear rack to linearly traverse the miter saw mount member from the first location to the second location relative to the fixed location of the saw stand mount member operatively attached and fixed to the at least one saw stand rail to laterally align the associated miter saw and circular saw blade along the axis parallel to the at least one saw stand rail longitudinal axis.

[E10] The traversing miter saw table and miter saw stand combination operatively associated with a miter saw according to paragraph [E9], wherein the gear rack, pinion gear and associated pinion gear shaft are made of one or more of metal, aluminum, steel, plastic, rubber and ceramic.

[F1] A traversing miter saw table operatively associated with a miter saw and miter saw stand comprising: a miter saw mount member, the miter saw mount member including a top surface and a bottom surface, the miter saw mount member adapted to operatively attach and fix an associated miter saw to the top surface, the associated miter saw including a work piece table, a circular saw blade oriented to crosscut a work piece supported by the work piece table; and a work piece fence extending along an axis perpendicular to a zero degree crosscut alignment axis of the associated miter saw circular saw blade; a saw stand mount member, the saw stand mount member operatively supporting the miter saw mount member and the saw stand mount member adapted to operatively attach and fix the saw stand mount member to at least one associated saw stand rail, the at least one associated saw stand rail extending along a longitudinal axis parallel to the associated miter saw work piece fence and perpendicular to the zero degree crosscut alignment axis of the associated miter saw circular saw blade; a first operator controlled miter saw alignment mechanism, the first operator controlled miter saw alignment mechanism operatively connected to the miter saw mount member and the saw stand mount member, the first miter saw alignment mechanism linearly traversing the miter saw mount member from a first location to a second location relative to a fixed location of the saw stand mount member operatively attached and fixed to the at least one associated saw stand rail to laterally align the associated miter saw and circular saw blade along an axis parallel to the at least one associated saw stand rail longitudinal axis; and a second operator controlled miter saw alignment mechanism, the second operator controlled miter saw alignment mechanism operatively connected to the miter saw mount member and the saw stand mount member, the second miter saw alignment mechanism linearly traversing the miter saw mount member from a first location to a second location relative to a fixed location of the saw stand mount member operatively attached and fixed to the at least one associated saw stand rail to align the associated miter saw and circular saw blade along an axis perpendicular to the at least one associated saw stand rail longitudinal axis.

[F2] The traversing miter saw table operatively associated with a miter saw and miter saw stand according to paragraph [F1], wherein the miter saw mount member is a substantially flat plate made of one or more of steel, aluminum, metal, wood, plastic and composite material.

[F3] The traversing miter saw table operatively associated with a miter saw and miter saw stand according to paragraph [F1], wherein the miter saw mount member includes a plurality of slots extending from the top surface to the bottom surface to operatively attach and fix the associated miter saw to the miter saw mount member.

[F4] The traversing miter saw table operatively associated with a miter saw and miter saw stand according to paragraph [F1], wherein the miter saw mount member includes at least one miter saw mounting bracket attached to the top surface, the miter saw mounting bracket adapted to attach and fix a plurality of miter saw bases to the miter saw mount member top surface.

[F5] The traversing miter saw table operatively associated with a miter saw and miter saw stand according to paragraph [F1], wherein the saw stand mount member includes a plurality of slotted brackets to operatively attach and fix the saw stand mount member to the at least one associated saw stand rail.

[F6] The traversing miter saw table operatively associated with a miter saw and miter saw stand according to paragraph [F1], wherein the saw stand mount member includes a plurality of brackets to operatively attach and fix the saw stand mount member to at least one independent bracket moveable, attachable and fixable to the at least one associated saw stand rail.

[F7] The traversing miter saw table operatively associated with a miter saw and miter saw stand according to paragraph [F1], wherein the saw stand mount member includes a plurality of slotted brackets to operatively attach and fix the saw stand mount member to at least one independent bracket moveable, attachable and fixable to the at least one associated saw stand rail.

[F8] The traversing miter saw table operatively associated with a miter saw and miter saw stand according to paragraph [F1], further comprising: at least one locking member operatively associated with fixing in place the miter saw mount member to the saw stand mount member to prevent movement of the miter saw mount member relative to the saw stand mount member with the first operator controlled miter saw alignment mechanism and second operator controlled miter saw alignment mechanism.

[F9] The traversing miter saw table operatively associated with a miter saw and miter saw stand according to paragraph [F1], wherein the first operator controlled miter saw alignment mechanism includes at least one gear rack, pinion gear and associated pinion gear shaft, the at least one gear rack mounted to the miter saw mount member bottom surface and extending along an axis parallel to the associated miter saw work piece fence axis and perpendicular to the zero degree crosscut orientation of the associated miter saw circular saw blade, the at least one pinion gear operatively fixed to the saw stand mounting member, attached to the associated pinion gear, and rotatably engaged within the at least one gear rack to linearly traverse the miter saw mount member from the first location to the second location relative to the fixed location of the saw stand mount member operatively attached and fixed to the at least one associated saw stand rail to laterally align the associated miter saw and circular saw blade along the axis parallel to the at least one associated saw stand rail longitudinal axis.

[F10] The traversing miter saw table operatively associated with a miter saw and miter saw stand according to paragraph [F9], wherein the gear rack, pinion gear and associated pinion gear shaft are made of one or more of metal, aluminum, steel, plastic, rubber and ceramic.

[G1] A traversing miter saw table operatively associated with a miter saw and miter saw stand comprising: a miter saw mount member, the miter saw mount member including a top surface and a bottom surface, the miter saw mount member adapted to operatively attach and fix an associated miter saw to the top surface, the associated miter saw including a work piece table, a circular saw blade oriented to crosscut a work piece supported by the work piece table; and a work piece fence extending along an axis perpendicular to a zero degree crosscut alignment axis of the associated miter saw circular saw blade; a miter saw mount member support frame, the miter saw mount member support frame operatively supporting the miter saw mount member and the miter saw mount member support frame adapted to operatively attach and fix the miter saw mount member support frame to an operator controlled rotating platform operatively attached and fixed to at least one associated saw stand rail, the at least one associated saw stand rail extending along a longitudinal axis parallel to the associated miter saw work piece fence and perpendicular to the zero degree crosscut alignment axis of the associated miter saw circular saw blade with the rotating platform aligned at a rotation angle of substantially zero degrees; an operator controlled miter saw alignment mechanism, the operator controlled miter saw alignment mechanism operatively connected to the miter saw mount member and the miter saw mount member support frame, the miter saw alignment mechanism linearly traversing the miter saw mount member from a first location to a second location relative to a fixed location of the miter saw mount member support frame; and an operator controlled miter saw rotating platform alignment mechanism, the operator controlled miter rotating platform alignment mechanism operatively connected to the rotating platform to rotate the miter saw mount member and miter saw mount member support frame from a first angular position to a second angular position to angularly align the associated miter saw and circular saw blade about a rotational axis of the rotating platform.

[G2] The traversing miter saw table operatively associated with a miter saw and miter saw stand according to paragraph 61, wherein the miter saw mount member is a substantially flat plate made of one or more of steel, aluminum, metal, wood, plastic and composite material.

[G3] The traversing miter saw table operatively associated with a miter saw and miter saw stand according to paragraph [G1], wherein the miter saw mount member includes a plurality of slots extending from the top surface to the bottom surface to operatively attach and fix the associated miter saw to the miter saw mount member.

[G4] The traversing miter saw table operatively associated with a miter saw and miter saw stand according to paragraph [G1], wherein the miter saw mount member includes at least one miter saw mounting bracket attached to the top surface, the miter saw mounting bracket adapted to attach and fix a plurality of miter saw bases to the miter saw mount member top surface.

[G5] The traversing miter saw table operatively associated with a miter saw and miter saw stand according to paragraph [G1], wherein the traversing miter saw table includes a plurality of slotted brackets to operatively attach and fix the traversing miter saw table to the at least one associated saw stand rail.

[G6] The traversing miter saw table operatively associated with a miter saw and miter saw stand according to paragraph [G1], wherein the traversing miter saw table includes a plurality of brackets to operatively attach and fix the traversing miter saw table to at least one independent bracket moveable, attachable and fixable to the at least one associated saw stand rail.

[G7] The traversing miter saw table operatively associated with a miter saw and miter saw stand according to paragraph [G1], wherein the traversing miter saw table includes a plurality of slotted brackets to operatively attach and fix the traversing miter saw table to at least one independent bracket moveable, attachable and fixable to the at least one associated saw stand rail.

[G8] The traversing miter saw table operatively associated with a miter saw and miter saw stand according to paragraph [G1], further comprising: at least one locking member operatively associated with fixing in place the traversing miter saw table to prevent movement of the traversing miter saw table relative to the at least one associated saw stand rail with the operator controlled miter saw alignment mechanism and operator controlled miter saw rotating platform alignment mechanism.

[G9] The traversing miter saw table operatively associated with a miter saw and miter saw stand according to paragraph [G1], wherein the operator controlled miter saw alignment mechanism includes at least one him gear rack, pinion gear and associated pinion gear shaft, the at least one gear rack mounted to the miter saw mount member bottom surface and extending along an axis parallel to the associated miter saw work piece fence axis and perpendicular to the zero degree crosscut orientation of the associated miter saw circular saw blade, the at least one pinion gear operatively fixed to the miter saw mount member support frame, attached to the associated pinion gear, and rotatably engaged within the at least one gear rack to linearly traverse the miter saw mount member from the first location to the second location relative to the fixed location of the miter saw mount member support frame attached and fixed to the rotating platform operatively attached and fixed to the at least one associated saw stand rail.

[G10] The traversing miter saw table operatively associated with a miter saw and miter saw stand according to paragraph [G9], wherein the gear rack, pinion gear and associated pinion gear shaft are made of one or more of metal, aluminum, steel, plastic, rubber and ceramic.

[H1] A traversing miter saw table operatively associated with a miter saw and miter saw stand comprising: a miter saw mount member, the miter saw mount member including a top surface and a bottom surface, the miter saw mount member adapted to operatively attach and fix an associated miter saw to the top surface, the associated miter saw including a work piece table, a circular saw blade oriented to crosscut a work piece supported by the work piece table; and a work piece fence extending along an axis perpendicular to a zero degree crosscut alignment axis of the associated miter saw circular saw blade; a miter saw mount member support frame, the miter saw mount member support frame operatively supporting the miter saw mount member and the miter saw mount member support frame adapted to operatively attach and fix the miter saw mount member support frame to an operator controlled rotating platform operatively attached and fixed to at least one associated saw stand rail, the at least one associated saw stand rail extending along a longitudinal axis parallel to the associated miter saw work piece fence and perpendicular to the zero degree crosscut alignment axis of the associated miter saw circular saw blade with the rotating platform aligned at a rotation angle of substantially zero degrees; a first operator controlled miter saw alignment mechanism, the first operator controlled miter saw alignment mechanism operatively connected to the miter saw mount member and the miter saw mount member support frame, the first miter saw alignment mechanism linearly traversing the miter saw mount member along a first axis from a first location to a second location relative to a fixed location of the miter saw mount member support frame; a second operator controlled miter saw alignment mechanism, the second operator controlled miter saw alignment mechanism operatively connected to the miter saw mount member and the miter saw mount member support frame, the second miter saw alignment mechanism linearly traversing the miter saw mount member along a second axis from a first location to a second location relative to a fixed location of the miter saw mount member support frame the second axis offset an angle of 45 degrees to 135 degrees from the first axis; and an operator controlled miter saw rotating platform alignment mechanism, the operator controlled miter rotating platform alignment mechanism operatively connected to the rotating platform to rotate the miter saw mount member and miter saw mount member support frame from a first angular position to a second angular position to angularly align the associated miter saw and circular saw blade about a rotational axis of the rotating platform.

[H2] The traversing miter saw table operatively associated with a miter saw and miter saw stand according to paragraph [H1], wherein the miter saw mount member is a substantially flat plate made of one or more of steel, aluminum, metal, wood, plastic and composite material.

[H3] The traversing miter saw table operatively associated with a miter saw and miter saw stand according to paragraph [H1], wherein the miter saw mount member includes a plurality of slots extending from the top surface to the bottom surface to operatively attach and fix the associated miter saw to the miter saw mount member.

[H4] The traversing miter saw table operatively associated with a miter saw and miter saw stand according to paragraph [H1], wherein the miter saw mount member includes at least one miter saw mounting bracket attached to the top surface, the miter saw mounting bracket adapted to attach and fix a plurality of miter saw bases to the miter saw mount member top surface.

[H5] The traversing miter saw table operatively associated with a miter saw and miter saw stand according to paragraph [H1], wherein the traversing miter saw table includes a plurality of slotted brackets to operatively attach and fix the traversing miter saw table to the at least one associated saw stand rail.

[H6] The traversing miter saw table operatively associated with a miter saw and miter saw stand according to paragraph [H1], wherein the traversing miter saw table includes a plurality of brackets to operatively attach and fix the traversing miter saw table to at least one independent bracket moveable, attachable and fixable to the at least one associated saw stand rail.

[H7] The traversing miter saw table operatively associated with a miter saw and miter saw stand according to paragraph [H1], wherein the traversing miter saw table includes a plurality of slotted brackets to operatively attach and fix the traversing miter saw table to at least one independent bracket moveable, attachable and fixable to the at least one associated saw stand rail.

[H8] The traversing miter saw table operatively associated with a miter saw and miter saw stand according to paragraph [H1], further comprising: at least one locking member operatively associated with fixing in place the traversing miter saw table to prevent movement of the traversing miter saw table relative to the at least one associated saw stand rail with the first and second operator controlled miter saw alignment mechanisms and operator controlled miter saw rotating platform alignment mechanism.

[H9] The traversing miter saw table operatively associated with a miter saw and miter saw stand according to paragraph [H1], wherein the first operator controlled miter saw alignment mechanism includes at least one gear rack, pinion gear and associated pinion gear shaft, the at least one rack gear mounted to the miter saw mount member bottom surface and extending along an axis parallel to the associated miter saw work piece fence axis and perpendicular to the zero degree crosscut orientation of the associated miter saw circular saw blade, the at least one pinion gear operatively fixed to the miter saw mount member support frame, attached to the associated pinion gear, and rotatably engaged within the at least one gear rack to linearly traverse the miter saw mount member from the first location to the second location relative to the fixed location of the miter saw mount member support frame attached and fixed to the rotating platform operatively attached and fixed to the at least one associated saw stand rail.

[H10] The traversing miter saw table operatively associated with a miter saw and miter saw stand according to paragraph [H9], wherein gear rack, pinion gear and associated pinion gear shaft are made of one or more of metal, aluminum, steel, plastic, rubber and ceramic.

Included below is a REFERENCE NUMERAL/CHARACTER TABLE to aid the reader in understanding this disclosure. This table provides nonlimiting reference numeral/character descriptions which provide additional and/or supplemental descriptions of the respective reference numerals/characters shown in the accompanying drawings and described in the detailed description section of this disclosure.

REFERENCE NUMERAL/CHARACTER TABLE

| FIGS. 1A-1D | |
|---|---|
| 100 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |

-continued

| | |
|---|---|
| 102 | miter saw mount member; plate; adapter plate; sliding plate; upper plate; top plate |
| L | length of miter saw mount member; plate; adapter plate; sliding plate; upper plate; top plate |
| W | width of miter saw mount member; plate; adapter plate; sliding plate; upper plate; top plate |
| 104 | top surface; upper surface |
| 106 | fastening features; slots |
| 108 | adjustment mechanism; alignment mechanism (side-to-side) |
| 110 | saw stand mount member; support frame; base frame; table mount frame; bench mount frame |
| 112 | side sections of the saw stand mount member; support frame; base frame |
| 112A | first side section of the saw stand mount member; support frame; base frame |
| 112B | second side section of the saw stand mount member; support frame; base frame |
| 112C | third side section of the saw stand mount member; support frame; base frame |
| 112D | fourth side section of the saw stand mount member; support frame; base frame |
| 114 | bottom/lower surface of miter saw mount member; plate; adapter plate; sliding plate; upper plate; top plate |
| 116 | mounting features |
| 118 | low friction slides/spacers |
| 118A | first low friction slide/spacer |
| 118B | second low friction slide/spacer |
| 120 | locking member; locking mechanism |
| 122 | locking member/mechanism rotatable knob |
| 124 | L-shaped brace |
| Components of the adjustment/alignment mechanism 108 | |
| 150 | gear rack |
| 152 | pinion gear |
| 153 | gear rack fastener |
| 154 | pinion gear shaft |
| X | rotational axis of the gear shaft |
| 154A | first end of pinion gear shaft |
| 154B | second end of pinion gear shaft |
| 156 | knob; knurled knob; pinion gear shaft rotator |
| 158 | shaft bearing |
| 160 | gear rack teeth |
| 162 | pinion gear teeth |
| FIGS. 2A-2D | |
| 200 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
| 202 | miter saw mount member; plate; adapter plate; sliding plate; upper plate; top plate |
| 204 | top surface; upper surface |
| 206 | fastening features; slots |
| 208 | adjustment mechanism; alignment mechanism (side-to-side) |
| 210 | saw stand mount member; support frame; base frame; table mount frame; bench mount frame |
| 212 | side sections of the saw stand mount member; support frame; base frame |
| 212A | first side section of the saw stand mount member; support frame; base frame (front) |
| 212B | second side section of the saw stand mount member; support frame; base frame (rear) |
| 212C | third side section of the saw stand mount member; support frame; base frame (left) |
| 212D | fourth side section of the saw stand mount member; support frame; base frame (right) |
| 214 | bottom/lower surface of miter saw mount member; plate; adapter plate; sliding plate; upper plate; top plate |
| 216 | mounting features |
| 220 | locking member; locking mechanism |
| 222 | locking member/mechanism rotatable knob |
| 224 | L-shaped brace of locking member/mechanism |
| 226 | drop-in fasteners or guide rails; drop-in T-slot nuts; T-slot nuts; T-slot bolts; |
| 228 | flange |
| 230 | flat |
| 232 | fasteners; pins |
| 234 | adjustable brace; adjustable bracket member |
| 236 | adjustable brace channel; adjustable bracket channel |
| 238 | brackets; L-brackets |
| Components of the adjustment/alignment mechanism 208 | |
| 250A | first gear rack; first dual gear rack |
| 250B | second gear rack; second dual gear rack |
| 252A | first pinion gear; first dual pinion gear |
| 252B | second pinion gear; second dual pinion gear |
| 253 | gear rack fastener |
| 254 | pinion gear shaft |
| 256 | knob; knurled knob; pinion gear shaft rotator |

-continued

| | |
|---|---|
| 258 | pinion gear shaft bearing |
| 258A | first pinion gear shaft bearing |
| 258B | second pinion gear shaft bearing |

FIGS. 3-11: specific exemplary embodiments of the adjustment/alignment mechanism

FIGS. 3A-3C

| | |
|---|---|
| 300 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
| 302 | miter saw mount member; plate; adapter plate; sliding plate; upper plate; top plate |
| L | length of miter saw mount member; plate; adapter plate; sliding plate; upper plate; top plate |
| W | width of miter saw mount member; plate; adapter plate; sliding plate; upper plate; top plate |
| LGD | longitudinal distance of travel (side-to-side) |
| LTD | lateral distance of travel (front-to-rear) |
| 304 | top surface; upper surface |
| 306 | fastening features; slots |
| 308 | longitudinal adjustment mechanism; longitudinal alignment mechanism (side-to-side) |
| 310 | saw stand mount member; support frame; base frame; table mount frame; bench mount frame |
| 312 | side sections of the saw stand mount member; support frame; base frame |
| 312A | first side section of the saw stand mount member; support frame; base frame (front) |
| 312B | second side section of the saw stand mount member; support frame; base frame (rear) |
| 312C | third side section of the saw stand mount member; support frame; base frame (left) |
| 312D | fourth side section of the saw stand mount member; support frame; base frame (right) |
| 314 | bottom/lower surface of miter saw mount member; plate; adapter plate; sliding plate; upper plate; top plate |
| 318 | adjustment mechanism; alignment mechanism (front-to-rear) |
| 320A | locking member; locking mechanism |
| 320B | locking member; locking mechanism |
| 328 | swivel platform assembly; rotating platform assembly |
| 334 | adjustable brace; adjustable bracket member |

Components of the adjustment/alignment mechanism 308 (side-to-side)

| | |
|---|---|
| 350A | first gear rack; first dual gear rack |
| 350B | second gear rack; second dual gear rack |
| 352A | first pinion gear; first dual pinion gear |
| 352B | second pinion gear; second dual pinion gear |
| 354 | gear shaft |
| 356 | knob; knurled knob; pinion gear shaft rotator |

Components of the adjustment/alignment mechanism 318 (front-to-rear)

| | |
|---|---|
| 360A | first gear rack; first dual gear rack |
| 360B | second gear rack; second dual gear rack |
| 362A | first pinion gear; first dual pinion gear |
| 362B | second pinion gear; second dual pinion gear |
| 364 | bevel and pinion gear shaft |
| 365A | first bevel gear |
| 365B | second bevel gear |
| 366 | knob; first bevel gear shaft rotator |
| 369 | first bevel gear shaft |

Components of the swivel/rotating platform assembly 328

| | |
|---|---|
| 370 | transfer plate |
| 372 | paddle mounted on top of ball bearing member |
| 374 | ball bearing member disposed on carriage mount |
| 376 | lower carriage mount |
| 378A | first friction/support block |
| 378B | second friction/support block |
| $\alpha$ | swiveling/rotating angle range of the swivel/rotary platform assembly |
| SSFS0 | side-to-side front swivel 0 degrees |
| SSFSL$\alpha$ | side-to-side front swivel left $\alpha$ degrees |
| SSFSR$\alpha$ | side-to-side front swivel right $\alpha$ degrees |
| FRRS0 | front-to-rear rear swivel 0 degrees |
| FRRSL$\alpha$ | front-to-rear rear swivel left $\alpha$ degrees |
| FRRSR$\alpha$ | front-to-rear rear swivel right $\alpha$ degrees |

FIGS. 4A-4C

| | |
|---|---|
| 400 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
| 402 | miter saw mount member; plate; adapter plate; sliding plate; upper plate; top plate |
| LGD | longitudinal distance of travel (side-to-side) |
| LLGD | left longitudinal distance of travel (side-to-side) |
| RLGD | right longitudinal distance of travel (side-to-side) |
| 404 | top surface; upper surface |

-continued

| | |
|---|---|
| 408 | adjustment mechanism; alignment mechanism (side-to-side) |
| 410 | saw stand mount member; support frame; base frame; table mount frame; bench mount frame |
| 412A | side section of the saw stand mount member; support frame; base frame |
| 412B | side section of the saw stand mount member; support frame; base frame |
| 414 | bottom surface; lower surface |
| 416 | mounting features |
| 418 | low friction slides/spacers or friction reducing elements |
| 418A | low friction slide |
| 418B | low friction slide |
| | Components of the adjustment/alignment mechanism 408 |
| 450 | worm gear drive |
| 452 | first gear |
| 454 | second gear |
| 456 | rotatable handle; crank handle |
| 458 | worm screw |
| 460 | worm wheel |
| 462 | linkage attached to worm wheel |
| 462A | first bar of the linkage |
| 462B | second bar of the linkage |
| 464 | fixed point where first bar 462 is attached to worm wheel 460 |
| 466 | pivot point between first & second bars 462A/462B |
| 468 | pivot point between second bar 462B and bottom surface of miter saw mount member; plate; adapter plate; sliding plate; upper plate; top plate |
| 470 | bracket; spacer; linkage anchor |
| | FIG. 5 |
| 500 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
| 502 | miter saw mount member; plate; adapter plate; sliding plate; upper plate; top plate |
| 504 | top surface; upper surface |
| 508 | adjustment mechanism; alignment mechanism (side-to-side) |
| 510 | saw stand mount member; support frame; base frame; table mount frame; bench mount frame |
| 514 | bottom surface; lower surface |
| | Components of the adjustment/alignment mechanism 508 |
| 550 | worm gear drive |
| 552 | worm screw fixed to the gear shaft |
| 554 | gear shaft |
| 556 | knob; knurled knob; gear shaft rotator |
| 558 | worm screw |
| 560A | worm gear drive mounting bracket |
| 560B | worm gear drive mounting bracket |
| 563 | Fastener |
| | FIGS. 6A-6F |
| 600 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
| 602 | miter saw mount member; plate; adapter plate; sliding plate; upper plate; top plate |
| 604 | top surface; upper surface |
| 608 | adjustment mechanism; alignment mechanism (side-to-side) |
| 610 | saw stand mount member; support frame; base frame; table mount frame; bench mount frame |
| 614 | bottom surface; lower surface |
| | Components of the adjustment/alignment mechanism 608 |
| 650 | scissor-jack drive |
| 654 | shaft/threaded rod |
| 656 | knob; knurled knob; shaft/threaded rod rotator |
| 656 | slot formed on side of base frame—permits shaft/threaded rod to slide side-to-side |
| 658 | scissor-jack drive linkage |
| 658A | first bar linkage section/arm |
| 658B | second bar linkage section/arm |
| 658C | third bar linkage section/arm |
| 658D | fourth bar linkage section/arm |
| 659 | second scissor-jack drive linkage (FIG. 6F) operatively attached to scissor-jack drive linkage 658 |
| 660 | pivot connection point where first and second bar linkage sections/arms are pivotally attached |
| 662 | L-bracket |
| 664 | fixed pivot connection point where first and third bar linkage sections/arms are pivotally attached |
| 666 | fixed bracket |

| | |
|---|---|
| 668 | fixed pivot connection point where second and fourth bar linkage sections/arms are pivotally attached |
| 670 | pivot connection point where third and fourth bar linkage sections/arms are pivotally attached |

FIGS. 7A-7D

| | |
|---|---|
| 700 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
| 702 | miter saw mount member; plate; adapter plate; sliding plate; upper plate; top plate with "wrap-around" design |
| 703A | first C-shaped wrap-around sidewall; front C-shaped wrap-around sidewall |
| 703B | second C-shaped wrap-around sidewall; rear C-shaped wrap-around sidewall |
| 704 | top surface; upper surface |
| 708 | adjustment mechanism; alignment mechanism (side-to-side) |
| 710 | saw stand mount member; support frame; base frame; table mount frame; bench mount frame |
| 711A | height adjustable leg; saw stand/table/bench mounting fastener |
| 711B | height adjustable leg; saw stand/table/bench mounting fastener |
| 711C | height adjustable leg; saw stand/table/bench mounting fastener |
| 711D | height adjustable leg; saw stand/table/bench mounting fastener |
| 712 | side sections of the saw stand mount member; support frame; base frame |
| 712A | first side section of the saw stand mount member; support frame; base frame (front) |
| 712B | second side section of the saw stand mount member; support frame; base frame (rear) |
| 712C | third side section of the saw stand mount member; support frame; base frame (left) |
| 712D | fourth side section of the saw stand mount member; support frame; base frame (right) |
| 714 | bottom surface; lower surface |
| 718A | first low friction slide/spacer (front) |
| 718B | second low friction slide/spacer (rear) |
| 719A | first L-shaped low friction slide/spacer (front) |
| 719B | second L-shaped low friction slide/spacer (rear) |

Components of the adjustment mechanism 708

| | |
|---|---|
| 750 | lever; handlebar |
| 752 | bolt; pin |
| 754 | fixed pivot connection point |
| 756 | grip; handle |
| 758 | slot formed on side of base frame—permits lever/handlebar to slide side-to-side |
| 759 | pivot arm (FIG. 7D) attached to lever/handlebar 750 (without slot) |
| 760 | slot |
| 761 | pivot arm connection point (FIG. 7D) |
| 762 | stud fixed to bottom surface of the miter saw mount member; plate; adapter plate; sliding plate; upper plate; top plate where free end thereof engages slot 760 |
| 763 | bolt (FIG. 7D) fixed to bottom surface of miter saw mount member; plate; adapter plate; sliding plate; upper plate; top plate where free end of bolt pivotally connects to pivot arm 759 |
| 780 | bracket; base frame protrusion member; lever/handlebar rear support bracket; lever/handlebar pivot bracket; lever/handlebar pivot slider |

FIGS. 8A-8B

| | |
|---|---|
| 800 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
| 802 | miter saw mount member; plate; adapter plate; sliding plate; upper plate; top plate |
| 808 | adjustment mechanism; alignment mechanism (side-to-side) |
| 810 | saw stand mount member; support frame; base frame; table mount frame; bench mount frame |
| 812A | C-shaped first side section of the saw stand mount member; support frame; base frame (front) |
| 812B | C-shaped second side section of the saw stand mount member; support frame; base frame (rear) |
| 812C | third side section of the saw stand mount member; support frame; base frame (left) |
| 812D | fourth side section of the saw stand mount member; support frame; base frame (right) |
| 814 | bottom surface; lower surface |
| 818A | first flat low friction slide/spacer (front) |
| 818B | second flat low friction slide/spacer (rear) |
| 819A | first Z-shaped low friction slide/spacer (front) |
| 819B | second Z-shaped low friction slide/spacer (rear) |
| 838A | saw stand mount L-bracket (left) |
| 838B | saw stand mount L-bracket (right) |
| 850 | lever; handlebar |

| | |
|---|---|
| 852 | bolt; pin |
| 856 | grip; handle |
| 858 | slot formed on side of base frame—permits lever/handlebar to slide side-to-side |
| 860 | Slot |
| 862 | stud fixed to top surface of the miter saw mount member; adapter plate; sliding plate; upper plate; top plate where free end thereof engages slot 860 |
| 880 | bracket; base frame protrusion member; lever/handlebar rear support bracket; lever/handlebar pivot bracket; lever/handlebar pivot slider |

FIG. 9

| | |
|---|---|
| 900 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
| 902 | miter saw mount member; plate; adapter plate; sliding plate; upper plate; top plate |
| 908 | adjustment mechanism; alignment mechanism (side-to-side) |
| 910 | saw stand mount member; support frame; base frame; table mount frame; bench mount frame |
| 912A | first side section of the saw stand mount member; support frame; base frame (front) |
| 912B | second side section of the saw stand mount member; support frame; base frame (rear) |
| 912C | third side section of the saw stand mount member; support frame; base frame (left) |
| 912D | fourth side section of the saw stand mount member; support frame; base frame (right) |
| 918A | first flat low friction slide/spacer (front) |
| 918B | second flat low friction slide/spacer (rear) |
| 938A | saw stand mount L-bracket (left) |
| 938B | saw stand mount L-bracket (right) |
| 950 | lever; handlebar |
| 952 | bolt; pin |
| 958 | slot/cutout formed on front side of base frame |
| 960 | Slot |
| 962 | stud fixed to top surface of the miter saw mount member; plate; adapter plate; sliding plate; upper plate; top plate where free end thereof engages slot 960 |
| 980 | bracket; base frame protrusion member; lever/handlebar rear support bracket; lever/handlebar pivot bracket; lever/handlebar pivot slider |

FIGS. 10A-10C

| | |
|---|---|
| 1000 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
| 1002 | miter saw mount member; plate; adapter plate; sliding plate; upper plate; top plate |
| 1004 | top surface; upper surface |
| 1008 | adjustment mechanism; alignment mechanism (side-to-side) |
| 1010 | saw stand mount member; support frame; base frame; table mount frame; bench mount frame |
| 1012A | first side section of the saw stand mount member; support frame; base frame (front) |
| 1012B | second side section of the saw stand mount member; support frame; base frame (rear) |
| 1012C | third side section of the saw stand mount member; support frame; base frame (left) |
| 1012D | fourth side section of the saw stand mount member; support frame; base frame (right) |
| 1014 | bottom surface; lower surface |

Components of the adjustment/alignment mechanism 1008

| | |
|---|---|
| 1054 | Shaft |
| 1056 | knob; knurled knob; shaft rotator |
| 1058 | cable |
| 1058A | first cable section |
| 1058B | second cable section |
| 1060 | first cable section block-pulley (left) |
| 1062 | first cable section end connection point on bottom surface 1014 where first section of cable ends |
| 1066 | adjustable cable tensioner |
| 1068 | second cable section end connection point on bottom surface 1014 where second section of cable ends |

FIGS. 11A-11B

| | |
|---|---|
| 1100 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
| 1102 | miter saw mount member; plate; adapter plate; sliding plate; upper plate; top plate |
| 1104 | top surface; upper surface |
| 1108 | adjustment mechanism; alignment mechanism (side-to-side) |
| 1110 | saw stand mount member; support frame; base frame; table mount frame; bench mount frame |
| 1112A | C-shaped first side section of the saw stand mount member; support frame; base frame (front) |
| 1112B | C-shaped second side section of the saw stand mount member; support frame; base frame (rear) |
| 1112C | third side section of the saw stand mount member; support frame; base frame (left) |
| 1112D | fourth side section of the saw stand mount member; support frame; base frame (right) |

| | |
|---|---|
| 1114 | bottom surface; lower surface |
| 1118A | first flat low friction slide/spacer (front) |
| 1118B | second flat low friction slide/spacer (rear) |
| 1119A | first Z-shaped low friction slide/spacer (front) |
| 1119B | second Z-shaped low friction slide/spacer (rear) |
| 1138A | saw stand mount L-bracket (left) |
| 1138B | saw stand mount L-bracket (right) |
| Components of the adjustment/alignment mechanism 1108 | |
| 1150 | linear motion actuator |
| 1152 | fixed end of linear motion actuator |
| 1154 | linear motion actuator rod/cylinder |
| 1156 | control switch for linear motion actuator |
| FIGS. 12-20: additional or optional features for all embodiments | |

| FIGS. 12A-12E | |
|---|---|
| 1202 | miter saw mount member; plate; adapter plate; sliding plate; upper plate; top plate |
| 1204 | top surface; upper surface |
| 1208 | adjustment mechanism; alignment mechanism (side-to-side) |
| 1210 | 3D printed saw stand mount member; support frame; base frame; table mount frame; bench mount frame |
| 1226 | four corner pieces forming an upper portion of a 3D printed saw stand mount member; support frame; base frame |
| 1226A | first upper corner piece (front-left) |
| 1226B | second upper corner piece (front-right) |
| 1226C | third upper corner piece (rear-left) |
| 1226D | fourth upper corner piece (rear-right) |
| 1228 | four corner pieces forming a lower portion of a 3D printed saw stand mount member; support frame; base frame |
| 1228A | first lower corner piece (front-left) |
| 1228B | second lower corner piece (front-right) |
| 1228C | third lower corner piece (rear-left) |
| 1228D | fourth lower corner piece (rear-right) |
| 1230 | adjustment/alignment mechanism support blocks |
| 1230A | adjustment/alignment mechanism first support block (front) |
| 1230B | adjustment mechanism second support block (rear) |
| 1232 | apertures; shaft/bearing retention holes |
| 1232A | front aperture; front shaft/bearing retention hole |
| 1232B | rear aperture; rear shaft/bearing retention hole |
| 1238A | saw stand mount brackets (left) |
| 1238B | saw stand mount brackets (right) |
| 1240 | miter saw; compound miter saw; sliding compound miter saw |
| 1242 | Fence |
| 1244 | circular blade |
| 1246 | blade guard |
| 1248 | base of miter saw; compound miter saw; sliding compound miter saw |
| FIGS. 13-15: exemplary embodiments of a locking member/mechanism | |

| FIG. 13 | |
|---|---|
| 1302 | miter saw mount member; plate; adapter plate; sliding plate; upper plate; top plate |
| 1310 | support frame; base frame; saw stand mount member; table mount frame; bench mount frame |
| 1312 | side section of the saw stand mount member; support frame; base frame |
| 1316 | mounting feature; mounting track; mounting T-channel; mounting channel |
| 1320 | locking member; locking mechanism |
| 1322 | rotatable knob |
| 1323 | rotatable knob drop-in fastener/block |
| 1324 | L-shaped clamping brace/bracket |
| 1325 | rotatable knob drop-in fastener/block flange |
| 1326 | drop-in guide rail/block/fastener |

| FIG. 14 | |
|---|---|
| 1402 | miter saw mount member; plate; adapter plate; sliding plate; upper plate; top plate |
| 1410 | support frame; base frame; saw stand mount member; table mount frame; bench mount frame |
| 1414 | bottom surface; lower surface |
| 1416 | mounting feature; mounting track; mounting T-channel; mounting channel |
| 1420 | locking member; locking mechanism |
| 1422 | turn/locking lever |
| 1423 | drop-in guide rail/block/fastener |
| 1425 | drop-in guide rail/block/fastener flange |

| FIGS. 15A -15B | |
|---|---|
| 1502 | miter saw mount member; plate; adapter plate; sliding plate; upper plate; top plate |
| 1510 | support frame; base frame; saw stand mount member; table mount frame; bench mount frame |
| 1512 | C-shaped side section of the saw stand mount member; support frame; base frame (front) |
| 1514 | bottom surface; lower surface |
| 1520 | locking member; locking mechanism |
| 1522 | locking member/mechanism bar lever |

-continued

| | |
|---|---|
| 1524 | friction drum |
| 1525 | bar lever connection point to friction drum |
| 1526 | stationary support block for friction drum |
| 1528 | friction drum engagement surface |
| 1530 | L-shaped guide rail |

FIG. 16

| | |
|---|---|
| 1602 | miter saw mount member; plate; adapter plate; sliding plate; upper plate; top plate |
| 1608 | adjustment mechanism; alignment mechanism (side-to-side) |
| 1612 | C-shaped side section of the saw stand mount member; support frame; base frame (front) |
| 1620 | locking member; locking mechanism |
| 1624 | Chuck |
| 1626 | chuck jaws |
| 1650 | gear rack |
| 1652 | pinion gear |
| 1654 | pinion gear shaft |
| 1656 | knob; knurled knob; pinion gear shaft rotator |

FIG. 17

| | |
|---|---|
| 1702 | miter saw mount member; plate; adapter plate; sliding plate; upper plate; top plate with "wrap-around" design |
| 1703 | C-shaped wrap-around sliding top plate sidewall; front C-shaped wrap-around sliding top plate sidewall |
| 1708 | adjustment mechanism; alignment mechanism (side-to-side) |
| 1710 | saw stand mount member; support frame; base frame; table mount frame; bench mount frame |
| 1712 | C-shaped side section of the saw stand mount member; support frame; base frame (front) |
| 1750 | gear rack |
| 1752 | pinion gear |
| 1754 | pinion gear shaft |

FIG. 18

| | |
|---|---|
| 1810 | saw stand mount member; support frame; base frame |
| 1812A | first side section of the saw stand mount member; support frame; base frame (front) |
| 1812C | third side section of the saw stand mount member; support frame; base frame (left) |
| 1813 | welded joint |

FIG. 19

| | |
|---|---|
| 1910 | saw stand mount member; support frame; base frame |
| 1912A | first side section of the saw stand mount member; support frame; base frame (front) |
| 1912C | third side section of the saw stand mount member; support frame; base frame (left) |
| 1913A | first welded joint |
| 1913B | second weld joint |
| 1915 | gusset plate |

FIG. 20

| | |
|---|---|
| 2010 | saw stand mount member; support frame; base frame |
| 2012A | C-shaped first side section of the saw stand mount member; support frame; base frame (front) |
| 2012D | fourth side section of the saw stand mount member; support frame; base frame (right) |
| 2013 | threaded fasteners |
| 2016A | C-shaped first side section upper leg |
| 2016B | C-shaped first side section lower leg |
| 2017 | fourth side section protrusion |
| 2019 | protrusion mounting face |
| 2021 | threaded fastener holes |
| 2025 | C-shaped first side section fastening holes/apertures |

FIGS. 21A-21C

| | |
|---|---|
| 2102 | miter saw mount member; plate; adapter plate; sliding plate; upper plate; top plate |
| 2104 | top surface; upper surface |
| 2108 | adjustment mechanism; alignment mechanism (side-to-side) |
| 2110 | support frame; base frame; saw stand mount member |
| 2112A | first side section of the saw stand mount member; support frame; base frame (front) |
| 2114 | bottom surface; lower surface |
| 2134 | saw mount adapter brackets |
| 2134A | first saw mount adapter bracket |
| 2134B | second saw mount adapter bracket |
| 2134C | third saw mount adapter bracket |
| 2134D | fourth saw mount adapter bracket |
| 2135 | fastener; nut and bolt |
| 2136 | saw mount adapter bracket slots |
| 2136A | first saw mount adapter bracket slot |
| 2136B | second saw mount adapter bracket slot |
| 2136C | third saw mount adapter bracket slot |
| 2136D | fourth saw mount adapter bracket slot |
| 2137 | saw mount adapter bracket base plates |
| 2137A | first saw mount adapter bracket base plate |
| 2137B | second saw mount adapter bracket base plate |
| 2137C | third saw mount adapter bracket base plate |
| 2137D | fourth saw mount adapter bracket base plate |

-continued

| | |
|---|---|
| 2138 | saw footprint |
| 2140 | miter saw |
| 2141 | welded stud |
| 2141A | first saw mount adapter bracket welded stud |
| 2141B | second saw mount adapter bracket welded stud |
| 2141C | third saw mount adapter bracket welded stud |
| 2141D | fourth saw mount adapter bracket welded stud |
| 2142 | Fence |
| 2144 | circular saw blade |
| 2146 | blade guard |
| 2148 | miter saw base |
| T | Thickness |

FIGS. 22-27: embodiments related to various systems and/or assemblies which may incorporate a sliding saw device FIGS. 22A-22B: sliding saw device configured as a stand-alone device

| | |
|---|---|
| 2200 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
| 2201 | miter saw |
| 2202 | miter saw mount member; plate; adapter plate; sliding plate; upper plate; top plate |
| 2211 | height adjustable legs |
| 2208 | adjustment mechanism; alignment mechanism (side-to-side) |
| 2210 | support frame; base frame; table/bench mount member |
| 2234 | saw mount adapter brackets |

FIGS. 23A-23C

| | |
|---|---|
| 2300 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
| 2301 | miter saw |
| 2302 | miter saw mount member; plate; adapter plate; sliding plate; upper plate; top plate |
| 2308 | adjustment mechanism; alignment mechanism (side-to-side) |
| 2310 | saw stand mount member; support frame; base frame; table mount frame; bench mount frame |
| 2311 | Fastener |
| 2320 | locking member; locking mechanism |
| 2382 | Base |
| 2385 | saw stand; saw table |
| 2386 | track |
| 2387A | saw stand bracket (left) |
| 2387B | saw stand bracket (right) |
| 2388A | workpiece support roller (left) |
| 2388B | workpiece support roller (right) |
| 2390A | saw stand leg (left) |
| 2390B | saw stand leg (left) |
| 2391A | saw stand leg (right) |
| 2391B | saw stand leg (right) |

FIGS. 24A-24B

| | |
|---|---|
| 2400 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
| 2401 | miter saw |
| 2402 | miter saw mount member; plate; adapter plate; sliding plate; upper plate; top plate |
| 2408 | adjustment mechanism; alignment mechanism (side-to-side) |
| 2410 | support frame; base frame; saw stand mount member |
| 2411A | fastener; bolt and nut |
| 2438A | Bracket |
| 2438B | Bracket |
| 2482 | Base |
| 2485 | saw stand; saw table |
| 2486 | Track |
| 2487A | saw stand bracket (left) |
| 2487B | saw stand bracket (right) |

| | -continued |
|---|---|
| 2490 | saw stand leg (left) |
| 2491 | saw stand leg (right) |
| 2492A | fastener; bolt and nut |

FIGS. 25A-25B

| 2500 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
|---|---|
| 2502 | miter saw mount member; plate; adapter plate; sliding plate; upper plate; top plate |
| 2508 | adjustment mechanism; alignment mechanism (side-to-side) |
| 2510 | saw stand mount member; support frame; base frame; table mount frame; bench mount frame |
| 2511 | Fastener |
| 2520 | locking member; locking mechanism |
| 2538 | Bracket |
| 2582 | Base |
| 2585 | saw stand; saw table |
| 2586 | track |
| 2587A | saw stand bracket (left) |
| 2587B | saw stand bracket (right) |
| 2588A | workpiece support roller (left) |
| 2588B | workpiece support roller (right) |
| 2590A | saw stand leg (left) |
| 2590B | saw stand leg (left) |
| 2591A | saw stand leg (right) |
| 2591B | saw stand leg (right) |

FIG. 26

| 2600 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
|---|---|
| 2602 | miter saw mount member; plate; adapter plate; sliding plate; upper plate; top plate |
| 2608 | adjustment mechanism; alignment mechanism (side-to-side) |
| 2610 | saw stand mount member; support frame; base frame; table mount frame; bench mount frame |
| 2620 | locking member; locking mechanism |
| 2638 | Bracket |
| 2682 | Base |
| 2685 | saw stand; saw table |
| 2686 | track |
| 2687A | saw stand bracket (left) |
| 2687B | saw stand bracket (right) |
| 2688A | workpiece support roller (left) |
| 2688B | workpiece support roller (right) |
| 2690A | saw stand leg (left) |
| 2690B | saw stand leg (left) |
| 2691A | saw stand leg (right) |
| 2691B | saw stand leg (right) |

FIGS. 27A-27B

| 2700 | saw slide; saw slide device; adjustable saw device; alignable saw device; miter saw table; adjustable miter saw table; alignable miter saw table; traversing miter saw table; adjustable tool table; alignable tool table; traversing tool table; adjustable worktable; alignable worktable; traversing worktable; saw platform; adjustable saw platform; alignable saw platform; traversing tool platform; sliding saw device |
|---|---|
| 2702 | miter saw mount member; plate; adapter plate; sliding plate; upper plate; top plate |
| 2708 | adjustment mechanism; alignment mechanism (side-to-side) |
| 2710 | saw stand mount member; support frame; base frame; table mount frame; bench mount frame |
| 2720 | locking member; locking mechanism |
| 2782 | Base |
| 2785 | saw stand; saw table |
| 2787A | saw stand bracket (left) |
| 2787B | saw stand bracket (right) |
| 2788A | workpiece support roller (left) |
| 2788B | workpiece support roller (right) |
| 2790 | saw stand support (left) |
| 2791 | saw stand support (right) |

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The invention claimed is:

1. A traversing miter saw table, a miter saw and a miter saw stand combination comprising:
the miter saw including a workpiece table, a circular saw blade oriented to crosscut a workpiece positioned on the workpiece table, and a workpiece fence including a left workpiece fence portion and a right workpiece fence portion, the left workpiece fence portion and right workpiece fence portion both extending along a workpiece fence longitudinal axis perpendicular to a zero degree crosscut alignment axis of the circular saw blade of the miter saw;
the miter saw stand including a base, a first workpiece support, a second workpiece support and at least one saw stand rail, the at least one saw stand rail including at least one saw stand rail bracket which is moveable and fixable along a saw stand rail longitudinal axis of the at least one saw stand rail; and
the traversing miter saw table including:
a miter saw mount member, the miter saw mount member including a top surface and a bottom surface, the miter saw mount member adapted to operatively attach and fix the miter saw to the top surface of the miter saw mount member;
a saw stand mount member, the saw stand mount member operatively supporting the miter saw mount member, the saw stand mount member adapted to operatively attach and fix the saw stand mount member to the at least one saw stand rail bracket of the miter saw stand, and the saw stand mount member including a frame member with a front surface mounting channel and a top surface mounting channel, the front surface mounting channel adapted to receive a flanged fastener and the top surface mounting channel adapted to receive a flanged drop-in guide operatively connected to the bottom surface of the miter saw mount member;
an operator controlled miter saw alignment mechanism, the operator controlled miter saw alignment mechanism operatively connected to the miter saw mount member and the saw stand mount member, the miter saw alignment mechanism linearly traversing the miter saw mount member and the miter saw from a first location to a second location relative to a fixed location of the saw stand mount member, the saw stand mount member attached and fixed to the at least one saw stand rail bracket, and the operator controlled miter saw alignment mechanism moving the miter saw along a traversing axis parallel to the saw stand rail longitudinal axis,
wherein the operator controlled miter saw alignment mechanism includes at least one gear rack, at least one pinion gear and a pinion gear shaft, the at least one gear rack mounted to the bottom surface of the miter saw mount member and extending along a miter saw mount member longitudinal axis which is parallel to the workpiece fence longitudinal axis of the miter saw, the at least one pinion gear fixed to the saw stand mount member, the at least one pinion gear attached to the pinion gear shaft, and the at least one pinion gear rotatably engaged with the at least one gear rack to move the miter saw along the traversing axis parallel to the stand rail longitudinal axis; and
an operator controlled locking mechanism operatively associated with the traversing miter saw table, the operator controlled locking mechanism including an operator controlled rotatable handle operatively connected to the flanged fastener received within the front surface mounting channel of the frame member, and a brace attaching the miter saw mount member to the flanged fastener, the locking mechanism fixing in place the miter saw mount member to the saw stand mount member by rotating the rotatable handle to clamp the flanged fastener and front surface mounting channel to prevent movement of the miter saw mount member relative to the saw stand mount member with the operator controlled miter saw alignment mechanism.

2. The traversing miter saw table, the miter saw and the miter saw stand combination according to claim 1, wherein the miter saw mount member is a flat plate made of one or more of steel, aluminum, metal, wood, plastic and composite material.

3. The traversing miter saw table, the miter saw and the miter saw stand combination according to claim 1, wherein the miter saw mount member includes a plurality of slots extending from the top surface to the bottom surface to operatively attach and fix the miter saw to the miter saw mount member.

4. The traversing miter saw table the miter saw and the miter saw stand combination according to claim 1, wherein the miter saw mount member includes at least one miter saw mounting bracket attached to the top surface of the miter saw mount member, the miter saw mounting bracket adapted to attach and fix a plurality of miter saw bases to the top surface of the miter saw mount member.

5. The traversing miter saw table, the miter saw and the miter saw stand combination according to claim 1, wherein the at least one gear rack, the at least one pinion gear and the pinion gear shaft are made of one or more of metal, aluminum, steel, plastic, rubber and ceramic.

6. The traversing miter saw table, the miter saw and the miter saw stand combination according to claim 1, wherein the saw stand mount member includes a plurality of saw stand mount member brackets to operatively attach and fix the saw stand mount member to the at least one saw stand rail bracket.

7. A traversing miter saw table, a miter saw and a miter saw stand combination comprising:
the miter saw including a workpiece table, a circular saw blade oriented to crosscut a workpiece positioned on the workpiece table, and a workpiece fence including a left workpiece fence portion and a right workpiece fence portion, the left workpiece fence portion and right workpiece fence portion both extending along a workpiece fence longitudinal axis perpendicular to a zero degree crosscut alignment axis of the circular saw blade of the miter saw;
the miter saw stand including a base, a first workpiece support, a second workpiece support and at least one saw stand rail, the at least one saw stand rail including at least one saw stand rail bracket which is moveable and fixable along a saw stand rail longitudinal axis of the at least one saw stand rail; and the traversing miter saw table including:

a miter saw mount member, the miter saw mount member including a top surface and a bottom surface, the miter saw mount member adapted to operatively attach and fix the miter saw to the top surface of the miter saw mount member;

a saw stand mount member, the saw stand mount member operatively supporting the miter saw mount member, the saw stand mount member adapted to operatively attach and fix the saw stand mount member to the at least one saw stand rail bracket of the miter saw stand, and the saw stand mount member including a frame member with a front surface mounting channel and a top surface mounting channel, the front surface mounting channel adapted to receive a flanged fastener and the top surface mounting channel adapted to receive a flanged drop-in guide operatively connected to the bottom surface of the miter saw mount member;

an operator controlled miter saw alignment mechanism, the operator controlled miter saw alignment mechanism operatively connected to the miter saw mount member and the saw stand mount member, the miter saw alignment mechanism linearly traversing the miter saw mount member and the miter saw from a first location to a second location relative to a fixed location of the saw stand mount member, the saw stand mount member attached and fixed to the at least one saw stand rail bracket, and the operator controlled miter saw alignment mechanism moving the miter saw along a traversing axis parallel to the saw stand rail longitudinal axis, wherein the operator controlled miter saw alignment mechanism includes at least one gear rack, at least one pinion gear and a pinion gear shaft, the at least one gear rack mounted to the bottom surface of the miter saw mount member and extending along a miter saw mount member longitudinal axis which is parallel to the workpiece fence longitudinal axis of the miter saw, the at least one pinion gear fixed to the saw stand mount member, the at least one pinion gear attached to the pinion gear shaft, and the at least one pinion gear rotatably engaged with the at least one gear rack to move the miter saw along the traversing axis parallel to the stand rail longitudinal axis; and wherein the traversing miter saw table, the miter saw and the miter saw stand combination includes the first workpiece support, the second workpiece support and the workpiece table having respective upper-most workpiece supporting surfaces aligned on a horizontal plane; and an operator controlled locking mechanism operatively associated with the traversing miter saw table, the operator controlled locking mechanism including an operator controlled rotatable handle operatively connected to the flanged fastener received within the front surface mounting channel of the frame member, and a brace attaching the miter saw mount member to the flanged fastener, the locking mechanism fixing in place the miter saw mount member to the saw stand mount member by rotating the rotatable handle to clamp the flanged fastener and front surface mounting channel to prevent movement of the miter saw mount member relative to the saw stand mount member with the operator controlled miter saw alignment mechanism.

8. The traversing miter saw table, the miter saw and the miter saw stand combination according to claim 7, wherein the miter saw mount member is a flat plate made of one or more of steel, aluminum, metal, wood, plastic and composite material.

9. The traversing miter saw table, the miter saw and the miter saw stand combination according to claim 7, wherein the miter saw mount member includes a plurality of slots extending from the top surface to the bottom surface to operatively attach and fix the miter saw to the miter saw mount member.

10. The traversing miter saw table, the miter saw and the miter saw stand combination according to claim 7, wherein the miter saw mount member includes at least one miter saw mounting bracket attached to the top surface of the miter saw mount member, the miter saw mounting bracket adapted to attach and fix a plurality of miter saw bases to the top surface of the miter saw mount member.

11. The traversing miter saw table, the miter saw and the miter saw stand combination according to claim 7, wherein the saw stand mount member includes a plurality of saw stand mount member brackets to operatively attach and fix the saw stand mount member to the at least one saw stand rail bracket.

12. The traversing miter saw table, the miter saw and the miter saw stand combination according to claim 7, further comprising:

a locking member operatively associated with the traversing miter saw table, the locking member fixing in place the miter saw mount member to the saw stand mount member to prevent movement of the miter saw mount member relative to the saw stand mount member with the operator controlled miter saw alignment mechanism.

13. The traversing miter saw table, the miter saw and the miter saw stand combination according to claim 7, wherein the at least one gear rack, the at least one pinion gear and the pinion gear shaft are made of one or more of metal, aluminum, steel, plastic, rubber and ceramic.

* * * * *